(12) United States Patent
Saruwatari et al.

(10) Patent No.: US 9,770,789 B2
(45) Date of Patent: Sep. 26, 2017

(54) FLUX-CORED WIRE FOR GAS-SHIELDED ARC WELDING, METHOD FOR WELDING STEEL FOR VERY LOW TEMPERATURE USE, AND METHOD FOR MANUFACTURING WELD JOINT

(71) Applicant: Nippon Steel & Sumitomo Metal Corporation, Tokyo (JP)

(72) Inventors: Suo Saruwatari, Tokyo (JP); Kazuhiro Kojima, Tokyo (JP); Shuichi Nakamura, Tokyo (JP); Tatsuya Kumagai, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 323 days.

(21) Appl. No.: 14/534,775

(22) Filed: Nov. 6, 2014

(65) Prior Publication Data

US 2016/0129532 A1    May 12, 2016

Related U.S. Application Data

(63) Continuation-in-part of application No. PCT/JP2013/080284, filed on Nov. 8, 2013.

(30) Foreign Application Priority Data

Oct. 29, 2014    (JP) ................. 2014-220853

(51) Int. Cl.
*B23K 35/02*    (2006.01)
*B23K 35/30*    (2006.01)
(Continued)

(52) U.S. Cl.
CPC .......... *B23K 35/3066* (2013.01); *B23K 9/173* (2013.01); *B23K 35/0266* (2013.01); *B23K 35/3602* (2013.01); *B23K 35/3605* (2013.01)

(58) Field of Classification Search
CPC ................ B23K 35/3066; B23K 9/173; B23K 35/0266; B23K 35/3602; B23K 35/3605
(Continued)

(56) References Cited

U.S. PATENT DOCUMENTS 4,355,054 A * 10/1982 Nagano ................ B23K 35/404
                                                    427/126.2
5,219,425 A *  6/1993 Nishikawa .......... B23K 35/368
                                                    219/145.22
(Continued)

FOREIGN PATENT DOCUMENTS

EP    2489461    8/2012
JP    50-115141  9/1975
(Continued)

OTHER PUBLICATIONS

Office Action dated Jan. 27 2015 issued in corresponding JP Application No. 2014-220853. [Translation attached].
(Continued)

*Primary Examiner* — Thien S Tran
(74) *Attorney, Agent, or Firm* — Birch, Stewart, Kolasch & Birch, LLP

(57) ABSTRACT

[Object] There is provided a flux-cored wire capable of obtaining a weld metal having excellent low temperature toughness and improving welding efficiency, in which preheating performed for preventing cold cracking can be omitted or simplified.
[Means for Solving Problems] The flux-cored wire includes one or more of $CaF_2$, $BaF_2$, $SrF_2$, $MgF_2$, and LiF and, when a total amount thereof is defined as $\alpha$, the $\alpha$ is 2.0% to 7.0%, by mass %, with respect to a total mass of the flux-cored wire, one or more of a Ti oxide, a Si oxide, a Mg oxide, an Al oxide, a Zr oxide, and a Ca oxide are included in the flux-cored wire, and when a total amount thereof is defined as $\beta$, the $\beta$ is 0.2% to 0.9%, by mass %, with respect to the
(Continued)

total mass of the flux-cored wire, a ratio of an amount of the $CaF_2$ with respect to the α is 0.90 or more, and a ratio of the α with respect to the β is 3.0 or more and 15.0 or less.

12 Claims, 7 Drawing Sheets

(51) Int. Cl.
  *B23K 9/173* (2006.01)
  *B23K 35/36* (2006.01)
(58) Field of Classification Search
  USPC .......... 219/69.1, 73, 145.22, 146.24, 146.52
  See application file for complete search history.

(56) References Cited

U.S. PATENT DOCUMENTS

| | | | | |
|---|---|---|---|---|
| 5,233,160 | A * | 8/1993 | Gordish | B23K 35/368 219/137 WM |
| 2001/0038001 | A1* | 11/2001 | Morikage | B23K 35/3086 219/137 WM |
| 2004/0020912 | A1* | 2/2004 | Hara | B23K 35/3053 219/145.22 |
| 2006/0261053 | A1* | 11/2006 | Karogal | B23K 35/3026 219/145.22 |
| 2008/0057341 | A1 | 3/2008 | Bouillot et al. | |
| 2010/0301030 | A1* | 12/2010 | Zhang | B23K 9/0953 219/130.1 |
| 2012/0241433 | A1* | 9/2012 | Kojima | B23K 35/02 219/145.22 |

FOREIGN PATENT DOCUMENTS

| | | |
|---|---|---|
| JP | 62-068694 | 3/1987 |
| JP | 06-277877 A * | 10/1994 |
| JP | 08-257785 A * | 10/1996 |
| JP | 09-057488 | 3/1997 |
| JP | 09-239587 | 9/1997 |
| JP | 09-253860 | 9/1997 |
| JP | 2000-263287 | 9/2000 |
| JP | 2001-205483 | 7/2001 |
| JP | 2008-161932 | 7/2008 |
| JP | 2008-246507 | 10/2008 |
| JP | 2010-227968 | 10/2010 |
| JP | 2013-091082 | 5/2013 |
| JP | 2014-050882 | 3/2014 |
| JP | 2014-079807 | 5/2014 |
| WO | WO 2011/074689 A1 * | 6/2011 |
| WO | WO 2013/168670 | 11/2013 |
| WO | 2014/119082 | 8/2014 |

OTHER PUBLICATIONS

Extended European Search Report dated 25 Mar. 2015 issued in corresponding EP application No. 14192082.7.
International Search Report dated Jan. 28, 2014 issued in corresponding PCT Application No. PCT/JP PCT/JP20 13/080284.
Kazuo Agusa, Masaaki Kosho et al.; "Matching Ferritic Filler MIG Welding of 9% Ni Steel", Kawasaki Steel Giho, vol. 14, No. 3, 1982, pp. 298-309 [with English Translation].
"1000 numbers of Q and A of Bonding and Joining Technology", compiled by the editorial committee of 1000 numbers of Q and A of Bonding and Joining Technology, and published by Industrial Technology Center Incorporated, 1999, p. 564 [with partial English translation].
Japan Welding Society, "1.4.2 MIG welding and MAG welding," Welding and Bonding Technology, 2nd Edition, Oct. 10, 2012, pp. 45-46, (5 pages total), with an English translation.
Japanese Office Action for Japanese Application No. 2015-167106, dated Aug. 9, 2016, with a partial English translation.
The Japan Welding Engineering Society, "Table 2.1 Carbon steel arc welding flux introduction," Practice of Flux-Cored Wire, 1st Edition, Apr. 25, 1994, pp. 24-25 (4 pages total), with an English translation.

* cited by examiner (a)

(b)

GAP (c)

GAP

FLUX-CORED WIRE FOR GAS-SHIELDED ARC WELDING, METHOD FOR WELDING STEEL FOR VERY LOW TEMPERATURE USE, AND METHOD FOR MANUFACTURING WELD JOINT

This application is a continuation-in-part application of International Patent Application No. PCT/JP2013/080284, filed Nov. 8, 2013, and claims priority to Japanese Patent Application No. 2014-220853, filed Oct. 29, 2014, each of which is incorporated by reference in its entirety.

TECHNICAL FIELD OF THE INVENTION

The present invention relates to a flux-cored wire used in gas-shielded arc welding of Ni steel for very low temperature use containing 5.5% to 9.5% of Ni, which is used for an LNG storage tank, a chemical plant, or the like, and particularly relates to a flux-cored wire for gas-shielded arc welding, capable of obtaining a weld metal having excellent low temperature toughness and improving welding efficiency, and having excellent cold cracking resistance, a method for welding steel for very low temperature use using the same, and a method for manufacturing a welded joint.

RELATED ART

In recent years, there has been an increasing demand for natural gas having less carbon dioxide emissions than that of oil, coal, or the like resulting from tightening of carbon dioxide emission regulations due to problems including global warming, and with the increasing demand for natural gas, demand for constructing an LNG storage tank has also been increasing worldwide. As steel used for an LNG storage tank, in order to meet demand for securing toughness at a very low temperature of −196° C., Ni-based steel for low temperature use including 5.5% to 9.5% of Ni is used.

In regard to welding for the Ni-based steel for low temperature use, because of the necessity of satisfying rigorous safety regulations, a Ni-based alloy welding material including 60% to 80% of Ni is used. However, since containing a large amount of Ni, the Ni-based alloy welding material is very expensive. Further, since the Ni-based alloy welding material has poor fluidity in a molten state, weld defects such as incomplete fusion is easily generated. In addition, since welding is performed with a low heat input to prevent weld defects, there is a problem in welding efficiency.

Further, in order to reduce welding material costs, when the amount of Ni is reduced to about 5.5% to 9.5%, which is the same level as Ni-based steel for low temperature use, the weld metal has a very hard martensite structure and a problem of cold cracking arises. The cold cracking does not occur in a Ni-based alloy welding material in which a structure of the weld metal is an austenite structure. The preheating performed for preventing cold cracking is a new problem in reduction of welding costs.

Under the circumstances, as a welding wire of steel for very low temperature use, for example, the following wires have been suggested.

In Patent Document 1, there is disclosed a flux-cored wire in which a Ni-based alloy material is used as an outer steel sheath. However, the amount of Ni is 60% to 70% and a welding material cost reduction has not been achieved.

In Patent Document 2, there is disclosed a welding material in which the amount of Ni is 7.5% to 12.0%. However, TIG welding which has low welding efficiency is employed as a welding method and thus welding efficiency has not been improved.

In Patent Document 3, there is disclosed a wire which is a welding material in which the amount of Ni is 8% to 13%, and has excellent welding efficiency by reducing welding material costs and applying submerged arc welding thereto. However, since submerged arc welding is employed as a welding method, an obtainable weld metal has 250 ppm of oxygen, which is a large amount, and accordingly, the absorbed energy at −196° C. is low. Thus, sufficient low temperature toughness cannot be secured. In addition, any examination of cold cracking as a problem caused in this amount of Ni has not been conducted.

In Non-Patent Document 1, a technology is disclosed which obtains a weld metal having a low oxygen content at the same level as in TIG welding, by performing MIG welding with a 100% Ar shielding gas using a solid wire of an iron alloy in which the amount of Ni is reduced to about 10%. In this technology, the amounts of P and S in the wire are significantly reduced, thus toughness can be secured. However, in the experiments conducted by the present inventors, there are defects such as a large amount of diffusible hydrogen being included in the weld metal obtained by the method in Non-Patent Document 1 and cold cracking resistance being deteriorated. In addition, since the wire described in the Non-Patent Document 1 is a solid wire in which Rem addition is required, there are other defects of spattering being violent and welding efficiency being deteriorated during welding.

Accordingly, as a welding wire of steel for very low temperature use, the development of a welding wire capable of reducing welding material costs and improving welding efficiency, and having excellent cold cracking resistance has been in strong demand.

PRIOR ART DOCUMENT

Patent Document

[Patent Document 1] Japanese Unexamined Patent Application, First Publication No. 2008-246507
[Patent Document 2] Japanese Unexamined Patent Application, First Publication No. H09-253860
[Patent Document 3] Japanese Unexamined Patent Application, First Publication No. 2008-161932

Non-Patent Document

[Non-Patent Document 1] Kazuo Agusa, Masaaki Kosho et al., "Matching Ferritic Filler MIG Welding of 9% Ni Steel", Kawasaki Steel Giho, vol. 14, No. 3 (1982)

DISCLOSURE OF THE INVENTION

Problems to be Solved by the Invention

When there is an attempt to obtain a weld metal having excellent low temperature toughness even in a case in which the amount of Ni of a welding wire for consumable electrode type gas-shielded arc welding having excellent welding efficiency is reduced, oxygen penetrating into the weld metal from an active gas included in the shielding gas becomes a problem.

In gas-shielded arc welding, as a shielding gas, Ar-10% to 30% $CO_2$ (that is, including 10% to 30% of $CO_2$ by volume fraction, and a remainder including a mixed gas of Ar), 100% $CO_2$, Ar-2% $O_2$, or the like is generally used. 2% or more of $CO_2$ or $O_2$, which is an active gas, is included in the gas. This is because arcs are unstable and a sound weld metal without weld defects cannot be obtained by using only an inert gas.

On the other hand, these active gases are ionized by welding arcs and the ionized oxygen enter the weld metal, and thus, when the active gases are mixed, the amount of oxygen in the weld metal increases. When the amount of oxygen in the weld metal increases, the absorbed energy at a ductile fracture decreases.

As a welding material for steel for very low temperature use, when a welding material in which the amount of Ni is reduced to the same level as Ni steel containing 5.5% to 9.5% of Ni is used as a base metal, it is difficult to secure the absorbed energy at ductile fracture. Thus, a welding method capable of obtaining a weld metal having a small amount of oxygen is required. However, a welding wire capable of obtaining a sound weld metal by gas-shielded arc welding using a shielding gas in which the amount of an active mixed gas is reduced or using only an inert gas has not yet been realized.

In non-consumable electrode type TIG welding, a sound weld metal can be obtained and the amount of oxygen in the weld metal is reduced. However, there are problems in that the welding efficiency is very low compared to consumable electrode type gas-shielded arc welding and welding costs increase in the TIG welding.

Further, since the weld metal in which the amount of Ni is reduced to the same level as Ni steel containing 5.5% to 9.5% of Ni has a very hard martensite structure in the welding material, there is a problem of cold cracking.

In order to prevent cold cracking, preheating is required. The preheating is also a cause of deteriorating welding efficiency, but in the related art, any examination of cold cracking resistance has not been conducted.

The present invention has been made in consideration of the above-described problems in the related art and an object thereof is to provide a flux-cored wire for gas-shielded arc welding capable of significantly reducing welding material costs by reducing the amount of Ni to the same level as Ni steel containing 5.5% to 9.5% of Ni, and obtaining a weld metal having excellent low temperature toughness at −196° C. even when gas-shielded arc welding having excellent welding efficiency is applied. In addition, another object thereof is to provide a flux-cored wire for gas-shielded arc welding not requiring preheating for preventing cold cracking or capable of significantly reducing preheating, and a method for welding steel for very low temperature use using the same.

Means for Solving the Problem

As a result of intensive investigations to solve the above-described problems, the present inventors have found that when a flux-cored wire in which the amount of Ni is reduced to the same level as Ni steel containing 5.5% to 9.5% of Ni has a slag composition having fluoride as a main composition, it is possible to (i) obtain a sound weld metal in which arcs are stable and an amount of oxygen is small even with gas-shielded arc welding using a pure Ar gas or a mixed gas in which a ratio of oxygen is less than 2% in a pure Ar gas, as a shielding gas, and to (ii) obtain excellent Charpy absorbed energy at −196° C. by significantly reducing an alloy composition filled in a flux, using an outer steel sheath containing 6% to 16% of Ni, further reducing the amount of oxygen in a weld metal, and then, forming the most suitable composition for a weld metal obtained by this welding method with C, Si, Mn, and other alloying elements.

Further, it has been found that the amount of diffusible hydrogen in the weld metal can be significantly reduced by the use of the flux-cored wire according to the present invention.

Accordingly, the flux-cored wire, capable of obtaining a weld metal having excellent low temperature toughness, achieving high welding efficiency, and omitting or simplifying preheating performed for preventing cold cracking in welding of Ni steel containing 5.5% to 9.5% of Ni, has been found and further investigations have been conducted based on the findings. Therefore, the present invention has been accomplished.

(1) According to an aspect of the present invention, a flux-cored wire for gas-shielded arc welding is provided including an outer steel sheath; and a flux with which the outer steel sheath is filled, in which one or more of $CaF_2$, $BaF_2$, $SrF_2$, $MgF_2$, and LiF, which are metal fluorides, are included in the flux-cored wire and, when a total amount thereof is defined as α, the α is 2.0% to 7.0%, by mass %, with respect to a total mass of the flux-cored wire, one or more of a Ti oxide, a Si oxide, a Mg oxide, an Al oxide, a Zr oxide, and a Ca oxide, which are metal oxides, are included in the flux-cored wire and, when a total amount thereof is defined as β, the β is 0.2% to 0.9%, by mass %, with respect to the total mass of the flux-cored wire, one or more of $CaCO_3$, $BaCO_3$, $SrCO_3$, $MgCO_3$, and $Li_2CO_3$, which are metal carbonates, are included in the flux-cored wire and a total amount thereof is less than 0.6%, by mass %, with respect to the total mass of the flux-cored wire, a ratio of an amount of the $CaF_2$ with respect to the α is 0.90 or more, a ratio of the α with respect to the β is 3.0 or more and 15.0 or less, an amount of the Ti oxide is 0% to 0.4%, by mass %, with respect to the total mass of the flux-cored wire, an amount of the Si oxide is 0.2% to 0.5%, by mass %, with respect to the total mass of the flux-cored wire, an amount of the Ca oxide is less than 0.20%, by mass %, with respect to the total mass of the flux-cored wire, an amount of an arc stabilizer in the flux is 0% to 0.50%, by mass %, with respect to the total mass of the flux-cored wire, an amount of an iron powder in the flux is less than 5%, by mass %, with respect to the total mass of the flux-cored wire, chemical compositions except the metal fluorides, the metal oxides, and the metal carbonates include, by mass %, with respect to the total mass of the flux-cored wire, C: 0.003% to 0.040%; Si: 0.05% to 0.40%; Mn: 0.2% to 0.8%; Al: 0.003% to 0.050%; Ni: 6.0% to 16.0%; P: 0.02% or less; S: 0.01% or less; Cu: 0% to 0.5%; Cr: 0% to 0.5%; Mo: 0% to 0.5%; V: 0% to 0.2%; Ti: 0% to 0.1%; Nb: 0% to 0.1%; B: 0% to 0.01%; Mg: 0% to 0.6%; REM: 0 to 0.0500%; and a remainder: Fe and an impurity, a SM defined by the below expression a is 0.3% to 1.0%, and Ceq defined by the below expression b is 0.250% to 0.525%, SM=[Si]+[Mn]: (Expression a), Ceq=[C]+(1/24)[Si]+(1/6)[Mn]+(1/40)[Ni]+(1/5)[Cr]+(1/4)[Mo]+(1/14)[V]: (Expression b), and in the expressions a and b, elements noted in brackets express amounts (mass %) of the elements, respectively.

(2) In the flux-cored wire for gas-shielded arc welding according to (1), the flux-cored wire may include the outer steel sheath including Ni and the flux filled therein, and an amount of Ni in the outer steel sheath may be 6% to 18%, by mass %, with respect to the total mass of the outer steel sheath.

(3) In the flux-cored wire for gas-shielded arc welding according to (1) or (2), an amount of REM in the flux-cored wire may be 0.0100% or less, by mass %, with respect to the total mass of the flux-cored wire.

(4) In the flux-cored wire for gas-shielded arc welding according to any one of (1) to (3), the amount of the Ca oxide in the flux-cored wire may be less than 0.10%, by mass %, with respect to the total mass of the flux-cored wire.

(5) In the flux-cored wire for gas-shielded arc welding according to any one of (1) to (4), a tensile strength of a weld metal may be 660 MPa to 900 MPa in a tensile test to the weld metal regulated in Japanese Industrial Standards JIS Z 3111-2005 in the gas-shielded arc welding using the flux-cored wire.

(6) In the flux-cored wire for gas-shielded arc welding according to any one of (1) to (5), a slit-shaped gap may exist in the outer steel sheath of the flux-cored wire.

(7) In the flux-cored wire for gas-shielded arc welding according to any one of (1) to (5), a slit-shaped gap may not exist in the outer steel sheath of the flux-cored wire.

(8) In the flux-cored wire for gas-shielded arc welding according to any one of (1) to (7), a perfluoropolyether oil may be applied on a surface of the outer steel sheath of the flux-cored wire.

(9) According to a second aspect of the present invention, a method for welding steel for very low temperature use is provided, in which welding is performed with the flux-cored wire for gas-shielded arc welding according to any one of (1) to (8), and with any one of a pure Ar gas, a mixed gas of Ar and 1.5 volume % or less of $O_2$ or $CO_2$, a pure He gas, and a mixed gas of He and 1.5 volume % or less of $O_2$ or $CO_2$ as a shielding gas.

(10) According to a third aspect of the present invention, a method for manufacturing a weld joint is provided, in which a steel plate in which a thickness is 6 mm to 100 mm, an amount of Ni is 5.5 mass % to 9.5 mass %, and a tensile strength is 660 MPa to 900 MPa is welded with the flux-cored wire for gas-shielded arc welding according to any one of (1) to (8), and with any one of a pure Ar gas, a mixed gas of Ar and 1.5 volume % or less of $O_2$ or $CO_2$, a pure He gas, and a mixed gas of He and 1.5 volume % or less of $O_2$ or $CO_2$ as a shielding gas.

Effects of the Invention

According to each of the aspects of the present invention, gas-shielded arc welding capable of significantly reducing welding material costs by reducing the amount of Ni to the flux-cored wire used for welding Ni-based steel for low temperature use containing about 5.5% to 9.5% of Ni to the same level as Ni-based steel for low temperature use and achieving excellent welding efficiency can be applied, and further, a weld metal having excellent low temperature toughness at −196° C. can be obtained by reducing the alloy composition of the flux to fill the inside of the wire and the amount of oxygen in the weld metal. Further, it is possible to provide a flux-cored wire in which preheating for preventing cold cracking is not required or preheating can be significantly reduced, a method for welding steel for very low temperature use using the same, and a method for manufacturing a welding joint.

EMBODIMENTS OF THE INVENTION

Figure 1:
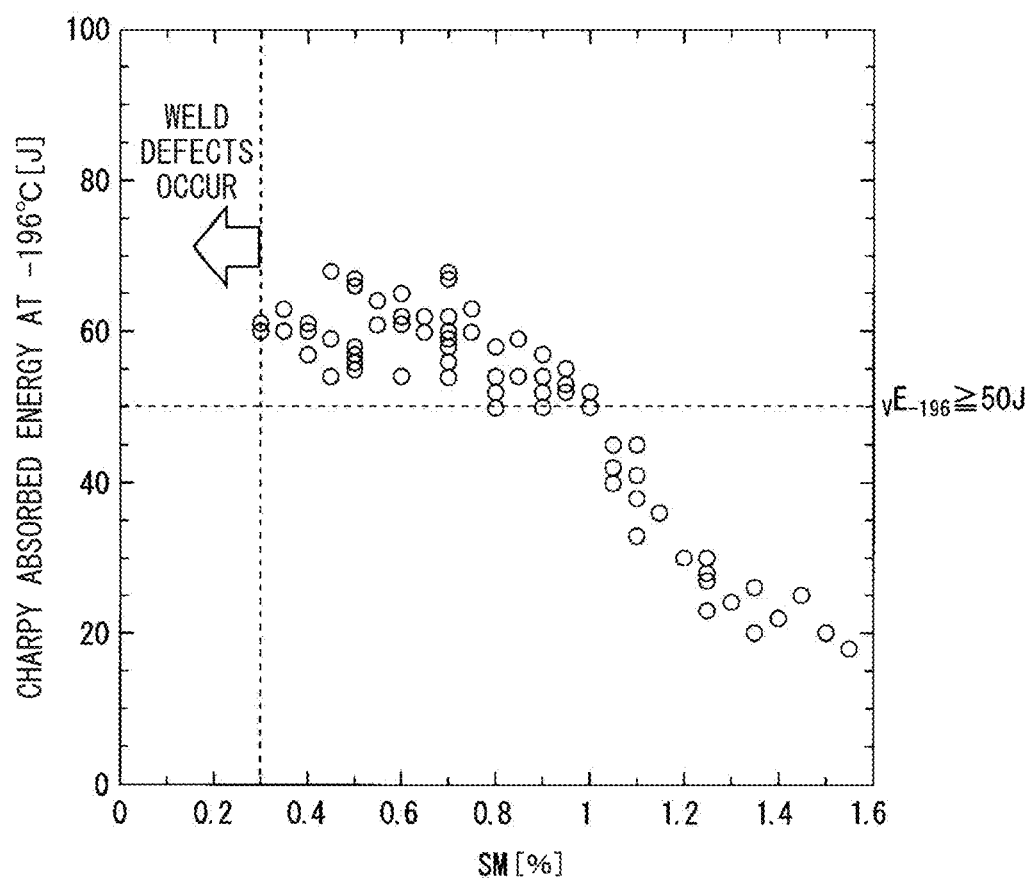
FIG. 1 is a view showing a relationship between SM and Charpy absorbed energy at −196° C. (when the entire outer steel sheath is made of mild steel).

A weld metal of Ni-based steel for low temperature use requires low temperature toughness at −196° C. and an amount of oxygen in the weld metal needs to be reduced to secure absorbed energy at −196° C.

As a method for reducing the amount of oxygen in the weld metal, the use of gas-shielded arc welding using an inert gas may be considered. However, since arcs are unstable and a sound weld metal without weld defects is hardly obtained, the gas-shielded arc welding has not been used.

Thus, only a Ni-based alloy welding material or means for using a method in which welding efficiency is very low such as TIG welding has been used. The former has a problem of very high welding material costs, and the latter has a problem of a very low welding efficiency. Thus, a welding material in which welding material costs are low and welding efficiency is high has not been realized.

The present inventors have performed welding of Ni-based steel for low temperature use using wires, which are a flux-cored wire in which the amount of Ni is reduced at the same level as Ni-based steel for low temperature use and which are prepared with different amounts of $CaF_2$ and a metal oxide at various ratios and further with different amounts of C, Si, Mn, and other alloy elements at various ratios, by gas-shielded arc welding using an inert gas.

As a result, (i) in a specific range of the amounts of $CaF_2$ and the metal oxide, arcs are stable even in the gas-shielded arc welding using an inert gas and a sound weld metal can be obtained. (ii) Not only can an inert gas be used but also the use of an outer steel sheath including Ni enables significant reduction in the amount of oxygen in the weld metal. (iii) In a specific range of the amounts of C, Si, Mn, and other alloy elements, excellent low temperature toughness at −196° C. can be obtained. (iv) In a specific range of the amount of $CaF_2$, the amount of diffusible hydrogen in the weld metal can be significantly reduced. (v) Preheating required for preventing cold cracking which is a problem arising when the amount of Ni is reduced to the same level as Ni-based steel for low temperature use is not required or the preheating can be significantly reduced. The above-described points (i) to (v) have been found.

The present invention has been made based on the results of the above investigations and reasons for limiting characterized technical requirements and preferable embodiments with respect to a flux-cored wire according to an embodiment will be sequentially described below.

First, the reasons why the amounts of an alloy composition, a metal deoxidizing composition, and each composition contained in an outer steel sheath constituting the flux-cored wire of the embodiment and a flux are limited will be described.

In the following description, unless otherwise specified, "%" means "mass % and an amount of each composition means a composition amount which is total mass % of each composition in the outer steel sheath and the flux with respect to a total mass of the wire.

(C: 0.003% to 0.040%)

C is an element for increasing strength and 0.003% or more of C needs to be contained to secure the strength. In order to increase the strength, the lower limit of the amount of C may be 0.005%, 0.008%, 0.010%, or 0.013%. On the other hand, a weld metal containing 6% to 16% of Ni has a hard martensite structure. An influence of C affecting the hardness of martensite is very significant and when the amount of C is more than 0.040%, the weld metal becomes very hard and the toughness significantly decreases. Thus, the upper limit of the amount of C is 0.040%. In order to stably secure the toughness, the upper limit of the amount of C may be 0.035% or 0.030%.

(Si: 0.05% to 0.40%)

Si is an element required for increasing the cleanliness of the weld metal and preventing the generation of weld defects such as a blowhole. In order to obtain these effects, 0.05% or more of Si needs to be contained. In order to prevent the generation of the weld defects, the lower limit of the amount of Si may be 0.09% or 0.14%. On the other hand, Si is easily micro-segregated in the weld metal containing 6% to 16% of Ni. When the amount of Si is more than 0.40%, remarkable embrittlement is caused in the segregated portion, and thus, 0.40% is the upper limit. In addition, the upper limit of the amount of Si may be 0.35% or 0.30% to stably secure the toughness of the weld metal.

(Mn: 0.2% to 0.8%)

Mn is an element required for increasing the cleanliness of the weld metal and detoxifying S by forming MnS to improve toughness. In order to obtain these effects, 0.2% or more of Mn needs to be contained. In order to further improve the toughness, the lower limit of the amount of Mn may be 0.3%, 0.35%, or 0.4%. On the other hand, Mn is easily micro-segregated in the weld metal containing 6% to 16% of Ni. When the amount of Mn is more than 0.8%, remarkable embrittlement is caused in the segregated portion, and thus, 0.8%, is set as an upper limit. In addition, the upper limit of the amount of Mn may be 0.7%, 0.6%, or 0.5% to stably secure the toughness of the weld metal.

(P: 0.02% or less)

P is an impurity element and deteriorates toughness. Thus, the amount of P is necessarily decreased as much as possible. However, as a range in which the adverse effect on toughness is allowable, the amount of P is limited to 0.02% or less. In order to further improve the toughness, the upper limit of the amount of P may be 0.015%, 0.01%, 0.008%, or 0.006%. The lower limit of the amount of P does not need to be limited and the lower limit of the amount of P is 0%.

(S: 0.01% or less)

S is an impurity element and deteriorates toughness. Thus, it is preferable that the amount of S be decreased as much as possible. As a range in which the adverse effect on toughness is allowable, the amount of S is limited to 0.01% or less. In order to further improve the toughness, the upper limit of the amount of S may be 0.008%, 0.006%, 0.004%, or 0.003%. The lower limit of the amount of S does not need to be limited and the lower limit of the amount of S is 0%.

(Al: 0.003% to 0.050%)

Al is a deoxidizing element and is effective in increasing cleanliness similar to Si and Mn. In order to exert the effect, 0.003% or more of Al is contained. On the other hand, when the amount of Al is more than 0.050%, nitrides and oxides are formed and the toughness of the weld metal is deteriorated. Therefore, 0.050% is set as an upper limit. In addition, the lower limit of the amount of Al may be 0.005%, 0.007%, 0.009%, or 0.011% to obtain a sufficient effect of improving the toughness of the weld metal, and the upper limit of the amount of Al may be 0.040%, 0.035%, 0.030%, or 0.025% to suppress the formation of oxides.

(Ni: 6.0% to 16.0%)

Ni is a unique element capable of improving toughness by solid solution toughening (an action of increasing toughness by solid solution) irrespective of a structure and composition and is an element particularly required for securing low temperature toughness at −196° C. In order to obtain this effect, it is necessary to set the amount of Ni to 6.0% or more. On the other hand, when the amount of Ni is more than 16.0%, the effect thereof is saturated and further welding material costs increase excessively, and thus, the aforementioned amount of Ni is not preferable. The upper limit of the amount of Ni may be limited to 14% or 12%. In order to stably secure the low temperature toughness, the lower limit of the amount of Ni may be 6.5%, 7.0%, or 7.5%, or 8.0%.

In addition, Ni may be added to the weld metal mainly from the outer steel sheath. A metal power added as a flux has a thin oxide layer and the layer is an oxygen source of the weld metal. When the outer steel sheath of mild steel is used, it is necessary to add a large amount of metal powder as a flux for the addition of Ni, and oxygen in the weld metal increases due to the metal powder. In order to suppress an increase of oxygen and improve the toughness, Ni may be contained mainly in the outer steel sheath. Therefore, the amount of Ni contained in the outer steel sheath may be 6.0% or more, by mass %, with respect to the mass of the outer steel sheath. The upper limit of the amount of Ni in the outer steel sheath does not need to be particularly limited. However, the upper limit of the amount of Ni in the outer steel sheath may be 18% so that the amount of Ni is 16% or less with respect to the total mass of the wire. The upper limit of the amount of Ni in the outer steel sheath may be 17% or 16% as required.

Since a melting point of a Ni alloy is lower than a melting point of mild steel, the difference between melting points of the outer steel sheath and the flux increases when a Ni alloy is used in the outer steel sheath. Accordingly, the flux is stabilized as a core and thus droplet transfer is more stabilized. For relative comparison, the outer steel sheath made of a Ni alloy has a small amount of oxygen in the weld metal and high low temperature toughness.

In the present invention, for the following purposes, one or more of each element of Cu, Cr, Mo, V, Ti, Nb, B, Mg, and REM can be contained as an optional element.

(Cu: 0% to 0.5%)

Cu has an effect of increasing the strength of the weld metal when Cu is included in plating of the outer steel sheath of the wire or flux of the wire as a single body or an alloy. Although the lower limit of the amount of Cu is 0%, Cu may be contained. If the amount of Cu is more than 0.5%, the toughness is deteriorated. Thus, the amount of Cu is 0.5% or less. In order to improve the toughness, the upper limit of the amount of Cu may be 0.3%, 0.2%, or 0.1%. Here, the amount of Cu includes a part contained in the outer steel sheath and the flux as well as a part of Cu plating if the Cu plating is plated on the surface of the wire. In order to obtain the effect by containing, the lower limit of the amount of Cu may be 0.01%.

(Cr: 0% to 0.5%)

Cr is an effective element for increasing the strength of the weld metal. The lower limit of the amount of Cr is 0%. If Cr is contained, when the amount of Cr is more than 0.5%, the toughness is deteriorated. Thus, the amount of Cr is 0.5% or less. In order to improve the toughness, the upper limit of the amount of Cr may be 0.3%, 0.2%, or 0.1%. In order to obtain the effect by containing, the lower limit of the amount of Cr may be 0.01%.

(Mo: 0% to 0.5%)

Mo is an effective element in increasing the strength of the weld metal by precipitation strengthening. The lower limit of the amount of Mo is 0%. If the amount of Mo when being added is more than 0.5%, the toughness is deteriorated. Thus, the amount of Mo is 0.5% or less. In order to improve the toughness, the upper limit of the amount of Mo may be 0.3%, 0.2%, or 0.1%. In order to obtain the effect by containing, the lower limit of the amount of Mo may be 0.01%.

(V: 0% to 0.2%)

V is an effective element in increasing the strength of the weld metal by precipitation strengthening. The lower limit of the amount of V is 0%. If the amount of V when being added is more than 0.2%, the toughness is deteriorated. Thus, the amount of V when being contained is 0.2% or less. In order to improve the toughness, the upper limit of the amount of V may be 0.15%, 0.1%, or 0.05%. In order to obtain the effect by containing, the lower limit of the amount of V may be 0.01%.

(Ti: 0% to 0.1%)

Ti is effective in alleviating the adverse effect of solid-soluted N on toughness by fixing the solid-soluted N. Further, Ti is effectively used as a deoxidizing element and has an effect of reducing the amount of O in the weld metal. The lower limit of the amount of Ti is 0%. If the amount of Ti when being added is more than 0.1% and the amount of Ti is excessive, carbides are formed and the toughness is deteriorated. Thus, the amount of Ti when being contained is 0.1% or less. In order to improve the toughness, the upper limit of the amount of Ti may be 0.06%, 0.04%, or 0.02%. In order to obtain the effect by containing, the lower limit of the amount of Ti may be 0.005%.

(Nb: 0% to 0.1%)

Nb is effective in increasing the strength of the weld metal by precipitation strengthening. The lower limit of the amount of Nb is 0%. If the amount of Nb when being added is more than 0.1%, coarse precipitates are formed in the weld metal and the toughness is deteriorated. Thus, the amount of Nb when being contained is 0.1% or less. In order to improve the toughness, the upper limit of the amount of Ti may be 0.06%, 0.04%, or 0.02%. In order to obtain the effect by containing, the lower limit of the amount of Nb may be 0.002%.

(B: 0% to 0.01%)

When an appropriate amount of B is contained in the weld metal, B has an effect of alleviating the adverse effect of the solid-soluted N on toughness by being combined with solid-soluted N to form BN. The lower limit of the amount of B is 0%. If the amount of B when being added is more than 0.01%, the amount of B is excessive in the weld metal and the excess B forms coarse BN and B-compounds such as $Fe_{23}(C,B)_6$, which deteriorates toughness. Thus, the amount of B when being contained is 0.01% or less. In order to improve the toughness, the upper limit of the amount of B may be 0.006%, 0.004%, or 0.002%. In order to obtain the effect by containing, the lower limit of the amount of B may be 0.0003%.

(Mg: 0% to 0.6%)

Mg is a strongly deoxidizing element and has an effect of improving toughness by reducing the amount of oxygen in the weld metal. The lower limit of the amount of Mg is 0%. If the amount of Mg when being added is more than 0.6%, the amount of spatter increases and welding efficiency is deteriorated. Thus, the amount of Mg when being contained is 0.6% or less. In order to improve the welding efficiency, the upper limit of the amount of Mg may be 0.4%, 0.2% or 0.1%. In order to obtain the effect by containing, the lower limit of the amount of Mg may be 0.05%.

(REM: 0% to 0.0500%)

When an excessive amount of REM is contained, spattering is violent and welding efficiency is deteriorated. Therefore, the lower limit of the amount of REM is 0%. An effective amount of REM in which the amount of spatter is reduced and arcs are stable when being added is 0.0500% or less. In addition, in order to contribute to spattering reduction and stable arcs, the upper limit of the amount of REM may be 0.0300%, 0.0200%, 0.0100%, 0.0050%, or 0.0010%.

In the flux-cored wire of the embodiment, each element is contained as an alloy composition or a metal deoxidizing composition as described above. However, in order to secure the low temperature toughness at −196° C., it is necessary to set a total amount SM of Si and Mn shown in the following Table 1 to be 0.3% to 1.0%.

$$SM=[Si]+[Mn] \quad \text{(Expression 1)}$$

In the expression, elements noted in brackets express amounts (mass %) of the elements, respectively.

The flux-cored wire of the embodiment enables stable welding during the gas-shielded arc welding in which pure Ar or pure He is used as a shielding gas or a mixed gas in which a ratio of $O_2$ or $CO_2$ in Ar or He is less than 2 volume % is used as a shielding gas. However, a thin oxide layer is present around the metal powder filled in the flux-cored wire and oxygen is introduced into the weld metal although the amount of oxygen is small.

At this time, when the amount of Si and Mn which improves the cleanliness of the weld metal is not sufficient, weld defects such as a blowhole is generated in the weld metal due to oxygen from the wire. In order to prevent such weld defects, it is necessary to contain Si and Mn such that the SM is 0.3% or more. On the other hand, in the weld metal containing 6% to 16% of Ni, Si and Mn are easily micro-segregated and remarkable embrittlement is caused in the segregated portion. When the SM is 1.0% or less, embrittlement is allowable in the segregated portion and thus 1.0% is set as an upper limit. In order to more reliably prevent the weld defects, the lower limit of the SM may be 0.35% or 0.4%.

Figure 2:
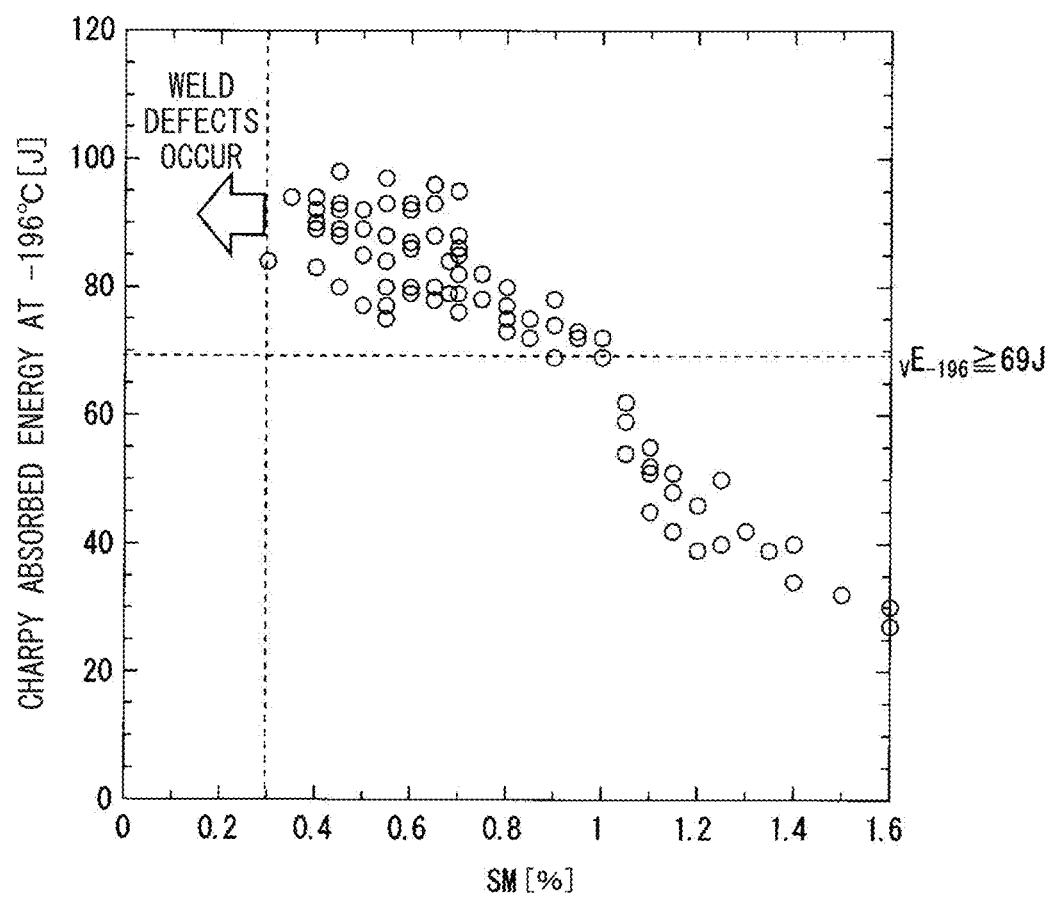
FIG. 2 is a view showing a relationship between SM and Charpy absorbed energy at −196° C. (when the entire outer steel sheath is made of Ni-containing steel).

The experiments by which such findings are obtained are shown in FIGS. 1 and 2. The entire outer steel sheath of the flux-cored wire used in FIG. 1 is made of mild steel, and the entire outer steel sheath of the flux-cored wire used in FIG. 2 is made of Ni-containing steel. FIGS. 1 and 2 show relationships between Charpy absorbed energy at −196° C. and SM of a wire obtained using a test piece that is prepared from a weld metal obtained by preparing flux-cored wires which satisfy the requirements of the present invention except that the SM value is different, and performing welding using the wires in the same manner as in examples which will be described later.

As seen from FIG. 1, in the wire in which Si and Mn are added such that the SM is 0.3 to 1.0, the Charpy absorbed energy at −196° C. was 50 J or more. As seen from FIG. 2, in the wire in which Si and Mn are added such that the SM is 0.3 to 1.0, the Charpy absorbed energy at −196° C. was 69 J or more. When the entire outer steel sheath is made of mild steel, in order to stably secure an absorbed energy of 50 J or more, the upper limit of the SM may be 0.9%, 0.8%, 0.75%, or 0.70%. When the entire outer steel sheath is made of Ni-containing steel, in order to stably secure an absorbed energy of 69 J or more, the upper limit of the SM may be 0.9%, 0.8%, 0.75%, or 0.70%.

(Carbon equivalent Ceq: 0.250% to 0.525%)

Further, in the flux-cored wire of the embodiment, the amounts of C, Si, Mn, Ni, Cr, Mo, and V are adjusted so that a carbon equivalent Ceq, expressed by the following expression 2 and defined by the Japan Welding Engineering Society (WES), is 0.250% to 0.525%.

$$Ceq=[C]+[Si]/24+[Mn]/6+[Ni]/40+[Cr]/5+[Mo]/4+[V]/14 \quad \text{(Expression 2)}$$

In the expression, elements noted in brackets express amounts of the elements, by mass %, respectively.

Although the tensile strength of the weld metal is increased as the Ceq value increases, the toughness is deteriorated and the weld cracking parameter is increased as the Ceq value increases. Thus, a countermeasure for preventing cold cracking is required. When the Ceq value is less than 0.250%, a target strength (tensile strength) of the weld metal of 660 MPa or more cannot be satisfied. On the other hand, when the Ceq value is more than 0.525%, the tensile strength of the weld metal becomes excessive and the toughness of the weld metal is deteriorated. Therefore, the range of the Ceq is from 0.250% to 0.525%. In order to stably secure the strength, the lower limit of the Ceq value may be 0.290%, 0.330%, or 0.370%. In order to improve the toughness, the upper limit of the Ceq may be 0.490%, 0.460%, or 0.430%.

Here, the amount of the elements contained in the wire as the above alloy composition and metal deoxidizing composition does not include the amount of the elements when the elements are contained as a metal fluoride, a metal oxide, and a metal carbonate.

In addition, these elements are not necessarily pure substances (impurities may be contained) and there is no problem even when the elements may be contained in the form of alloys such as Fe—Mn and Cu—Ni. Further, even when these elements are contained in the outer steel sheath, or as the flux, the same effect is exerted. Thus, the elements may be contained in any of the outer steel sheath and the flux.

Subsequently, a flux composition which is inserted into the outer steel sheath of the wire will be described.

(Total amount $\alpha$ of metal fluoride including $CaF_2$ as main composition: 2.0% to 7.0%)

In the related art, in the gas-shielded arc welding using an inert gas, a thermal pinch force and electromagnetic pinch force generated during welding are small, and thus, a droplet formed at the tip end of the wire does not drop from the wire and the molten portion extends like a liquid column. The molten portion is swayed like a whip by affection of a plasma airflow and magnetic blow. Then, the state of arcs becomes very unstable and welding is not possible.

In the embodiment, when a metal fluoride including $CaF_2$ as a main composition was used as a flux composition for the flux-cored wire, stable welding was possible even in gas-shielded arc welding using an inert gas. The outer steel sheath melts under the arcs. However, since the metal fluoride has a low electric conductivity, the flux inside the wire does not melt completely and remains as a core, and the core of the flux is introduced straightly into a molten pool without swaying like a whip. At this time, the molten outer steel sheath is moved to the molten pool along the core of the flux, and thus, stable welding is possible.

In order to make stable welding possible even in the gas-shielded arc welding using an inert gas, it is necessary to contain the metal fluoride including $CaF_2$ such that when a total amount thereof is defined as a, the $\alpha$ is 2.0% or more and a ratio ($[CaF_2]/\alpha$) of the amount of $[CaF_2]$ with respect to the $\alpha$ is 0.90% or more. The larger the amount of $CaF_2$ is, the more preferable it is. The lower limit of the ratio may be 0.93, 0.96, 0.98, or 0.99. There is no problem when the ratio is 1.0 and only $CaF_2$ is used.

When the total amount $\alpha$ of the metal fluoride is less than 2.0%, the core of the flux remains insufficient during the welding and thus welding is unstable. On the other hand, when the total amount $\alpha$ of the metal fluoride is more than 7.0%, excessive welding fume is generated and welding is unstable. Thus, the above total amount is not preferable.

In order to secure more stable weldability even in the gas-shielded arc welding using an inert gas, the lower limit of the total amount $\alpha$ of the metal fluoride may be 2.2%, 2.4%, 2.6%, 2.8%, 3.0%, 3.2%, or 3.4%, and the upper limit of the total amount $\alpha$ of the metal fluoride may be 6.5%, 6.0%, 5.5%, or 5.0%.

As the metal fluoride, in addition to $CaF_2$, one or more of $BaF_2$, $SrF_2$, $MgF_2$, and $LiF$ can be contained as required. However, from the viewpoint of securing arc stability and suppressing spattering, a ratio of the amount of $CaF_2$ with respect to a total amount of $CaF_2$, $BaF_2$, $SrF_2$, $MgF_2$, and $LiF$ has to be 0.90 or more. When the ratio is less than 0.90, the arc stability is deteriorated. The higher the ratio of $CaF_2$ is, the more preferable it is. The ratio may be 0.93% or more, 0.96% or more, 0.98% or more, or 0.99% or more. There is no problem when the ratio of $CaF_2$ is 100%.

In addition to the above-described actions, the metal fluoride also has an action of reducing the amount of diffusible hydrogen in the weld metal.

The weld metal containing 6% to 16% of Ni has a very hard martensite structure. Therefore, preheating is required for preventing cold cracking. However, since the metal fluoride can reduce the amount of diffusible hydrogen in the weld metal, the metal fluoride makes it possible that welding is performed with omitting or simplifying preheating required to prevent cold cracking.

The fact that the metal fluoride has an action of reducing the amount of diffusible hydrogen is known by a covered arc electrode. However, an example in which a diffusible hydrogen reduction in the flux-cored wire is investigated in detail does not exist. In the embodiment, the most suitable form for reducing the diffusible hydrogen has been found in consideration of other flux compositions, mechanical properties of the weld metal, welding workability, or the like.

The reason why the metal fluoride reduces the diffusible hydrogen is that the metal fluoride is decomposed by welding arcs, the generated fluorine is bonded with hydrogen and dispersed in the air as a HF gas, or hydrogen is fixed in the weld metal as a HF gas without any change.

(Ti oxide: 0% to 0.4%)

In order to improve low temperature toughness by reducing the amount of oxygen in the weld metal, it is preferable to reduce the amount of $TiO_2$, included as Ti oxide, as much as possible. Therefore, the lower limit of $TiO_2$ is 0%. On the other hand, in order to obtain good bead formability, slag peelability, and arc stability, it is preferable to add $TiO_2$. Therefore, the lower limit of the amount of $TiO_2$ may be 0.05%, 0.1%, 0.13%, 0.16%, or 0.19%. When the amount of $TiO_2$ is more than 0.4%, oxygen included in $TiO_2$ is introduced into the molten pool and thus the amount of oxygen in the weld metal increases and the absorbed energy at ductile fracture decreases. Thus, the upper limit is 0.4%. The upper limit of the amount of $TiO_2$ may be 0.35%, 0.31%, 0.27%, or 0.24% as required. When the low temperature toughness is emphasized, the upper limit of the amount of $TiO_2$ may be 0.2%, 0.15%, 0.12%, or 0.09%.

(Si oxide: 0.2% to 0.5%)

$SiO_2$, included as Si oxide, is necessary to arrange the form of slag and make slag peeling easy after welding. In order to exert the effect, the amount of $SiO_2$ is necessarily 0.2% or more. The lower limit of the amount of $SiO_2$ may be 0.23%, 0.26%, or 0.29%. However, when the amount of $SiO_2$ contained is more than 0.5%, oxygen included in the $SiO_2$ is introduced into the molten pool and the amount of oxygen in the weld metal increases and the absorbed energy at ductile fracture decreases. Therefore, 0.5% is set as an upper limit. The upper limit of the amount of $SiO_2$ may be 0.45%, 0.39%, 0.37%, or 0.34%.

(Total amount of metal oxide: 0.2% to 0.9%)

In the flux-cored wire of the embodiment, as a slag forming agent one or more metal oxides such as a Ti oxide, a Si oxide, a Mg oxide, an Al oxide, a Zr oxide, and a Ca oxide, for example, $TiO_2$, $SiO_2$, $MgO$, $Al_2O_3$, $ZrO_2$, and $CaO$, are included. These metal oxides are included to maintain a good weld bead shape. In order to obtain the appropriate effect of the metal oxides, when a total amount of the metal oxides is defined as $\beta$, it is necessary to set the lower limit of the $\beta$ to be 0.2%. However, when the total amount $\beta$ of the metal oxides is more than 0.9%, the amount of oxygen in the weld metal increases and the toughness is deteriorated. Thus, the above total amount is not preferable.

The total amount of these metal oxides includes, in addition to the total amount of $TiO_2$, $SiO_2$, $MgO$, $Al_2O_3$, $ZrO_2$, and $CaO$, an amount of a metal oxide included in a binder or the like which is used in flux granulation. In order to reliably obtain the effect of these metal oxides, the lower limit of the total content of the metal oxides may be 0.25%, 0.3%, 0.35%, 0.4%, 0.45%, or 0.5%. Further, in order to suppress deterioration in the toughness of the weld metal due to the containing of the metal oxides as much as possible, the upper limit of the total amount 13 of the metal oxides may be 0.8%, 0.7%, or 0.6%.

(Arc stabilizer: 0% to 0.50%)

Additionally, an arc stabilizer may be further contained in the flux. As the arc stabilizer, there are oxides or fluorides of Na or K (for example, $Na_2O$, $NaF$, $K_2O$, $KF$, $K_2SiF_6$, and $K_2ZrF_6$) or the like, and the total amount thereof is 0% to 0.50%. Since the arc stabilizer may not be necessarily contained, the lower limit of the total amount of oxides or fluorides of Na or K is 0%. In addition, since arcs become stronger and the amount of spatter increases, the upper limit is 0.50%. The oxides and fluorides as the arc stabilizer described as an example herein may not include the above-described metal oxides functioning as the slag forming agent and metal fluorides used to reduce the amount of diffusible hydrogen. When the amount of the oxides and fluorides of Na and K is large, arcs become stronger and the amount of spatter increases. Thus, the total amount of the compounds may be limited to 0.40% or less, 0.30% or less, or less than 0.20%, 0.10% or less, as required.

In addition to the amount of each of the above-described metal oxides and metal fluorides, it is necessary that a ratio $(\alpha/\beta)$ of the total amount $\alpha$ of the metal fluoride with respect to the total amount $\beta$ of the metal oxide expressed by mass % satisfy 3.0 or more and 15.0 or less.

When the value of $\alpha/\beta$ is less than 3.0, the amount of oxygen in the weld metal increases, which causes a decrease in the absorbed energy. When the value of $\alpha/\beta$ is more than 15.0, arcs easily become unstable in the gas-shielded arc welding using an inert gas. As required, the lower limit of $\alpha/\beta$ may be 3.5 or 4.0, and the upper limit thereof may be 14.0, 13.0, or 12.0. In addition, it is important to control the value of the ratio $\alpha/\beta$ to obtain the effect of reducing the amount of diffusible hydrogen, and the effect of reducing the amount of diffusible hydrogen can be obtained as long as the value is within the range of the embodiment.

(Ca oxide: less than 0.20%)

In the embodiment, the amount of CaO, included as Ca oxide, contained in the flux is limited. CaO is contained as a raw material for the flux in some cases. Even in this case, the amount of CaO is limited to less than 0.20%, by mass %, with respect to the total mass of the flux-cored wire. When the amount of CaO is limited to less than 0.20%, the effects of the present invention can be obtained. That is, the raw material for the flux is preferably selected such that the upper limit of the amount of CaO is less than 0.20%. As required, the upper limit of the amount of CaO may be limited to less than 0.18%, less than 0.15%, less than 0.12%, less than 0.10%, less than 0.08%, less than 0.06%, or less than 0.04%. The lower limit of the amount of CaO may be 0%. Due to the selection of the raw material for the flux, the lower limit of the amount of CaO may be 0.01% or 0.005%.

Since CaO is changed to CaOH which is a compound including hydrogen by being exposed to the air, the amount of diffusible hydrogen in the weld metal is increased. The experiments from which such finds are obtained are shown in FIGS. 3 and 4.

Figure 3:
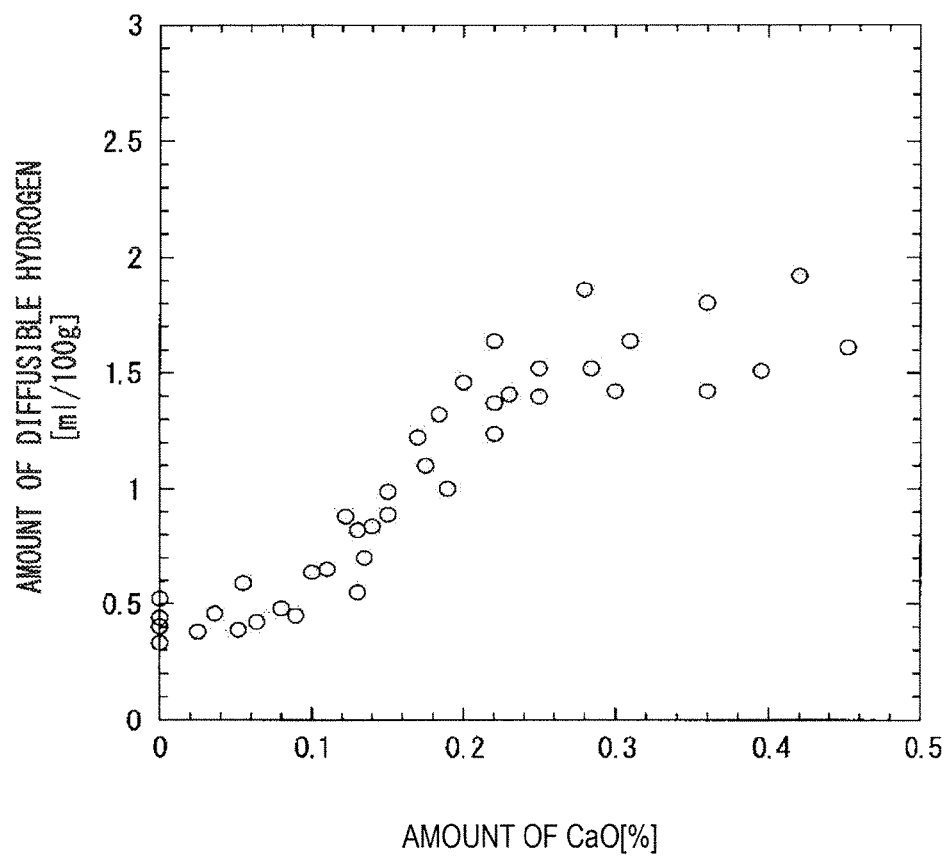
FIG. 3 is a view showing a relationship between an amount of CaO and an amount of diffusible hydrogen (when the entire outer steel sheath is made of mild steel).

FIG. 3 shows a relationship between the amount of CaO in flux-cored wires and the amount of diffusible hydrogen obtained by preparing flux-cored wires which satisfy the requirements of the present invention except that the value of CaO is different and which have the entire outer steel sheath being made of mild steel, performing welding using the wires, and measuring an amount of diffusible hydrogen in obtained weld metals in the same manner as in examples which will be described later.

Figure 4:
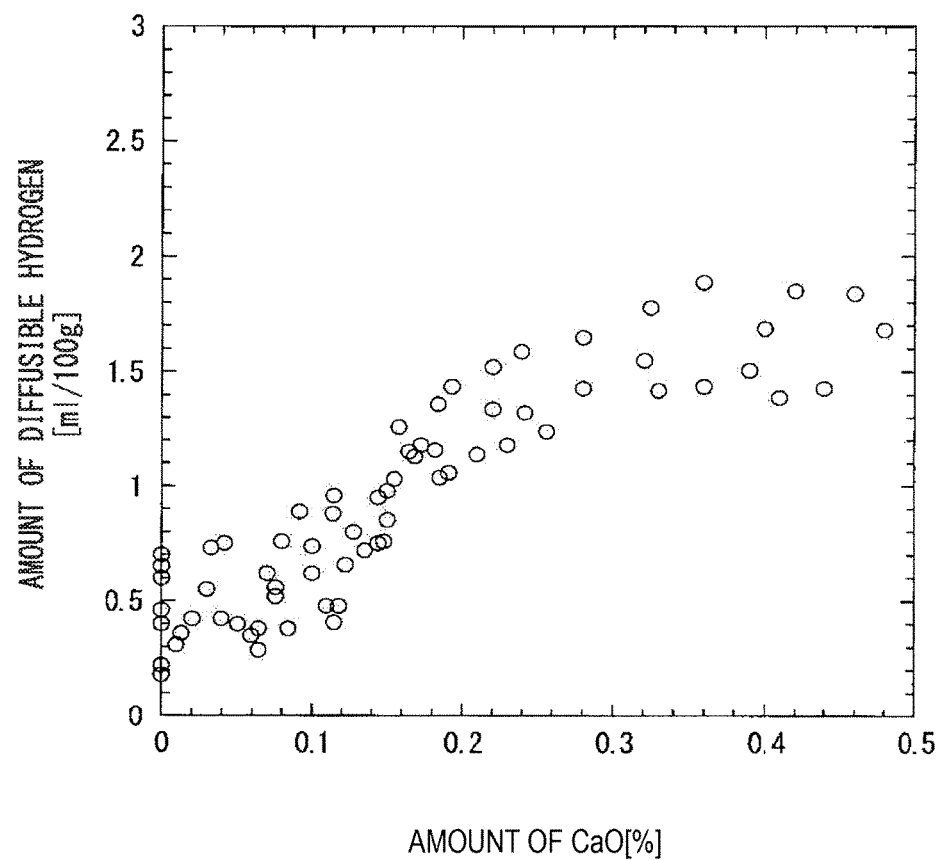
FIG. 4 is a view showing a relationship between an amount of CaO and an amount of diffusible hydrogen (when the entire outer steel sheath is made of Ni-containing steel).

FIG. 4 shows a relationship between the amount of CaO in flux-cored wires and the amount of diffusible hydrogen obtained by preparing flux-cored wires which satisfy the requirements of the present invention except that the value of CaO is different and which have the entire outer steel sheath being made of Ni-containing steel, performing welding using the wires, and measuring an amount of diffusible hydrogen in obtained weld metals in the same manner as in examples which will be described later.

From FIGS. 3 and 4, as the amount of CaO increases, the amount of diffusible hydrogen in the weld metal increases. Until the amount of CaO reaches 0.20%, an amount of diffusible hydrogen of 1.5 ml/100 g or less can be obtained. The amount of CaO is less than 0.20%, since the effect of reduction of preheating can be obtained when the amount of diffusible hydrogen is 1.5 ml/100 g or less. That is, the raw material for the flux is selected such that the ranges are satisfied.

(Metal carbonate: less than 0.60%)

For the purpose of an action of stabilizing arcs and increasing arc convergence, the flux-cored wire of the embodiment may contain one or more metal carbonates of $CaCO_3$, $BaCO_3$, $SrCO_3$, $MgCO_3$, and $Li_2CO_3$. When a total amount of metal carbonates is 0.60% or more, arc convergence becomes excessively stronger and the amount of spatter generated increases. Therefore, the total amount of the metal carbonates is less than 0.60%. As required, the total amount may be 0.40% or less, 0.20% or less, 0.10% or less, or 0.07% or less. These metal carbonates are not necessarily contained in the wire and the lower limit thereof is 0%.

(Iron powder: less than 5%)

An iron powder is contained in the flux-cored wire to adjust a flux filling rate in the flux-cored wire or improve deposition efficiency in some cases as required. However, since the surface layer of the iron powder is oxidized, the amount of oxygen in the weld metal may increase and the toughness may be deteriorated when the flux contains excessive ion powder. Accordingly, the iron powder may not be contained. That is, the lower limit thereof is 0%. When the iron powder is contained to adjust the filling rate, the upper limit of the amount of the iron powder is less than 5% to secure the toughness of the weld metal.

The reason why the chemical composition of the flux-cored wire of the embodiment is limited has been described above. Other alloy chemical compositions as a remainder are iron and impurities. The iron composition includes iron of the outer steel sheath, an iron powder included in the flux, and iron in alloy compositions. In addition, a remainder including iron as a main composition may contain impurities entering during the manufacturing process in a range not inhibiting the characteristics of the present invention.

(Filling rate: 5.0% to 30.0%)

Since a hollow space inside the outer steel sheath is filled with the flux, there is an upper limit in a filling rate. The upper limit of the filling rate varies depending on the thickness of the outer steel sheath. However, a preferable value of upper limit of the filling rate is 30.0% to stably add the flux. The upper limit of the filling rate may be 25.0%, 20.0%, or 15.0%. In addition, regarding the lower limit of the filling rate, when the filling rate is too low, the flux filling the inside of the outer steel sheath does not have a frictional force with the outer steel sheath and can be moved and thus, there is a concern of a dense flux. Therefore, the lower limit of the filling rate is preferably 5%.

Subsequently, the shape of the flux-cored wire will be described.

The flux-cored wire can be roughly divided into a seamless wire in which a slit-shaped gap does not exist in the outer steel sheath, and a wire with a seam in which a slit-shaped gap exists in the outer steel sheath.

In the present invention, any cross-sectional structure can be employed. However, in order to prevent cold cracking of the weld metal, it is preferable to form a (seamless) wire in which a slit-shaped gap does not exist.

In addition, in order to improve the feedability of the wire during the welding, a lubricant can be applied onto the surface of the wire. As the lubricant for a weld wire, various kinds of lubricants can be used. However, in order to prevent the cold cracking of the weld metal, a perfluoropolyether oil (PFPE oil) is preferably used.

Hydrogen penetrated into the weld portion during the welding diffuses into the weld metal and steel, is accumulated in a stress concentration portion, and causes cold cracking. Examples of the hydrogen source include moisture that the welding material holds, moisture entering from the air, and rust or scales adhering onto the surface of the steel. In the welding in which the cleanliness of the weld portion and conditions for gas-shielding are sufficiently managed, hydrogen contained mainly as moisture in the wire is a major cause for diffusible hydrogen present in the weld joint.

Therefore, it is preferable to suppress penetration of hydrogen in the air from the outer steel sheath to the flux in a period from the manufacturing of the wire to the use of the wire by using a (seamless) tube in which a slit-shaped gap does not exist for the outer steel sheath.

When a tube (with a seam) in which a slit-shaped gap exists is used for the outer steel sheath, the moisture in the air easily penetrates into the flux from the slit-shaped gap (seam portion) on the outer steel sheath and in this state, the penetration of the hydrogen source such as moisture cannot be prevented. Accordingly, when the period from the manufacturing of the wire to the use of the wire is long, it is preferable that the entire wire be vacuum-packed or stored in a container in which the wire can be stored in a dried state.

In the present invention, the tensile strength of the weld metal has the same level as that of high strength steel having a tensile strength of 660 MPa to 900 MPa. The tensile strength of the weld metal can be measured in such a manner that a tensile test defined in Japanese Industrial Standards JIS Z 3111-2005 is performed on the weld metal of the weld joint prepared using the flux-cored wire. Further, a good correlation between hardness and tensile strength has been known. The tensile strength of the weld metal may be obtained by measuring the hardness of the weld metal of the weld joint and converting the hardness into the tensile strength using the correlation. The lower limit of the tensile strength of the weld metal may be limited to 685 MPa and the upper limit thereof may be limited to 830 MPa as required.

The flux-cored wire used in the embodiment can be manufactured in the same manufacturing steps as in a method for manufacturing a typical flux-cored wire.

That is, first, a steel strip which becomes the outer steel sheath and a flux in which a metal fluoride, an alloy composition, a metal oxide, a metal carbonate, and an arc stabilizer are blended so as to have a predetermined amount are prepared. While being fed in the longitudinal direction, a steel strip is formed into an open tube (U-shaped tube) by a forming roll to be set as an outer steel sheath, the flux is supplied from an opening portion of the open tube in the middle of the forming, and edge surfaces facing each other at the opening portion is subjected to butt seam welding by electric sewing welding, laser beam welding, or TIG welding. The tube having no gap obtained by the welding is wire-drawn and is subjected to annealing in the middle of the wire-drawing or after the completion of the wire-drawing so as to obtain a (seamless) wire having no slit-shaped gap and a predetermined wire diameter and including the flux to fill the inside of the outer steel sheath. In addition, a wire (with the seam) in which a slit-shaped gap exists can be obtained by supplying the flux from the opening portion of the open tube, forming a tube having a gap on which seam welding is not performed, and wire-drawing the tube.

Figure 5:
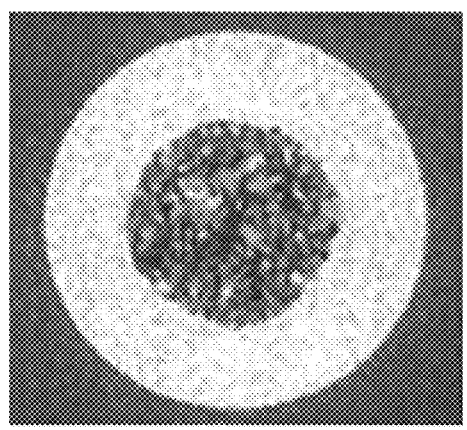
FIG. 5 is a cross-sectional view of a cut wire.
Figure 5:
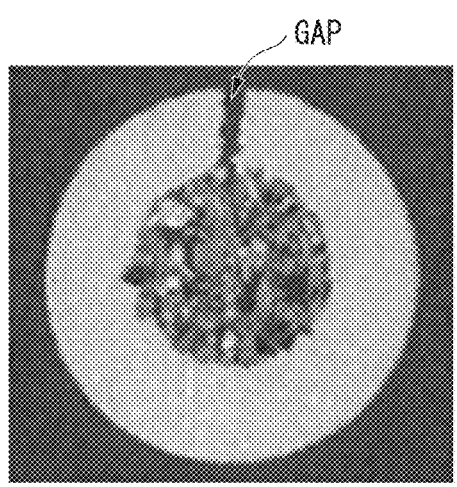
Figure 5:
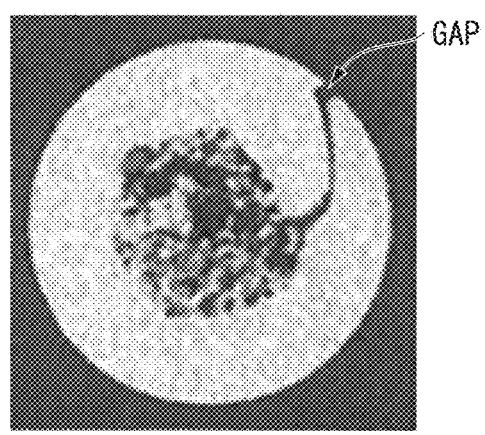

Here, the shape of the seamless wire, particularly, the cross sectional structure thereof will be described using FIGS. 5A to 5C. FIGS. 5A to 5C are views showing cross sections of the wires.

A cross section of a wire which is prepared by butt seam welding and has no slit-shaped gap can be seen as in FIG.

5A. When this cross section is polished and etched, a welding trace is observed. However, when the wire is not etched, the welding trace is not observed. Therefore, the wire is called a seamless wire in some cases. In "1000 numbers of Q and A of Bonding and Joining Technology", compiled by the editorial committee of 1000 numbers of Q and A of Bonding and Joining Technology, and published by Industrial Technology Center Incorporated, p. 564, the wire is described as a seamless type. Further, even when a gap exists as shown in FIGS. 5B and 5C, the wire is butted and brazed, or caulked and brazed and then a wire in which a slit-shaped gap does not exist can be obtained. In FIGS. 5B and 5C, the wire on which brazing is not performed is a wire in which a slit-shaped gap exists as shown in the drawings.

The flux-cored wire of the embodiment may be used for performing gas-shielded arc welding on Ni-based steel for low temperature use including 5.5% to 5.9% of Ni. Steel having an amount of Ni of 5.5% to 5.9%, a thickness of 6 mm or more and 100 mm, a tensile strength of 660 MPa to 900 MPa, and a Charpy absorbed energy at −196° C. of 41 J or more or 50 J or more is used for an LNG storage tank. When the steel is subjected to welding, the flux-cored wire of the embodiment can be used to manufacture a weld joint. In this case, a person having substantial experience in welding for LNG tank may manufacture weld joint having good characteristics only with taking care of selection of shielding gas.

Pure Ar gas or Pure He gas may be used for the shielding gas used to weld. In addition, even if the pure Ar gas or the pure He gas are mixed with 1.5 volume % or less of $O_2$ or 1.5 volume % or less of $CO_2$, the effect according to the present invention can be obtained.

Figure 6:
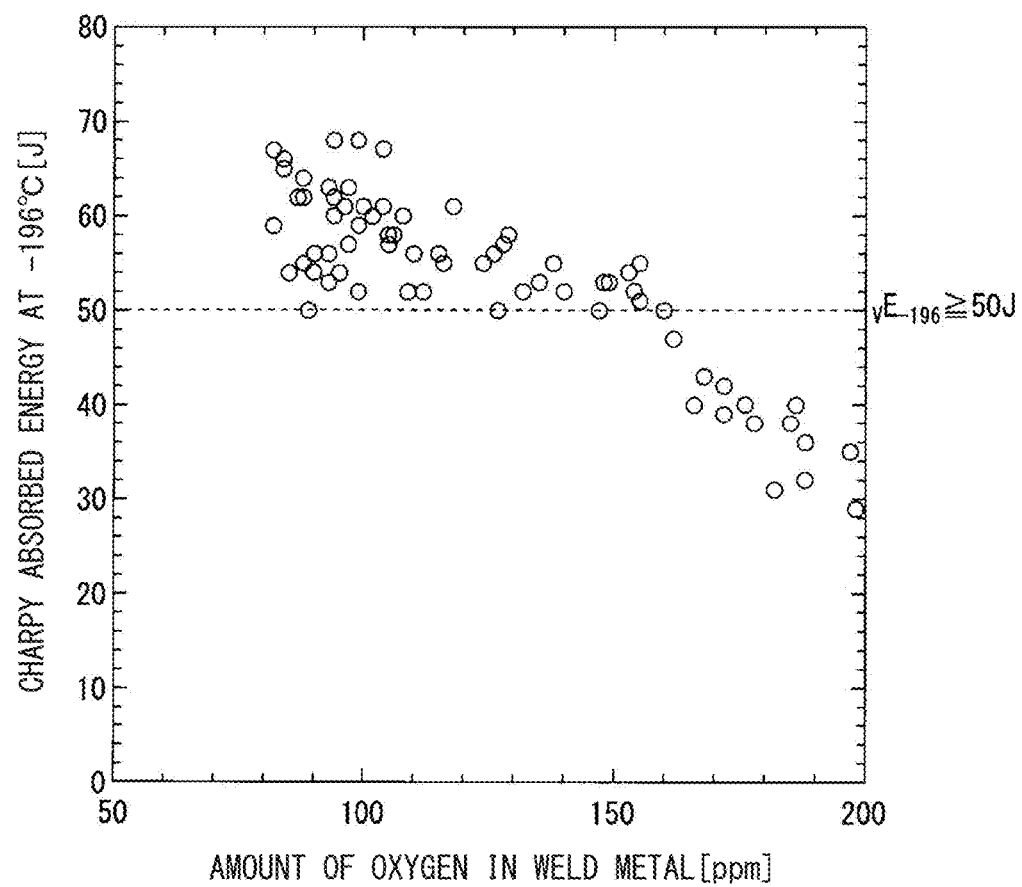
FIG. 6 is a view showing a relationship between an amount of oxygen in a weld metal and Charpy absorbed energy at −196° C. (when the entire outer steel sheath is made of mild steel).
Figure 7:
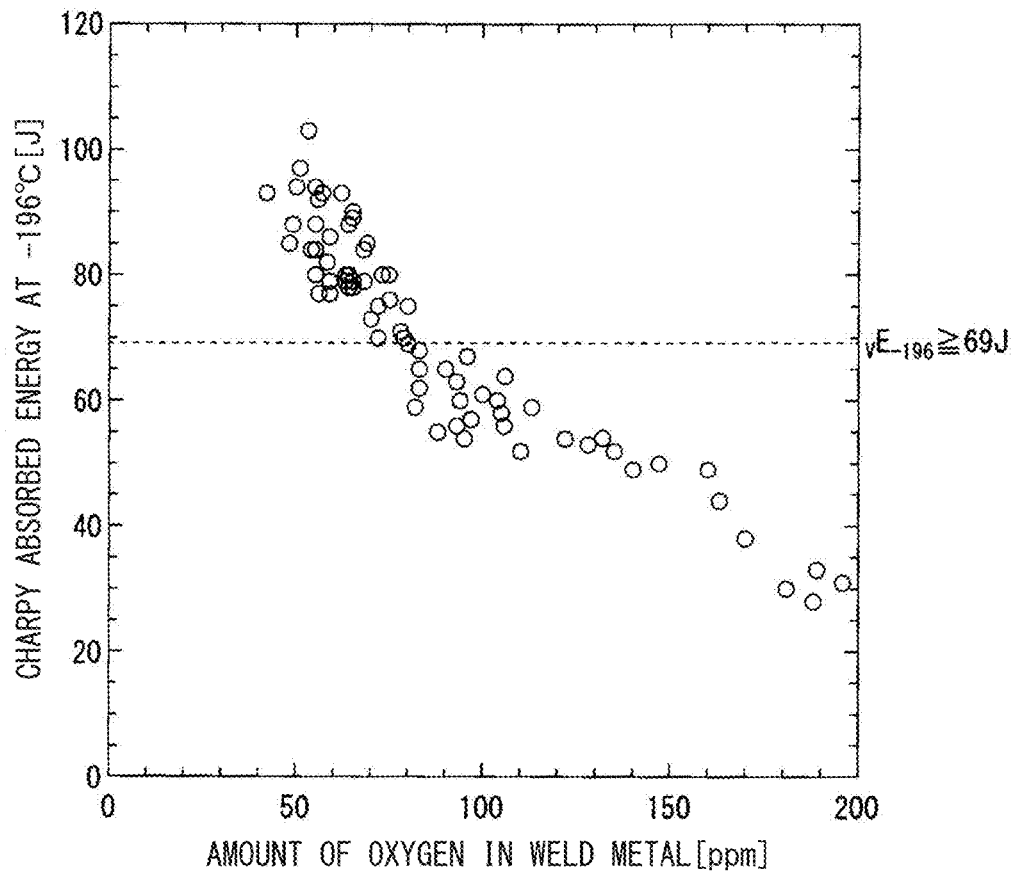
FIG. 7 is a view showing a relationship between an amount of oxygen in a weld metal and Charpy absorbed energy at −196° C. (when the entire outer steel sheath is made of Ni-containing steel).

The experiment results obtained from such findings are shown in FIGS. 6 and 7. FIGS. 6 and 7 show results obtained by welding 9% Ni steels with a pure Ar gas, a mixed gas of Ar with $O_2$ at various concentrations, a mixed gas of Ar with $CO_2$ at various concentrations, a pure He gas, a mixed gas of He with $O_2$ at various concentrations, or a mixed gas of He with $CO_2$ at various concentrations as a shielding gas and with the flux-cored wire having the chemical composition of the embodiment and then measuring the amount of oxygen and the Charpy absorbed energy at −196° C. of the weld metals. Here, the entire outer steel sheaths of the flux-cored wires used in FIG. 6 are made of mild steel, and the entire outer steel sheaths of the flux-cored wires used in FIG. 7 are made of Ni-containing carbon steel. The amounts of Ni in the Ni-containing steels are 6% to 18%.

In FIG. 6, when a mixed gas in which $O_2$ or $CO_2$ was contained in the pure Ar gas or the pure He gas within a range of 1.5 volume % or less was used, the amounts of oxygen in all of the weld metals were 160 ppm or less. Further, when the amounts of oxygen in the weld metals were 160 ppm or less, Charpy absorbed energy thereof at −196° C. is 50 J or more.

In FIG. 7, when a mixed gas in which $O_2$ or $CO_2$ was contained in the pure Ar gas or the pure He gas within a range of 1.5 volume % or less was used, the amounts of oxygen in all of the weld metals were 80 ppm or less. In addition, when the amounts of oxygen in the weld metals were 80 ppm or less, Charpy absorbed energy thereof at −196° C. is 69 J or more.

As described above, the shielding gas used to weld is preferably pure Ar gas, pure He gas, a mixed gas of the pure Ar gas and 1.5 volume % or less of $O_2$ or $CO_2$, or a mixed gas of the pure He gas and 1.5 volume % or less of $O_2$ or $CO_2$. On the other hand, a mixed gas of the pure Ar gas and more than 1.5 volume % of $O_2$ or $CO_2$ or a mixed gas of the pure He gas and more than 1.5 volume % of $O_2$ or $CO_2$, for example, a mixed gas of the pure Ar gas and 2.5 volume % or less of $O_2$ or $CO_2$ or a mixed gas of the pure He gas and 2.5 volume % or less of $O_2$ or $CO_2$, may be used. In this case, it is important to add two or more of Al, Ti, and Mg, which are deoxidizing compositions, in the wire with high content to decrease an amount of $O_2$ in the weld metal.

In particular, in a case in which a mixed gas of the pure Ar gas and more than 1.5 volume % of $O_2$ or $CO_2$ or a mixed gas of the pure He gas and more than 1.5 volume % of $O_2$ or $CO_2$ are used, it is preferable an amount of either one of Al, Ti, and Mg included in the wire is 70% or more of the upper limit of Al, Ti, and Mg defined in the present embodiments. For example, it is preferable to use a wire in which chemical compositions except the metal fluorides, the metal oxides, and the metal carbonates include, by mass %, with respect to the total mass of the flux-cored wire, one or more of 0.035% or more of Al, 0.07% or more of Ti, or 0.42% or more of Mg.

EXAMPLES

Hereinafter, the feasibility and effects of the present invention will be described in more detail using examples.

While being fed in the longitudinal direction, a steel strip was formed into an open tube by a forming roll and the flux was supplied from an opening portion of the open tube in the middle of the forming, and edge surfaces facing each other at the opening portion was subjected to butt seam welding to form a tube in which a slit-shaped gap did not exist. Annealing was applied to the tubulated wire in the middle of the wire-drawing to prepare a flux-cored wire having a final wire diameter of φ 1.2 mm. After the wire was prepared, a lubricant was applied onto the surface of the wire.

As an outer steel sheath (hoop), an outer steel sheath made of mild steel including C: 0.003%, Si: 0.03%, Mn: 0.11%, P: 0.006%, S: 0.003%, Al: 0.003%, and a remainder consisting of Fe and impurities, or an outer steel sheath made of Ni-containing steel shown in Table 1 was used. Here, all of % means mass % with respect to a total mass of the outer steel sheath.

In Tables 2-1, 2-3, 2-5, 2-7, 2-9, 2-11, 2-13, and 2-15, a plant oil was applied to all wires without a description of "PFPE oil applied". In addition, some of the wires were formed into tubes having a slit-shaped gap on which seam welding was not performed, and wire-drawn to prepare flux-cored wires having a wire diameter of φ 1.2 mm. In a case of a wire in which a slit-shaped gap existed, the entire wire was stored in a container in which the wire was able to be vacuum-packaged and stored in a dried state until welding was performed.

The flux-cored wire was analyzed in the following manner. The flux-cored wire was divided into an outer steel sheath and a flux by extracting the flux filling the wire from the wire. The metal compositions of the outer steel sheath were measured by chemical analysis. The constituents and compositions of the flux were quantitatively evaluated by X-ray diffraction and fluorescence X-ray analysis and then were separated into slag and an alloy using a concentration method such as flotation concentration or magnetic concentration, and each of the slag and alloy was analyzed by chemical analysis or gas analysis.

The chemical compositions of the prepared flux-cored wires are shown in Tables 2-1 to 2-16 and 3-1 to 3-16. In addition, in Tables 3-9, 3-11, 3-13, and 3-15, numbers of the hoop materials in Table 1 used for the outer steel sheath of the wire are also shown. The chemical compositions of the flux-cored wires shown in Tables 2-1 to 2-16 and 3-1 to 3-16 are results obtained by analyzing the wires by the above-described analyzing methods. The term "mass %" in Tables 2-1 to 2-16 and 3-1 to 3-16 means mass % with respect to a total mass of the wire (including the outer steel sheath and the flux). For example, Ni in Tables 3-1, 3-3, 3-5, and 3-7 is not contained in the outer steel sheath but contained completely as a Ni powder.

Figure 8:
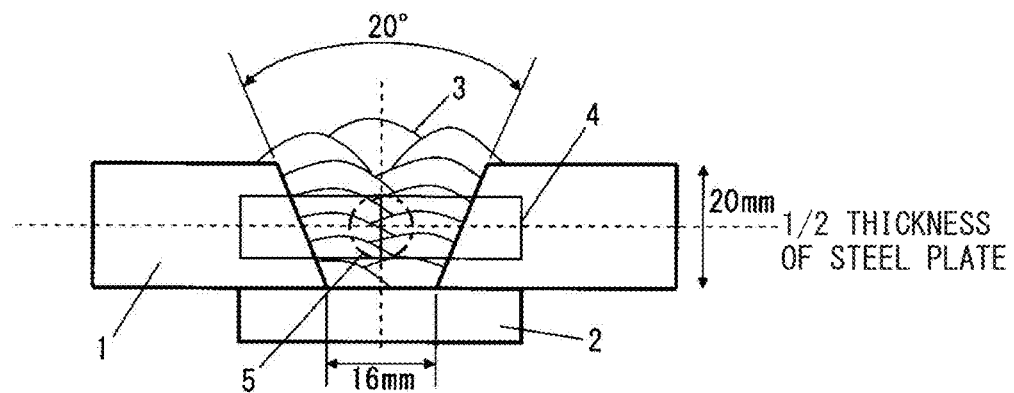
FIG. 8 is a view showing a position where a test piece is collected in an example (JIS Z 3111-2005).

Using the flux-cored wires shown in Tables 2-1 to 2-16 and 3-1 to 3-16, the mechanical properties of the weld metal according to JIS Z 3111 (2005) were evaluated. That is, a method as shown in FIG. 8 (the symbol of the test plate 1.3) was used. A steel plate 1 (base metal number: P2) having a thickness of 20 mm shown in Table 6 was butted at a groove angle of 20° with a root opening of 16 mm, and using a backing metal 2. Weld bead is indicated by a symbol 3 in the drawing. As the steel plate 1 and the backing metal 2, SM 490 A (JIS G 3106) was used. Buttering with two or more layers and with 3 mm or more of excess weld metal was performed on the groove face of the steel plate 1 and the surface of the backing metal 2 using the flux-cored wire to be subjected to a test. Then, welding was performed with the first layer and the second layer being one or two passes the third layer to the last layer being two or three passes to prepare a test body. The welding conditions are shown in Tables 4-1 to 4-7 (the composition of the shielding gas is expressed by volume %). The welding conditions of the flux-cored wire using an outer steel sheath made of mild steel in Tables 2-1 to 2-8 and 3-1 to 3-8 are shown in Tables 4-1 to 4-4. As seen from Tables 4-1 to 4-4, welding was performed under the conditions of a current value of 280 A, a voltage value of 25V, a welding rate of 30 cm/min, an interpass temperature of 150° C. or less, and a flow rate of 25 l/min using any one of a pure Ar gas, a mixed gas of Ar with $O_2$ or $CO_2$, a pure He gas, and a mixed gas of He with $O_2$ or $CO_2$ as a shielding gas. The welding conditions of the flux-cored wires using an outer steel sheath made of Ni-containing steel in Tables 2-9 to 2-16 and 3-9 to 3-16 are shown in Tables 4-5 to 4-7. As seen from Tables 4-5 to 4-7, welding was performed under the conditions of a current value of 280 A, a voltage value of 25V, a welding rate of 30 cm/min, an interpass temperature of 150° C. or less, and a flow rate of 25 l/min using any one of a pure Ar gas, a mixed gas of Ar with $O_2$ or $CO_2$, a pure He gas, and a mixed gas of He with $O_2$ or $CO_2$ as a shielding gas.

The tensile strength and the Charpy absorbed energy of the weld metals were measured by collecting a A0 test piece (rod) 5 for tensile test according to JIS Z 3111 (2005) (having a diameter of 10 mm) and a Charpy impact test piece 4 (having a 2 mm V-notch) from the prepared test body as shown in FIG. 8 as a mechanical test piece and performing mechanical property tests each of the test pieces. The results obtained by measuring and evaluating the mechanical properties obtained when the flux-cored wire using an outer steel sheath made of mild steel is used are shown in Tables 5-1 to 5-4, and the results obtained by measuring and evaluating the mechanical properties obtained when the flux-cored wire using an outer steel sheath made of Ni-containing steel is used are shown in Tables 5-5 to 5-8.

As seen from FIG. 6, as the evaluation of the mechanical properties when the flux-cored wire in which the outer steel sheath was made of mild steel was used, the test piece having the tensile strength of 660 MPa to 900 MPa and the toughness in which absorbed energy was 50 J or more in the Charpy impact test at −196° C. was accepted.

As seen from FIG. 7, as the evaluation of the mechanical properties when the flux-cored wire in which the outer steel sheath was made of Ni-containing steel was used, the test piece having the tensile strength of 660 MPa to 900 MPa and the toughness in which the absorbed energy was 69 J or more in the Charpy impact test at −196° C. was accepted.

In addition, a test piece was collected from each of the obtained weld metals to measure an amount of oxygen in the weld metal. The amount of oxygen in the weld metal was measured by impulse heating furnace-inert gas melting infrared absorbing method. The measured amount of oxygen in each of the weld metals was shown in Tables 5-1 to 5-8.

In the wire of the present invention, the toughness was improved by reducing the amount of oxygen in the weld metal. Regarding the flux-cored wire in which the entire outer steel sheath was made of mild steel was used, the Charpy absorbed energy at −196° C. was able to be secured in the weld metal including an amount of oxygen of 160 ppm or less. Further, regarding the flux-cored wire in which the entire outer steel sheath was made of Ni-containing steel was used, the Charpy absorbed energy at −196° C. was able to be secured in the weld metal including an amount of oxygen of 80 ppm or less.

Next, regarding the flux-cored wire in which both the tensile strength and the Charpy absorbed energy at −196° C. were acceptable in the evaluation results of Tables 5-1 to 5-8, the cold cracking resistance was evaluated. The cold cracking resistance was evaluated by the measurement of the amount of diffusible hydrogen and a y-groove weld cracking test. However, regarding the wire number B39 in Table 5-4, the amount of a Ca oxide was large and thus the amount of diffusible hydrogen was measured.

The amount of diffusible hydrogen was measured by gas chromatography according to JIS Z 3118 (method for measuring the amount of hydrogen in the steel weld portion) with the same welding conditions as in the mechanical property test. The measurement results of the amount of the diffusible hydrogen are shown in Tables 5-1 to 5-8.

The y-groove weld cracking test was performed using a steel plate (base metal number: P1) having a thickness of 25 mm shown in Table 6 under a predetermined atmosphere control of a temperature of 0° C. and a humidity of 60% by a method according to JIS Z 3158 (y-groove weld cracking test) with the welding conditions of Tables 4-1 to 4-7.

The obtained y-groove weld cracking test results are shown in Tables 5-1 to 5-8. When the amount of diffusible hydrogen was 1.5 ml/100 g or less, very high cold cracking resistance was demonstrated, since there was no cross-sectional cracking (i.e. no cross-sectional cracking was occurred) in all of the cross sections during y-groove weld cracking test even if the test temperature was 0° C. and preheating was not performed.

As shown in the test results of Tables 5-1, 5-2, 5-5, and 5-6, the tensile strength, toughness, and cold cracking resistance of the samples made with wires with numbers A1 to A108, which were examples of the present invention, were all excellent, and the wires were acceptable. The sample regarding a wire with number A108 is an example in which a shielding gas is a mixed gas of pure Ar gas and 2.0 volume % of $O_2$. Since Al, Ti, and Mg, which are deoxidizing compositions, were sufficiently added to the wire with number A108, an amount of $O_2$ in the weld metal thereof was reduced and the sample regarding the wire with number A108 had excellent toughness.

On the other hand, as shown in the test results of Tables 5-3, 5-4, 5-7, and 5-8, the samples made with wires with numbers of B1 to B101, which were comparative examples, did not satisfy the requirements defined in the present invention, and thus, one or more of the tensile strength, toughness, and cold cracking resistance were not able to be satisfied and the wires were not acceptable in the total determination. The wires of the wire Nos. B34, B34, B35. B46, B47, B48, B87, B88, B98, B99, and B100 satisfied requirements according to the present invention; however, since shielding gas were inappropriate, amounts of $O_2$ in the weld metals made with the wires were high, and thus, the toughness thereof were low.

TABLE 1

| HOOP No. | CHEMICAL COMPOSITION OF OUTER STEEL SHEATH OF WIRE [mass % WITH RESPECT TO TOTAL MASS OF OUTER STEEL SHEATH] | | | | | | |
|---|---|---|---|---|---|---|---|
| | C | Si | Mn | P | S | Al | Ni |
| F1 | 0.010 | 0.03 | 0.1 | 0.007 | 0.004 | 0.012 | 6.0 |
| F2 | 0.010 | 0.03 | 0.1 | 0.007 | 0.004 | 0.012 | 9.0 |
| F3 | 0.010 | 0.03 | 0.1 | 0.007 | 0.004 | 0.012 | 12.5 |
| F4 | 0.010 | 0.03 | 0.1 | 0.007 | 0.004 | 0.012 | 14.5 |
| F5 | 0.020 | 0.15 | 0.2 | 0.007 | 0.004 | 0.002 | 12.5 |
| F6 | 0.002 | 0.03 | 0.1 | 0.007 | 0.004 | 0.012 | 8.5 |

TABLE 2-1

| WIRE No. | CATEGORY | REMARKS | FILLING RATE (%) | CHEMICAL COMPOSITION OF FLUX [mass % WITH RESPECT TO TOTAL MASS OF WIRE] METAL FLUORIDE | | | | | TOTAL AMOUNT [α] |
|---|---|---|---|---|---|---|---|---|---|
| | | | | $CaF_2$ | $BaF_2$ | $SrF_2$ | $MgF_2$ | LiF | |
| A1 | EXAMPLE | | 15.7 | 2.0 | | | | | 2.0 |
| A2 | EXAMPLE | | 21.8 | 7.0 | | | | | 7.0 |
| A3 | EXAMPLE | APPLIED PTFE | 16.4 | 2.8 | | | | | 2.8 |
| A4 | EXAMPLE | | 18.7 | 3.7 | | | | | 3.7 |
| A5 | EXAMPLE | | 15.9 | 2.0 | | | | | 2.1 |
| A6 | EXAMPLE | | 19.5 | 6.0 | | | | | 6.0 |
| A7 | EXAMPLE | APPLIED PTFE | 16.5 | 2.6 | | | | | 2.6 |
| A8 | EXAMPLE | | 18.6 | 4.8 | | | | | 4.8 |
| A9 | EXAMPLE | | 16.4 | 3.2 | | | | | 3.2 |
| A10 | EXAMPLE | | 16.5 | 3.5 | | | 0.2 | 0.1 | 3.8 |
| A11 | EXAMPLE | | 17.0 | 3.0 | | | | | 3.0 |
| A12 | EXAMPLE | | 16.8 | 3.6 | | | | | 3.6 |
| A13 | EXAMPLE | | 16.7 | 4.6 | 0.2 | 0.1 | | | 4.9 |
| A14 | EXAMPLE | | 16.3 | 4.5 | | | | | 4.5 |
| A15 | EXAMPLE | | 14.7 | 3.0 | | | | | 3.0 |
| A16 | EXAMPLE | | 19.9 | 2.9 | | | 0.2 | 0.1 | 3.2 |
| A17 | EXAMPLE | | 17.3 | 4.5 | | | | | 4.5 |
| A18 | EXAMPLE | APPLIED PTFE | 16.5 | 3.2 | | | 0.1 | | 3.3 |
| A19 | EXAMPLE | | 15.0 | 3.6 | | | | | 3.6 |
| A20 | EXAMPLE | | 14.6 | 3.2 | 0.2 | | | | 3.4 |
| A21 | EXAMPLE | | 14.1 | 3.3 | | | | | 3.3 |
| A22 | EXAMPLE | | 14.3 | 3.6 | | | | | 3.6 |
| A23 | EXAMPLE | | 18.5 | 3.2 | | | 0.2 | | 3.4 |
| A24 | EXAMPLE | | 19.8 | 4.2 | 0.1 | | | 0.1 | 4.4 |
| A25 | EXAMPLE | | 18.5 | 4.0 | 0.1 | 0.1 | 0.1 | 0.1 | 4.4 |
| A26 | EXAMPLE | | 11.0 | 2.8 | | | | | 2.8 |
| A27 | EXAMPLE | | 17.8 | 4.0 | | | | | 4.0 |

| WIRE No. | CHEMICAL COMPOSITION OF FLUX [mass % WITH RESPECT TO TOTAL MASS OF WIRE] METAL OXIDE | | | | | | TOTAL AMOUNT [β] |
|---|---|---|---|---|---|---|---|
| | $TiO_2$ | $SiO_2$ | MgO | $Al_2O_3$ | $ZrO_2$ | CaO | |
| A1 | 0.25 | 0.38 | | | | 0.02 | 0.65 |
| A2 | 0.22 | 0.25 | | | | 0.02 | 0.49 |
| A3 | 0.10 | 0.20 | | | | 0.03 | 0.33 |
| A4 | 0.40 | 0.48 | | | | 0.02 | 0.90 |
| A5 | 0.30 | 0.36 | | | | 0.02 | 0.68 |
| A6 | 0.10 | 0.30 | | | | 0.02 | 0.42 |
| A7 | 0.12 | 0.25 | | | | 0.03 | 0.40 |
| A8 | 0.15 | 0.22 | 0.12 | | | 0.02 | 0.51 |
| A9 | 0.20 | 0.26 | | 0.18 | | 0.03 | 0.67 |
| A10 | 0.15 | 0.25 | | | | 0.03 | 0.43 |
| A11 | 0.22 | 0.28 | | 0.12 | | 0.02 | 0.64 |

TABLE 2-1-continued

| | | | | | | | |
|---|---|---|---|---|---|---|---|
| A12 | 0.16 | 0.36 | 0.12 | | | 0.02 | 0.66 |
| A13 | 0.14 | 0.32 | | | | 0.06 | 0.52 |
| A14 | 0.34 | 0.34 | | | | 0.02 | 0.70 |
| A15 | 0.16 | 0.24 | 0.12 | 0.10 | | 0.02 | 0.64 |
| A16 | 0.36 | 0.20 | | | | 0.02 | 0.58 |
| A17 | 0.20 | 0.32 | | | | 0.18 | 0.70 |
| A18 | 0.12 | 0.32 | 0.20 | | | 0.02 | 0.66 |
| A19 | 0.26 | 0.25 | | 0.12 | | 0.02 | 0.65 |
| A20 | 0.15 | 0.35 | 0.12 | | | 0.02 | 0.64 |
| A21 | 0.12 | 0.22 | | 0.25 | | 0.02 | 0.61 |
| A22 | 0.31 | 0.39 | | | | 0.02 | 0.72 |
| A23 | 0.18 | 0.46 | | | | 0.02 | 0.66 |
| A24 | 0.13 | 0.33 | 0.15 | 0.08 | | 0.02 | 0.71 |
| A25 | 0.16 | 0.21 | | | | 0.02 | 0.39 |
| A26 | 0.22 | 0.34 | | | | 0.05 | 0.61 |
| A27 | 0.12 | 0.20 | 0.10 | 0.12 | | 0.05 | 0.59 |

[Table 2-2]

TABLE 2-2

CHEMICAL COMPOSITION OF FLUX
[mass % WITH RESPECT TO TOTAL MASS OF WIRE]

| WIRE No. | METAL CARBONATE | | | | | TOTAL AMOUNT | IRON POWDER | ARC STABILIZER | α/β | CaF$_2$/α |
|---|---|---|---|---|---|---|---|---|---|---|
| | CaCO$_3$ | BaCO$_3$ | SrCO$_3$ | MgCO$_3$ | Li$_2$CO$_3$ | | | | | |
| A1 | 0.01 | | | | | 0.01 | | 0.08 | 3.1 | 1.00 |
| A2 | 0.01 | | | | | 0.01 | | 0.08 | 14.3 | 1.00 |
| A3 | 0.01 | | | | | 0.01 | | 0.08 | 8.5 | 1.00 |
| A4 | 0.01 | | | | | 0.01 | | 0.08 | 4.1 | 1.00 |
| A5 | 0.01 | | | | | 0.01 | | 0.08 | 3.1 | 0.95 |
| A6 | 0.01 | | | | | 0.01 | | 0.08 | 14.3 | 1.00 |
| A7 | 0.01 | | | | | 0.01 | | 0.08 | 6.5 | 1.00 |
| A8 | 0.01 | | | | | 0.01 | | 0.08 | 9.4 | 1.00 |
| A9 | 0.01 | | | | | 0.01 | | 0.08 | 4.8 | 1.00 |
| A10 | 0.01 | | | | | 0.01 | | 0.08 | 8.8 | 0.92 |
| A11 | | 0.01 | | | | 0.01 | | 0.08 | 4.7 | 1.00 |
| A12 | | | 0.01 | | | 0.01 | | 0.08 | 5.5 | 1.00 |
| A13 | | | | 0.01 | | 0.01 | | 0.08 | 9.4 | 0.94 |
| A14 | 0.01 | | | | 0.01 | 0.02 | | 0.08 | 6.4 | 1.00 |
| A15 | 0.01 | | | | | 0.01 | 4.80 | 0.08 | 4.7 | 1.00 |
| A16 | 0.01 | | | | | 0.01 | | 0.08 | 5.5 | 0.91 |
| A17 | 0.01 | 0.01 | | | | 0.02 | | 0.08 | 6.4 | 1.00 |
| A18 | | 0.01 | | | | 0.01 | | 0.08 | 5.0 | 0.97 |
| A19 | | 0.01 | | | | 0.01 | | 0.08 | 5.5 | 1.00 |
| A20 | | 0.01 | 0.01 | | | 0.02 | | 0.08 | 5.3 | 0.94 |
| A21 | | | 0.01 | | | 0.01 | 2.50 | 0.08 | 5.4 | 1.00 |
| A22 | | | 0.01 | | | 0.01 | 1.50 | 0.08 | 5.0 | 1.00 |
| A23 | | | 0.01 | | | 0.01 | | 0.08 | 5.2 | 0.94 |
| A24 | | | | 0.01 | | 0.01 | | 0.10 | 6.2 | 0.95 |
| A25 | | | | | 0.01 | 0.01 | | 0.10 | 11.3 | 0.91 |
| A26 | | | | | 0.01 | 0.01 | | 0.10 | 4.6 | 1.00 |
| A27 | | | | | 0.01 | 0.01 | | 0.10 | 6.8 | 1.00 |

TABLE 2-3

CHEMICAL COMPOSITION OF FLUX
[mass % WITH RESPECT TO TOTAL MASS OF WIRE]
METAL FLUORIDE

| WIRE No. | CATEGORY | REMARKS | FILLING RATE (%) | CaF$_2$ | BaF$_2$ | SrF$_2$ | MgF$_2$ | LiF | TOTAL AMOUNT [α] |
|---|---|---|---|---|---|---|---|---|---|
| A28 | EXAMPLE | | 14.1 | 2.5 | | | | 0.1 | 2.6 |
| A29 | EXAMPLE | | 16.3 | 4.8 | | 0.1 | | | 4.9 |
| A30 | EXAMPLE | APPLIED PTFE | 16.7 | 2.4 | 0.2 | | | | 2.6 |
| A31 | EXAMPLE | | 18.9 | 4.6 | | | 0.1 | 0.2 | 4.9 |
| A32 | EXAMPLE | | 13.8 | 3.0 | | | | | 3.0 |
| A33 | EXAMPLE | | 18.5 | 4.5 | | | | | 4.5 |

TABLE 2-3-continued

| | | | | | | | |
|---|---|---|---|---|---|---|---|
| A34 | EXAMPLE | APPLIED PTFE | 14.0 | 2.9 | 0.1 | 0.1 | 3.1 |
| A35 | EXAMPLE | | 18.6 | 4.6 | | | 4.6 |
| A36 | EXAMPLE | | 13.0 | 3.0 | | | 3.0 |
| A37 | EXAMPLE | | 13.3 | 3.2 | | | 3.2 |
| A38 | EXAMPLE | | 14.5 | 4.5 | | | 4.5 |
| A39 | EXAMPLE | | 16.0 | 5.8 | | | 5.8 |
| A40 | EXAMPLE | | 17.8 | 4.0 | | | 4.0 |
| A41 | EXAMPLE | | 17.9 | 4.0 | | | 4.0 |
| A42 | EXAMPLE | | 17.6 | 4.0 | | | 4.0 |
| A43 | EXAMPLE | APPLIED PTFE | 18.6 | 4.0 | | | 4.0 |
| A44 | EXAMPLE | | 18.2 | 4.0 | | | 4.0 |
| A45 | EXAMPLE | | 18.0 | 4.0 | | | 4.0 |
| A46 | EXAMPLE | | 19.0 | 5.0 | | | 5.0 |
| A47 | EXAMPLE | | 16.9 | 3.6 | | | 3.6 |
| A48 | EXAMPLE | | 16.0 | 4.2 | 0.2 | 0.1 | 4.5 |
| A49 | EXAMPLE | APPLIED PTFE | 17.9 | 3.8 | | | 3.8 |
| A50 | EXAMPLE | | 17.6 | 4.0 | | 0.4 | 4.4 |
| A51 | EXAMPLE | | 16.8 | 3.1 | | | 3.1 |
| A52 | EXAMPLE | | 18.2 | 4.5 | | | 4.5 |
| A53 | EXAMPLE | APPLIED PTFE | 20.2 | 5.8 | | | 5.8 |
| A54 | EXAMPLE | | 16.5 | 3.0 | | | 3.0 |
| A55 | EXAMPLE | | 17.5 | 2.8 | | | 2.8 |

| | CHEMICAL COMPOSITION OF FLUX [mass % WITH RESPECT TO TOTAL MASS OF WIRE] | | | | | | |
|---|---|---|---|---|---|---|---|
| | METAL OXIDE | | | | | | |
| WIRE No. | $TiO_2$ | $SiO_2$ | MgO | $Al_2O_3$ | $ZrO_2$ | CaO | TOTAL AMOUNT [β] |
| A28 | 0.25 | 0.40 | | | | 0.02 | 0.67 |
| A29 | 0.12 | 0.24 | 0.05 | | | 0.02 | 0.43 |
| A30 | 0.18 | 0.25 | 0.12 | 0.10 | | 0.02 | 0.67 |
| A31 | 0.10 | 0.22 | | | | 0.12 | 0.44 |
| A32 | 0.12 | 0.32 | | | | 0.02 | 0.46 |
| A33 | 0.15 | 0.35 | | | | 0.02 | 0.52 |
| A34 | 0.20 | 0.28 | | 0.12 | | 0.02 | 0.62 |
| A35 | 0.15 | 0.33 | 0.15 | | | 0.02 | 0.65 |
| A36 | 0.15 | 0.32 | | 0.10 | | 0.02 | 0.59 |
| A37 | 0.20 | 0.35 | | | | 0.02 | 0.57 |
| A38 | 0.15 | 0.30 | 0.23 | | | 0.02 | 0.70 |
| A39 | 0.20 | 0.35 | | | | 0.02 | 0.57 |
| A40 | 0.15 | 0.30 | | | | 0.02 | 0.47 |
| A41 | 0.15 | 0.30 | | | | 0.02 | 0.47 |
| A42 | 0.15 | 0.30 | | | | 0.02 | 0.47 |
| A43 | 0.15 | 0.30 | | | | 0.02 | 0.47 |
| A44 | 0.15 | 0.30 | | | | 0.02 | 0.47 |
| A45 | 0.15 | 0.30 | | | | 0.19 | 0.64 |
| A46 | 0.15 | 0.30 | | | | 0.19 | 0.64 |
| A47 | 0.11 | 0.22 | 0.12 | | | 0.02 | 0.47 |
| A48 | 0.14 | 0.32 | | | | 0.06 | 0.52 |
| A49 | 0.34 | 0.34 | | | | 0.02 | 0.70 |
| A50 | 0.01 | 0.20 | | | 0.10 | 0.02 | 0.33 |
| A51 | 0.01 | 0.20 | | | | | 0.21 |
| A52 | 0.01 | 0.20 | | 0.10 | | 0.02 | 0.33 |
| A53 | 0.01 | 0.20 | 0.10 | | 0.10 | 0.02 | 0.43 |
| A54 | 0.06 | 0.30 | | | | 0.02 | 0.38 |
| A55 | 0.05 | 0.20 | | | | 0.02 | 0.27 |

[Table 2-4]

TABLE 2-4

| | CHEMICAL COMPOSITION OF FLUX [mass % WITH RESPECT TO TOTAL MASS OF WIRE] | | | | | | | | | |
|---|---|---|---|---|---|---|---|---|---|---|
| | METAL CARBONATE | | | | | | | | | |
| WIRE No. | $CaCO_3$ | $BaCO_3$ | $SrCO_3$ | $MgCO_3$ | $Li_2CO_3$ | TOTAL AMOUNT | IRON POWDER | ARC STABILIZER | α/β | $CaF_2$/α |
| A28 | | | | | 0.01 | 0.01 | | 0.10 | 3.9 | 0.96 |
| A29 | | 0.01 | | | | 0.01 | | 0.10 | 11.4 | 0.98 |

TABLE 2-4-continued

CHEMICAL COMPOSITION OF FLUX
[mass % WITH RESPECT TO TOTAL MASS OF WIRE]

| WIRE No. | METAL CARBONATE | | | | | TOTAL AMOUNT | IRON POWDER | ARC STABILIZER | α/β | $CaF_2/α$ |
|---|---|---|---|---|---|---|---|---|---|---|
| | $CaCO_3$ | $BaCO_3$ | $SrCO_3$ | $MgCO_3$ | $Li_2CO_3$ | | | | | |
| A30 | | 0.01 | | | | 0.01 | | 0.10 | 3.9 | 0.92 |
| A31 | | 0.01 | | | | 0.01 | | 0.10 | 11.1 | 0.94 |
| A32 | | 0.01 | | | | 0.01 | | 0.10 | 6.5 | 1.00 |
| A33 | | 0.01 | | | | 0.01 | | 0.10 | 8.7 | 1.00 |
| A34 | | 0.01 | | | | 0.01 | | 0.10 | 5.0 | 0.94 |
| A35 | | 0.01 | | | | 0.01 | | 0.10 | 7.1 | 1.00 |
| A36 | | 0.01 | | | | 0.01 | | 0.10 | 5.1 | 1.00 |
| A37 | | 0.01 | | | | 0.01 | | 0.10 | 5.6 | 1.00 |
| A38 | | 0.01 | | | | 0.01 | | 0.10 | 6.4 | 1.00 |
| A39 | | 0.01 | | | | 0.01 | | 0.10 | 10.2 | 1.00 |
| A40 | | 0.01 | | | | 0.01 | | 0.10 | 8.5 | 1.00 |
| A41 | | 0.01 | | | | 0.01 | | 0.10 | 8.5 | 1.00 |
| A42 | | 0.01 | | | | 0.01 | | 0.10 | 8.5 | 1.00 |
| A43 | | 0.01 | | | | 0.01 | | 0.10 | 8.5 | 1.00 |
| A44 | | 0.44 | | 0.10 | 0.05 | 0.59 | 0.60 | 0.10 | 8.5 | 1.00 |
| A45 | | 0.01 | | | | 0.01 | | 0.10 | 6.3 | 1.00 |
| A46 | | 0.01 | | | | 0.01 | | 0.10 | 7.8 | 1.00 |
| A47 | | 0.01 | | | | 0.01 | | 0.08 | 7.7 | 1.00 |
| A48 | | 0.01 | | | | 0.01 | | 0.08 | 8.7 | 0.93 |
| A49 | | 0.01 | | | | 0.01 | | 0.08 | 5.4 | 1.00 |
| A50 | | 0.01 | | | | 0.01 | | 0.08 | 13.3 | 0.91 |
| A51 | | 0.01 | | | | 0.01 | | 0.08 | 14.8 | 1.00 |
| A52 | | 0.01 | | | | 0.01 | | 0.08 | 13.6 | 1.00 |
| A53 | | 0.01 | | | | 0.01 | | 0.08 | 13.5 | 1.00 |
| A54 | | 0.01 | | | | 0.01 | | 0.08 | 7.9 | 1.00 |
| A55 | | 0.01 | | | | 0.01 | | 0.08 | 10.4 | 1.00 |

TABLE 2-5

CHEMICAL COMPOSITION OF FLUX
[mass % WITH RESPECT TO TOTAL MASS OF WIRE]
METAL FLUORIDE

| WIRE No. | CATEGORY | REMARKS | FILLING RATE (%) | $CaF_2$ | $BaF_2$ | $SrF_2$ | $MgF_2$ | LiF | TOTAL AMOUNT [α] |
|---|---|---|---|---|---|---|---|---|---|
| B1 | COMPARATIVE | | 11.8 | 1.8 | | | | | 1.8 |
| B2 | EXAMPLE | APPLIED PTFE | 17.4 | 7.3 | | | | | 7.3 |
| B3 | | | 16.3 | 2.5 | | | | | 2.5 |
| B4 | | | 16.6 | 3.5 | | | | | 3.5 |
| B5 | | | 16.8 | 3.5 | | | | | 3.5 |
| B6 | | | 18.5 | 3.8 | | | | | 3.8 |
| B7 | | | 19.6 | 5.5 | | | | | 5.5 |
| B8 | | | 16.6 | 2.4 | | | | | 2.4 |
| B9 | | | 18.1 | 5.8 | | | | | 5.8 |
| B10 | | APPLIED PTFE | 16.8 | 3.8 | 0.5 | 0.3 | 0.1 | | 4.7 |
| B11 | | | 16.8 | 2.8 | | | | | 2.8 |
| B12 | | | 17.0 | 3.2 | | | | | 3.2 |
| B13 | | | 15.7 | 3.2 | 0.1 | | | | 3.3 |
| B14 | | APPLIED PTFE | 15.9 | 2.8 | | | 0.2 | | 3.0 |
| B15 | | | 16.2 | 3.0 | | 0.1 | | | 3.1 |
| B16 | | | 15.8 | 3.0 | | | | | 3.0 |
| B17 | | | 13.6 | 3.6 | | 0.1 | | | 3.7 |
| B18 | | | 13.8 | 3.6 | | | | | 3.6 |
| B19 | | | 16.6 | 3.6 | | | 0.1 | 0.1 | 3.8 |
| B20 | | | 15.7 | 3.2 | | | | | 3.2 |
| B21 | | | 12.7 | 3.2 | | | 0.2 | | 3.4 |
| B22 | | | 13.0 | 3.4 | | | | | 3.4 |
| B23 | | APPLIED PTFE | 12.8 | 3.4 | 0.1 | 0.1 | | | 3.6 |
| B24 | | | 13.6 | 2.8 | | | | | 2.8 |
| B25 | | | 15.8 | 2.8 | | | | 0.1 | 2.9 |

TABLE 2-5-continued

| | | CHEMICAL COMPOSITION OF FLUX [mass % WITH RESPECT TO TOTAL MASS OF WIRE] | | | | | | |
|---|---|---|---|---|---|---|---|---|
| | | METAL OXIDE | | | | | | |
| | WIRE No. | $TiO_2$ | $SiO_2$ | MgO | $Al_2O_3$ | $ZrO_2$ | CaO | TOTAL AMOUNT [β] |
| | B1 | 0.15 | 0.20 | | | | 0.02 | 0.37 |
| | B2 | 0.15 | 0.30 | | | | 0.02 | 0.47 |
| | B3 | <u>0.45</u> | 0.20 | | | | 0.02 | 0.67 |
| | B4 | 0.15 | <u>0.15</u> | | | | 0.02 | 0.32 |
| | B5 | 0.15 | <u>0.56</u> | | | | 0.02 | 0.73 |
| | B6 | 0.15 | <u>0.15</u> | | | | <u>0.35</u> | 0.65 |
| | B7 | 0.40 | 0.50 | 0.10 | | | 0.02 | <u>1.02</u> |
| | B8 | 0.28 | 0.42 | 0.15 | | | 0.02 | 0.87 |
| | B9 | 0.12 | 0.24 | | | | 0.02 | 0.38 |
| | B10 | 0.20 | 0.32 | | | | 0.02 | 0.54 |
| | B11 | 0.20 | 0.28 | | 0.10 | | 0.02 | 0.60 |
| | B12 | 0.20 | 0.28 | | | | 0.02 | 0.50 |
| | B13 | 0.15 | 0.24 | | | | 0.10 | 0.49 |
| | B14 | 0.15 | 0.24 | 0.18 | 0.12 | | 0.02 | 0.71 |
| | B15 | 0.25 | 0.25 | | | | 0.02 | 0.52 |
| | B16 | 0.25 | 0.24 | | | | 0.02 | 0.51 |
| | B17 | 0.10 | 0.33 | 0.20 | | | 0.02 | 0.65 |
| | B18 | 0.10 | 0.32 | 0.15 | | | 0.02 | 0.59 |
| | B19 | 0.20 | 0.36 | | | | 0.05 | 0.61 |
| | B20 | 0.25 | 0.36 | | | | 0.02 | 0.63 |
| | B21 | 0.15 | 0.32 | | 0.15 | | 0.02 | 0.64 |
| | B22 | 0.15 | 0.25 | | | 0.15 | 0.02 | 0.57 |
| | B23 | 0.24 | 0.23 | | | | 0.02 | 0.49 |
| | B24 | 0.24 | 0.23 | | | | 0.02 | 0.49 |
| | B25 | 0.16 | 0.36 | 0.12 | | | 0.02 | 0.66 |

[Table 2-6]

TABLE 2-6

| | CHEMICAL COMPOSITION OF FLUX [mass % WITH RESPECT TO TOTAL MASS OF WIRE] | | | | | | | | | |
|---|---|---|---|---|---|---|---|---|---|---|
| | METAL CARBONATE | | | | | | | | | |
| WIRE No. | $CaCO_3$ | $BaCO_3$ | $SrCO_3$ | $MgCO_3$ | $Li_2CO_3$ | TOTAL AMOUNT | IRON POWDER | ARC STABILIZER | α/β | $CaF_2$/α |
| B1 | 0.01 | | | | | 0.01 | | 0.08 | 4.9 | 1.00 |
| B2 | 0.01 | | | | | 0.01 | | 0.08 | <u>15.5</u> | 1.00 |
| B3 | 0.01 | | | | | 0.01 | | 0.08 | 3.7 | 1.00 |
| B4 | 0.01 | | | | | 0.01 | | 0.08 | 10.9 | 1.00 |
| B5 | 0.01 | | | | | 0.01 | | 0.08 | 4.8 | 1.00 |
| B6 | 0.01 | | | | | 0.01 | | 0.08 | 5.8 | 1.00 |
| B7 | 0.01 | | | | | 0.01 | | 0.08 | 5.4 | 1.00 |
| B8 | 0.01 | | | | | 0.01 | | 0.08 | <u>2.8</u> | 1.00 |
| B9 | | 0.01 | | | | 0.01 | | 0.08 | 15.3 | 1.00 |
| B10 | | | 0.01 | | | 0.01 | | 0.08 | 8.7 | <u>0.81</u> |
| B11 | | | | 0.01 | | 0.01 | | 0.08 | 4.7 | 1.00 |
| B12 | 0.01 | | | | 0.01 | 0.02 | | 0.08 | 6.4 | 1.00 |
| B13 | 0.01 | | | | | 0.01 | | 0.08 | 6.7 | 0.97 |
| B14 | 0.01 | | | | | 0.01 | | 0.08 | 4.2 | 0.93 |
| B15 | 0.01 | 0.01 | | | | 0.02 | | 0.08 | 6.0 | 0.97 |
| B16 | | 0.01 | | | | 0.01 | | 0.08 | 5.9 | 1.00 |
| B17 | | 0.01 | | | | 0.01 | | 0.08 | 5.7 | 0.97 |
| B18 | | 0.01 | 0.01 | | | 0.02 | | 0.08 | 6.1 | 1.00 |
| B19 | | | 0.01 | | | 0.01 | | 0.08 | 6.2 | 0.95 |
| B20 | | | 0.01 | | | 0.01 | | 0.08 | 5.1 | 1.00 |
| B21 | | | 0.01 | | | 0.01 | 3.00 | 0.08 | 5.3 | 0.94 |
| B22 | | | | 0.01 | | 0.01 | | 0.08 | 6.0 | 1.00 |
| B23 | | | | | 0.01 | 0.01 | | 0.08 | 7.3 | 0.94 |
| B24 | | | | | 0.01 | 0.01 | | 0.08 | 5.7 | 1.00 |
| B25 | | | | | 0.01 | 0.01 | | 0.08 | 4.4 | 0.97 |

TABLE 2-7

| WIRE No. | CATEGORY | REMARKS | FILLING RATE (%) | CHEMICAL COMPOSITION OF FLUX [mass % WITH RESPECT TO TOTAL MASS OF WIRE] METAL FLUORIDE | | | | | TOTAL AMOUNT [α] |
|---|---|---|---|---|---|---|---|---|---|
| | | | | $CaF_2$ | $BaF_2$ | $SrF_2$ | $MgF_2$ | LiF | |
| B26 | COMPARATIVE | | 16.7 | 3.2 | | | 0.2 | | 3.4 |
| B27 | EXAMPLE | | 14.2 | 3.2 | | | | | 3.2 |
| B28 | | | 17.8 | 3.4 | | | 0.2 | | 3.6 |
| B29 | | APPLIED PTFE | 17.2 | 3.4 | | | 0.1 | | 3.5 |
| B30 | | | 17.7 | 3.2 | 0.1 | | 0.1 | | 3.4 |
| B31 | | APPLIED PTFE | 14.0 | 3.2 | | | | 0.1 | 3.3 |
| B32 | | | 10.8 | 2.8 | 0.1 | 0.1 | | | 3.0 |
| B33 | | | 17.5 | 3.3 | | | | | 3.3 |
| B34 | | | 11.2 | 2.6 | | 0.1 | | | 2.7 |
| B35 | | | 20.2 | 5.7 | | | 0.1 | | 5.8 |
| B36 | | | 16.9 | 5.5 | | | | | 5.5 |
| B37 | | | 16.3 | 4.8 | | | | | 4.8 |
| B38 | | | 16.3 | 4.8 | | | | | 4.8 |
| B39 | | | 19.8 | 4.8 | | | | | 4.8 |
| B40 | | | 17.8 | 4.8 | | | | | 4.8 |
| B41 | | | 14.7 | 1.8 | 0.1 | | | | <u>1.9</u> |
| B42 | | | 12.8 | 1.7 | 0.1 | | | | <u>1.8</u> |
| B43 | | | 18.0 | 7.0 | | 0.5 | | | <u>7.5</u> |
| B44 | | | 16.3 | 4.0 | 0.1 | | 0.1 | | 4.2 |
| B45 | | | 20.6 | 3.0 | 0.1 | | 0.1 | | 3.2 |
| B46 | | | 18.9 | 5.8 | | | | | 5.8 |
| B47 | | APPLIED PTFE | 19.6 | 4.5 | 0.3 | 0.1 | 0.1 | | 5.0 |
| B48 | | | 17.3 | 2.8 | | | | | 2.8 |
| B49 | | | 18.2 | 3.8 | | | | | 3.8 |
| B50 | | | 16.6 | 2.4 | | | 0.1 | 0.1 | 2.6 |
| B51 | | | 19.4 | 2.2 | | | 0.1 | 0.1 | 2.4 |

| WIRE No. | CHEMICAL COMPOSITION OF FLUX [mass % WITH RESPECT TO TOTAL MASS OF WIRE] METAL OXIDE | | | | | | TOTAL AMOUNT [β] |
|---|---|---|---|---|---|---|---|
| | $TiO_2$ | $SiO_2$ | MgO | $Al_2O_3$ | $ZrO_2$ | CaO | |
| B26 | 0.16 | 0.36 | | 0.13 | | 0.02 | 0.67 |
| B27 | 0.15 | 0.32 | 0.10 | 0.12 | | 0.02 | 0.71 |
| B28 | 0.15 | 0.36 | | | | 0.02 | 0.53 |
| B29 | 0.22 | 0.25 | | | | 0.05 | 0.52 |
| B30 | 0.22 | 0.24 | | | | 0.02 | 0.48 |
| B31 | 0.25 | 0.26 | | | | 0.02 | 0.53 |
| B32 | 0.25 | 0.26 | | | | 0.02 | 0.53 |
| B33 | 0.15 | 0.32 | | 0.10 | | 0.02 | 0.59 |
| B34 | 0.15 | 0.30 | 0.10 | | | 0.02 | 0.57 |
| B35 | 0.20 | 0.26 | | | | 0.02 | 0.48 |
| B36 | 0.01 | 0.41 | | | | 0.02 | 0.44 |
| B37 | 0.01 | 0.34 | | 0.05 | | 0.02 | 0.42 |
| B38 | 0.01 | 0.34 | | 0.05 | | 0.02 | 0.42 |
| B39 | 0.01 | 0.34 | | 0.05 | | <u>0.65</u> | <u>1.05</u> |
| B40 | 0.01 | 0.34 | | 0.05 | | 0.02 | 0.42 |
| B41 | 0.15 | 0.20 | | | | 0.02 | 0.37 |
| B42 | 0.15 | 0.20 | | | | 0.02 | 0.37 |
| B43 | 0.30 | 0.20 | | 0.05 | | 0.02 | 0.57 |
| B44 | 0.15 | 0.35 | | 0.05 | | 0.02 | 0.57 |
| B45 | 0.12 | 0.23 | | 0.05 | | 0.02 | 0.42 |
| B46 | 0.18 | 0.24 | | | 0.05 | 0.02 | 0.49 |
| B47 | 0.20 | 0.32 | | | | 0.02 | 0.54 |
| B48 | 0.20 | 0.28 | | 0.10 | | 0.02 | 0.60 |
| B49 | 0.20 | 0.28 | | 0.10 | | 0.02 | 0.60 |
| B50 | 0.01 | 0.13 | | 0.02 | | 0.02 | <u>0.18</u> |
| B51 | 0.01 | 0.20 | | 0.01 | | 0.01 | 0.23 |

TABLE 2-8

CHEMICAL COMPOSITION OF FLUX
[mass % WITH RESPECT TO TOTAL MASS OF WIRE]

| WIRE No. | METAL CARBONATE | | | | | TOTAL AMOUNT | IRON POWDER | ARC STABILIZER | α/β | $CaF_2/α$ |
|---|---|---|---|---|---|---|---|---|---|---|
| | $CaCO_3$ | $BaCO_3$ | $SrCO_3$ | $MgCO_3$ | $Li_2CO_3$ | | | | | |
| B26 | | | | | 0.01 | 0.01 | | 0.08 | 5.1 | 0.94 |
| B27 | | 0.01 | | | | 0.01 | | 0.08 | 4.5 | 1.00 |
| B28 | | 0.01 | | | | 0.01 | | 0.08 | 6.8 | 0.94 |
| B29 | | 0.01 | | | | 0.01 | | 0.08 | 6.7 | 0.97 |
| B30 | | 0.01 | | | | 0.01 | | 0.08 | 7.1 | 0.94 |
| B31 | | 0.01 | | | | 0.01 | | 0.08 | 6.2 | 0.97 |
| B32 | | 0.01 | | | | 0.01 | | 0.08 | 5.7 | 0.93 |
| B33 | | 0.01 | | | | 0.01 | | 0.08 | 5.6 | 1.00 |
| B34 | | 0.01 | | | | 0.01 | | 0.08 | 4.7 | 0.96 |
| B35 | | 0.01 | | | | 0.01 | | 0.08 | 12.1 | 0.98 |
| B36 | | 0.01 | | | | 0.01 | | 0.03 | 12.5 | 1.00 |
| B37 | | 0.01 | | | | 0.01 | | 0.09 | 11.4 | 1.00 |
| B38 | | 0.01 | | | | 0.01 | | 0.09 | 11.4 | 1.00 |
| B39 | | 0.01 | | | | 0.01 | | 0.09 | 4.6 | 1.00 |
| B40 | | 0.50 | | 0.10 | 0.05 | 0.65 | 0.65 | 0.09 | 11.4 | 1.00 |
| B41 | | 0.01 | | | | 0.01 | | 0.09 | 5.1 | 0.95 |
| B42 | | 0.01 | | | | 0.01 | | 0.09 | 4.9 | 0.94 |
| B43 | | 0.01 | | | | 0.01 | | 0.09 | 13.2 | 0.93 |
| B44 | | 0.01 | | | | 0.01 | | 0.60 | 7.4 | 0.95 |
| B45 | | 0.01 | | | | 0.01 | | 0.08 | 7.6 | 0.94 |
| B46 | | 0.01 | | | | 0.01 | | 0.08 | 11.8 | 1.00 |
| B47 | | 0.01 | | | | 0.01 | | 0.08 | 9.3 | 0.90 |
| B48 | | 0.01 | | | | 0.01 | | 0.08 | 4.7 | 1.00 |
| B49 | 1.01 | | | | | 1.01 | | 1.08 | 6.3 | 1.00 |
| B50 | 0.02 | | | | | 0.02 | 1.00 | 0.08 | 14.4 | 0.92 |
| B51 | 0.02 | | | | | 0.02 | 5.50 | 0.08 | 10.4 | 0.92 |

TABLE 2-9

| WIRE No. | CATEGORY | REMARKS | FILLING RATE (%) | CHEMICAL COMPOSITION OF FLUX [mass % WITH RESPECT TO TOTAL MASS OF WIRE] METAL FLUORIDE | | | | | TOTAL AMOUNT [α] |
|---|---|---|---|---|---|---|---|---|---|
| | | | | $CaF_2$ | $BaF_2$ | $SrF_2$ | $MgF_2$ | LiF | |
| A56 | EXAMPLE | | 8.0 | 2.0 | | | | | 2.0 |
| A57 | EXAMPLE | | 14.0 | 7.0 | | | | | 7.0 |
| A58 | EXAMPLE | | 8.0 | 4.5 | | | | | 4.5 |
| A59 | EXAMPLE | | 8.0 | 2.7 | | | | | 2.7 |
| A60 | EXAMPLE | | 8.0 | 4.0 | | | | | 4.0 |
| A61 | EXAMPLE | | 8.0 | 3.5 | | 0.2 | | 0.1 | 3.8 |
| A62 | EXAMPLE | | 6.0 | 4.4 | 0.1 | | | | 4.5 |
| A63 | EXAMPLE | | 8.0 | 3.2 | | | | | 3.2 |
| A64 | EXAMPLE | APPLIED PTFE | 8.0 | 2.8 | | | | | 2.8 |
| A65 | EXAMPLE | | 8.0 | 2.8 | | | | | 2.8 |
| A66 | EXAMPLE | | 8.0 | 3.4 | | | | | 3.4 |
| A67 | EXAMPLE | | 8.0 | 3.4 | | | 0.1 | 0.1 | 3.6 |
| A68 | EXAMPLE | | 8.0 | 3.7 | | | 0.2 | | 3.9 |
| A69 | EXAMPLE | | 8.0 | 4.0 | | | | | 4.0 |
| A70 | EXAMPLE | | 5.5 | 4.3 | | | | | 4.3 |
| A71 | EXAMPLE | | 10.0 | 3.8 | | | | | 3.8 |
| A72 | EXAMPLE | | 11.0 | 3.8 | | 0.1 | | 0.1 | 4.0 |
| A73 | EXAMPLE | | 12.0 | 3.8 | | | | | 3.8 |
| A74 | EXAMPLE | APPLIED PTFE | 9.0 | 4.8 | 0.1 | 0.1 | | | 5.0 |
| A75 | EXAMPLE | | 8.0 | 5.6 | 0.2 | | | | 5.8 |
| A76 | EXAMPLE | | 10.0 | 6.0 | | | | | 6.0 |
| A77 | EXAMPLE | | 12.0 | 6.3 | | | | | 6.3 |
| A78 | EXAMPLE | | 12.0 | 4.6 | | | | | 4.6 |
| A79 | EXAMPLE | | 11.0 | 4.9 | | | | | 4.9 |
| A80 | EXAMPLE | | 8.0 | 4.7 | 0.2 | 0.1 | 0.1 | 0.1 | 5.2 |

TABLE 2-9-continued

| | | | CHEMICAL COMPOSITION OF FLUX [mass % WITH RESPECT TO TOTAL MASS OF WIRE] METAL OXIDE | | | | | |
|---|---|---|---|---|---|---|---|---|
| WIRE No. | $TiO_2$ | $SiO_2$ | MgO | $Al_2O_3$ | $ZrO_2$ | CaO | TOTAL AMOUNT [β] |
| A56 | 0.15 | 0.32 | | | | 0.02 | 0.49 |
| A57 | 0.15 | 0.32 | | | | 0.02 | 0.49 |
| A58 | 0.10 | 0.20 | | | | 0.02 | 0.32 |
| A59 | 0.40 | 0.47 | | | | 0.03 | 0.90 |
| A60 | 0.20 | 0.35 | | | | 0.03 | 0.58 |
| A61 | 0.20 | 0.35 | | | | 0.03 | 0.58 |
| A62 | 0.10 | 0.28 | | | | 0.02 | 0.40 |
| A63 | 0.10 | 0.30 | | | | 0.02 | 0.42 |
| A64 | 0.12 | 0.28 | | | | 0.03 | 0.43 |
| A65 | 0.30 | 0.25 | 0.15 | | | 0.03 | 0.73 |
| A66 | 0.15 | 0.30 | 0.10 | 0.10 | | 0.03 | 0.68 |
| A67 | 0.24 | 0.32 | | 0.15 | | 0.03 | 0.74 |
| A68 | 0.24 | 0.25 | | | | 0.10 | 0.59 |
| A69 | 0.15 | 0.36 | | | | 0.03 | 0.54 |
| A70 | 0.35 | 0.35 | 0.15 | | | 0.03 | 0.88 |
| A71 | 0.24 | 0.28 | | | | 0.02 | 0.54 |
| A72 | 0.34 | 0.20 | | | | 0.02 | 0.56 |
| A73 | 0.10 | 0.23 | | 0.24 | | 0.05 | 0.62 |
| A74 | 0.18 | 0.24 | 0.22 | | | 0.02 | 0.66 |
| A75 | 0.12 | 0.23 | 0.10 | 0.12 | | 0.02 | 0.59 |
| A76 | 0.13 | 0.22 | 0.15 | | | 0.03 | 0.53 |
| A77 | 0.15 | 0.33 | | 0.05 | | 0.03 | 0.56 |
| A78 | 0.24 | 0.35 | 0.11 | | | 0.03 | 0.73 |
| A79 | 0.18 | 0.34 | | | | 0.02 | 0.54 |
| A80 | 0.20 | 0.22 | 0.12 | 0.10 | | 0.05 | 0.69 |

[Table 2-10]

TABLE 2-10

| | CHEMICAL COMPOSITION OF FLUX [mass % WITH RESPECT TO TOTAL MASS OF WIRE] | | | | | | | | | |
|---|---|---|---|---|---|---|---|---|---|---|
| | METAL CARBONATE | | | | | | | | | |
| WIRE No. | $CaCO_3$ | $BaCO_3$ | $SrCO_3$ | $MgCO_3$ | $Li_2CO_3$ | TOTAL AMOUNT | IRON POWDER | ARC STABILIZER | α/β | $CaF_2/α$ |
| A56 | 0.01 | | | | | 0.01 | 3.8 | 0.09 | 4.1 | 1.00 |
| A57 | 0.01 | | | | | 0.01 | 4.8 | 0.09 | 14.3 | 1.00 |
| A58 | 0.01 | | | | | 0.01 | 2.6 | 0.09 | 14.1 | 1.00 |
| A59 | 0.01 | | | | | 0.01 | 2.8 | 0.09 | 3.0 | 1.00 |
| A60 | 0.01 | | | | | 0.01 | 2.8 | 0.09 | 6.9 | 1.00 |
| A61 | 0.01 | | | | | 0.01 | 2.6 | 0.09 | 6.6 | 0.92 |
| A62 | 0.01 | | | | | 0.01 | 1.9 | 0.09 | 11.3 | 0.98 |
| A63 | 0.01 | | | | | 0.01 | 3.6 | 0.08 | 7.6 | 1.00 |
| A64 | 0.01 | | | | | 0.01 | 4.2 | 0.08 | 6.5 | 1.00 |
| A65 | 0.01 | | | | | 0.01 | 3.6 | 0.08 | 3.8 | 1.00 |
| A66 | 0.01 | | | | | 0.01 | 3.2 | 0.08 | 5.0 | 1.00 |
| A67 | 0.01 | | | | | 0.01 | 2.5 | 0.08 | 4.9 | 0.94 |
| A68 | 0.01 | | | | | 0.01 | 2.7 | 0.08 | 6.6 | 0.95 |
| A69 | 0.01 | | | | | 0.01 | 2.7 | 0.08 | 7.4 | 1.00 |
| A70 | 0.01 | | | | | 0.01 | 1.2 | 0.08 | 4.9 | 1.00 |
| A71 | 0.01 | | | | | 0.01 | | 0.08 | 7.0 | 1.00 |
| A72 | | 0.01 | | | | 0.01 | 2.4 | 0.08 | 7.1 | 0.95 |
| A73 | | 0.01 | | | | 0.01 | 2.7 | 0.08 | 6.1 | 1.00 |
| A74 | | 0.01 | | | | 0.01 | 1.2 | 0.08 | 7.6 | 0.96 |
| A75 | | 0.01 | | | | 0.01 | | 0.08 | 9.8 | 0.97 |
| A76 | | 0.01 | | | | 0.01 | | 0.08 | 11.3 | 1.00 |
| A77 | | 0.01 | | | | 0.01 | | 0.08 | 11.3 | 1.00 |
| A78 | | 0.01 | | | | 0.01 | 1.6 | 0.08 | 6.3 | 1.00 |
| A79 | | | 0.01 | | | 0.01 | 1.2 | 0.08 | 9.1 | 1.00 |
| A80 | | | | 0.01 | | 0.01 | | 0.08 | 7.5 | 0.90 |

TABLE 2-11

| WIRE No. | CATEGORY | REMARKS | FILLING RATE (%) | CHEMICAL COMPOSITION OF FLUX [mass % WITH RESPECT TO TOTAL MASS OF WIRE] METAL FLUORIDE | | | | | TOTAL AMOUNT [α] |
|---|---|---|---|---|---|---|---|---|---|
| | | | | $CaF_2$ | $BaF_2$ | $SrF_2$ | $MgF_2$ | LiF | |
| A81 | EXAMPLE | APPLIED PTFE | 12.0 | 5.2 | | | | | 5.2 |
| A82 | | | 8.0 | 6.0 | | | | | 6.0 |
| A83 | | | 8.0 | 6.2 | | | | | 6.2 |
| A84 | | | 8.0 | 4.6 | | | 0.2 | | 4.8 |
| A85 | | | 8.0 | 5.3 | | | | | 5.3 |
| A86 | | | 8.0 | 4.8 | | | | 0.1 | 4.9 |
| A87 | | | 6.5 | 4.6 | | 0.2 | | | 4.8 |
| A88 | | | 10.0 | 5.0 | | | | | 5.0 |
| A89 | | APPLIED PTFE | 10.0 | 4.8 | 0.1 | | | | 4.9 |
| A90 | | | 8.0 | 5.0 | | | | | 5.0 |
| A91 | | | 8.0 | 3.0 | | | | | 3.0 |
| A92 | | | 8.0 | 5.8 | | | | | 5.8 |
| A93 | | | 8.0 | 3.1 | | | | 0.1 | 3.2 |
| A94 | | | 8.0 | 5.7 | | | | | 5.7 |
| A95 | | | 12.0 | 4.2 | | | | | 4.2 |
| A96 | | | 10.0 | 4.2 | | | | | 4.2 |
| A97 | | | 12.0 | 3.8 | | | | | 3.8 |
| A98 | | | 8.0 | 4.5 | | | | | 4.5 |
| A99 | | | 10.0 | 4.8 | | | | | 4.8 |
| A100 | | | 14.0 | 4.2 | | | | | 4.2 |
| A101 | | | 8.0 | 3.5 | | | | | 3.5 |
| A102 | | | 8.0 | 3.2 | | | 0.3 | | 3.5 |
| A103 | | | 8.0 | 3.0 | | | 0.1 | 0.1 | 3.2 |
| A104 | | | 8.0 | 2.9 | | | 0.2 | | 3.1 |
| A105 | | HAVING GAP (CAULKED) | 16.5 | 3.1 | | | | | 3.1 |
| A106 | | HAVING GAP (CAULKED) | 12.6 | 4.5 | | | | | 4.5 |
| A107 | | | 12.0 | 3.0 | | | | | 3.0 |
| A108 | | | 8.0 | 6.0 | | | | | 6.0 |

| WIRE No. | CHEMICAL COMPOSITION OF FLUX [mass % WITH RESPECT TO TOTAL MASS OF WIRE] METAL OXIDE | | | | | | TOTAL AMOUNT [β] |
|---|---|---|---|---|---|---|---|
| | $TiO_2$ | $SiO_2$ | MgO | $Al_2O_3$ | $ZrO_2$ | CaO | |
| A81 | 0.22 | 0.34 | | | | 0.02 | 0.58 |
| A82 | 0.35 | 0.22 | | | | 0.02 | 0.59 |
| A83 | 0.14 | 0.28 | 0.10 | | | 0.03 | 0.55 |
| A84 | 0.15 | 0.25 | | | | 0.03 | 0.43 |
| A85 | 0.18 | 0.28 | | | | 0.03 | 0.49 |
| A86 | 0.23 | 0.28 | 0.15 | | | 0.02 | 0.68 |
| A87 | 0.16 | 0.26 | | | | 0.19 | 0.61 |
| A88 | 0.24 | 0.25 | | 0.16 | | 0.02 | 0.67 |
| A89 | 0.16 | 0.22 | 0.10 | | | 0.02 | 0.50 |
| A90 | 0.24 | 0.32 | | 0.10 | | 0.02 | 0.68 |
| A91 | 0.15 | 0.24 | | 0.13 | | 0.03 | 0.55 |
| A92 | 0.16 | 0.26 | | 0.11 | | 0.03 | 0.56 |
| A93 | 0.30 | 0.36 | 0.10 | | | 0.03 | 0.79 |
| A94 | 0.33 | 0.34 | 0.12 | | | 0.02 | 0.81 |
| A95 | 0.22 | 0.31 | | 0.10 | | 0.02 | 0.65 |
| A96 | 0.15 | 0.30 | | | | 0.02 | 0.47 |
| A97 | 0.20 | 0.35 | | | | 0.03 | 0.58 |
| A98 | 0.15 | 0.25 | | | | 0.03 | 0.43 |
| A99 | 0.15 | 0.30 | | | | 0.03 | 0.48 |
| A100 | 0.20 | 0.30 | | 0.10 | | 0.19 | 0.79 |
| A101 | 0.01 | 0.20 | | | 0.10 | 0.03 | 0.24 |
| A102 | 0.01 | 0.20 | 0.08 | | | 0.02 | 0.31 |
| A103 | 0.01 | 0.20 | | | 0.10 | 0.02 | 0.23 |
| A104 | 0.01 | 0.20 | | | | 0.02 | 0.23 |
| A105 | 0.01 | 0.20 | | | | 0.02 | 0.23 |
| A106 | 0.11 | 0.20 | | | | 0.02 | 0.33 |
| A107 | 0.06 | 0.20 | | | | 0.03 | 0.29 |
| A108 | 0.05 | 0.20 | 0.05 | 0.10 | | 0.02 | 0.42 |

[Table 2-12]

TABLE 2-12

| | CHEMICAL COMPOSITION OF FLUX [mass % WITH RESPECT TO TOTAL MASS OF WIRE] | | | | | | | | | |
|---|---|---|---|---|---|---|---|---|---|---|
| | METAL CARBONATE | | | | | | | | | |
| WIRE No. | $CaCO_3$ | $BaCO_3$ | $SrCO_3$ | $MgCO_3$ | $Li_2CO_3$ | TOTAL AMOUNT | IRON POWDER | ARC STABILIZER | $\alpha/\beta$ | $CaF_2/\alpha$ |
| A81 | | | | | 0.01 | 0.01 | 4.5 | 0.08 | 9.0 | 1.00 |
| A82 | 0.01 | | | | | 0.01 | | 0.08 | 10.2 | 1.00 |
| A83 | | 0.01 | | | | 0.01 | | 0.08 | 11.3 | 1.00 |
| A84 | | 0.01 | | | | 0.01 | 1.4 | 0.08 | 11.2 | 0.96 |
| A85 | | | 0.01 | | | 0.01 | 1.1 | 0.08 | 10.8 | 1.00 |
| A86 | | | 0.01 | | | 0.01 | 1.7 | 0.08 | 7.2 | 0.98 |
| A87 | | | | 0.01 | | 0.01 | 1.2 | 0.08 | 7.9 | 0.96 |
| A88 | | | | | 0.01 | 0.01 | 3.6 | 0.08 | 7.5 | 1.00 |
| A89 | 0.01 | | | | | 0.01 | 3.3 | 0.08 | 9.8 | 0.98 |
| A90 | | 0.01 | | | | 0.01 | 1.6 | 0.08 | 7.4 | 1.00 |
| A91 | | 0.01 | | | | 0.01 | 3.9 | 0.08 | 5.5 | 1.00 |
| A92 | | | 0.01 | | | 0.01 | 0.6 | 0.08 | 10.4 | 1.00 |
| A93 | | | 0.01 | | | 0.01 | 2.6 | 0.08 | 4.1 | 0.97 |
| A94 | | | | 0.01 | | 0.01 | 0.6 | 0.08 | 7.0 | 1.00 |
| A95 | | | | | 0.01 | 0.01 | 2.2 | 0.08 | 6.5 | 1.00 |
| A96 | 0.01 | | | | | 0.01 | 2.2 | 0.08 | 8.9 | 1.00 |
| A97 | | 0.01 | | | | 0.01 | 2.6 | 0.08 | 6.6 | 1.00 |
| A98 | | 0.01 | | | | 0.01 | 2.5 | 0.08 | 10.5 | 1.00 |
| A99 | 0.50 | 0.02 | 0.02 | 0.02 | 0.02 | 0.58 | 1.6 | 0.08 | 10.0 | 1.00 |
| A100 | 0.01 | | | | | 0.01 | 3.1 | 0.08 | 5.3 | 1.00 |
| A101 | 0.01 | | | | | 0.01 | 2.6 | 0.08 | 14.6 | 1.00 |
| A102 | 0.01 | | | 0.10 | | 0.11 | 2.1 | 0.08 | 11.3 | 0.91 |
| A103 | 0.01 | | | | | 0.01 | 2.4 | 0.08 | 13.9 | 0.94 |
| A104 | 0.01 | | | | 0.10 | 0.11 | 2.2 | 0.08 | 13.5 | 0.94 |
| A105 | 0.01 | | | | | 0.01 | | 0.08 | 13.5 | 1.00 |
| A106 | 0.01 | | | | | 0.01 | | 0.08 | 13.6 | 1.00 |
| A107 | 0.01 | | | | | 0.01 | 3.9 | 0.09 | 10.3 | 1.00 |
| A108 | 0.01 | | | | | 0.01 | 0.7 | 0.08 | 14.3 | 1.00 |

TABLE 2-13

| | | | | CHEMICAL COMPOSITION OF FLUX [mass % WITH RESPECT TO TOTAL MASS OF WIRE] METAL FLUORIDE | | | | | |
|---|---|---|---|---|---|---|---|---|---|
| WIRE No. | CATEGORY | REMARKS | FILLING RATE (%) | $CaF_2$ | $BaF_2$ | $SrF_2$ | $MgF_2$ | LiF | TOTAL AMOUNT [$\alpha$] |
| B52 | COMPARATIVE | | 8.0 | 1.8 | | | | | <u>1.8</u> |
| B53 | EXAMPLE | | 8.0 | 7.1 | | | | | <u>7.1</u> |
| B54 | | | 15.0 | 7.5 | | | 1.5 | | <u>9.0</u> |
| B55 | | | 10.0 | 2.7 | | | | | 2.7 |
| B56 | | | 12.0 | 3.7 | | | | | 3.7 |
| B57 | | | 10.0 | 3.7 | | | | | 3.7 |
| B58 | | APPLIED PTFE | 9.0 | 4.0 | | | | | 4.0 |
| B59 | | | 10.0 | 5.7 | | | | | 5.7 |
| B60 | | | 8.0 | 2.5 | | | | | 2.5 |
| B61 | | | 10.0 | 6.2 | | | 0.5 | | 6.7 |
| B62 | | | 8.0 | 4.6 | 0.4 | 0.4 | 0.2 | | 5.6 |
| B63 | | | 5.5 | 3.9 | 0.2 | | | | 4.1 |
| B64 | | APPLIED PTFE | 8.0 | 4.5 | | | | | 4.5 |
| B65 | | | 8.0 | 4.2 | | | | | 4.2 |
| B66 | | | 8.0 | 3.7 | | 0.1 | 0.1 | 0.1 | 4.0 |
| B67 | | | 8.0 | 4.0 | | | | | 4.0 |
| B68 | | | 8.0 | 3.5 | | 0.2 | | | 3.7 |
| B69 | | | 8.0 | 4.9 | | | | | 4.9 |
| B70 | | | 8.0 | 3.8 | | | | 0.2 | 4.0 |
| B71 | | | 8.0 | 4.6 | | | | | 4.6 |
| B72 | | | 8.0 | 4.2 | 0.1 | 0.1 | | | 4.4 |
| B73 | | APPLIED PTFE | 5.5 | 4.5 | | | | | 4.5 |
| B74 | | | 8.0 | 3.9 | | | | | 3.9 |
| B75 | | | 8.0 | 3.8 | | 0.1 | | | 3.9 |

TABLE 2-13-continued

| | CHEMICAL COMPOSITION OF FLUX [mass % WITH RESPECT TO TOTAL MASS OF WIRE] METAL OXIDE | | | | | | |
|---|---|---|---|---|---|---|---|
| WIRE No. | $TiO_2$ | $SiO_2$ | MgO | $Al_2O_3$ | $ZrO_2$ | CaO | TOTAL AMOUNT [β] |
| B52 | 0.12 | 0.22 | | | | 0.02 | 0.36 |
| B53 | 0.10 | 0.40 | | | | 0.03 | 0.53 |
| B54 | 0.05 | 0.30 | | | | 0.02 | 0.37 |
| B55 | 0.48 | 0.20 | | | | 0.05 | 0.73 |
| B56 | 0.18 | 0.16 | | | | 0.02 | 0.36 |
| B57 | 0.14 | 0.55 | | | | 0.03 | 0.72 |
| B58 | 0.18 | 0.18 | | | | 0.38 | 0.74 |
| B59 | 0.40 | 0.50 | | 0.10 | | 0.05 | 1.05 |
| B60 | 0.34 | 0.40 | 0.15 | | | 0.03 | 0.92 |
| B61 | 0.18 | 0.22 | | | | 0.03 | 0.43 |
| B62 | 0.18 | 0.34 | | | | 0.03 | 0.55 |
| B63 | 0.20 | 0.32 | | | | 0.08 | 0.60 |
| B64 | 0.24 | 0.27 | 0.16 | | | 0.02 | 0.69 |
| B65 | 0.29 | 0.23 | | | | 0.02 | 0.54 |
| B66 | 0.15 | 0.37 | 0.20 | | | 0.03 | 0.75 |
| B67 | 0.14 | 0.36 | | | | 0.10 | 0.60 |
| B68 | 0.23 | 0.34 | 0.16 | 0.10 | | 0.03 | 0.86 |
| B69 | 0.36 | 0.24 | | | | 0.05 | 0.65 |
| B70 | 0.39 | 0.22 | | | | 0.04 | 0.65 |
| B71 | 0.28 | 0.34 | | 0.18 | | 0.04 | 0.84 |
| B72 | 0.16 | 0.24 | 0.24 | 0.10 | | 0.02 | 0.76 |
| B73 | 0.20 | 0.30 | | | | 0.02 | 0.52 |
| B74 | 0.14 | 0.34 | | | | 0.03 | 0.51 |
| B75 | 0.15 | 0.28 | 0.15 | | | 0.03 | 0.61 |

TABLE 2-14

| | CHEMICAL COMPOSITION OF FLUX [mass % WITH RESPECT TO TOTAL MASS OF WIRE] | | | | | | | | | |
|---|---|---|---|---|---|---|---|---|---|---|
| | METAL CARBONATE | | | | | | | | | |
| WIRE No. | $CaCO_3$ | $BaCO_3$ | $SrCO_3$ | $MgCO_3$ | $Li_2CO_3$ | TOTAL AMOUNT | IRON POWDER | ARC STABILIZER | α/β | $CaF_2$/α |
| B52 | 0.01 | | | | | 0.01 | 5.3 | 0.09 | 5.0 | 1.00 |
| B53 | 0.01 | | | | | 0.01 | | 0.09 | 13.4 | 1.00 |
| B54 | 0.01 | | | | | 0.01 | 3.3 | 0.09 | 24.3 | 0.83 |
| B55 | 0.01 | | | | | 0.01 | 3.9 | 0.09 | 3.7 | 1.00 |
| B56 | 0.01 | | | | | 0.01 | 3.1 | 0.09 | 10.3 | 1.00 |
| B57 | 0.01 | | | | | 0.01 | 3.0 | 0.09 | 5.1 | 1.00 |
| B58 | 0.01 | | | | | 0.01 | 2.4 | 0.09 | 5.4 | 1.00 |
| B59 | 0.01 | | | | | 0.01 | | 0.09 | 5.4 | 1.00 |
| B60 | 0.01 | | | | | 0.01 | 3.9 | 0.09 | 2.7 | 1.00 |
| B61 | 0.01 | | | | | 0.01 | 0.5 | 0.09 | 15.6 | 0.93 |
| B62 | 0.01 | | | | | 0.01 | 1.2 | 0.09 | 10.2 | 0.82 |
| B63 | 0.01 | | | | | 0.01 | 2.3 | 0.09 | 6.8 | 0.95 |
| B64 | 0.01 | | | | | 0.01 | 2.0 | 0.09 | 6.5 | 1.00 |
| B65 | 0.01 | | | | | 0.01 | 2.7 | 0.09 | 7.8 | 1.00 |
| B66 | 0.01 | | | | | 0.01 | 2.5 | 0.09 | 5.3 | 0.93 |
| B67 | | 0.01 | | | | 0.01 | 2.7 | 0.09 | 6.7 | 1.00 |
| B68 | | 0.01 | | | | 0.01 | 2.1 | 0.09 | 4.3 | 0.95 |
| B69 | | 0.01 | | | | 0.01 | 1.5 | 0.09 | 7.5 | 1.00 |
| B70 | | 0.01 | | | | 0.01 | 2.4 | 0.09 | 6.2 | 0.95 |
| B71 | | 0.01 | | | | 0.01 | 2.1 | 0.09 | 5.5 | 1.00 |
| B72 | | 0.01 | | | | 0.01 | 2.4 | 0.09 | 5.8 | 0.95 |
| B73 | | 0.01 | | | | 0.01 | 2.1 | 0.09 | 8.7 | 1.00 |
| B74 | | | 0.01 | | | 0.01 | 2.2 | 0.09 | 7.6 | 1.00 |
| B75 | | | | | 0.01 | 0.01 | 2.3 | 0.09 | 6.4 | 0.97 |

TABLE 2-15

| WIRE No. | CATEGORY | REMARKS | FILLING RATE (%) | CaF$_2$ | BaF$_2$ | SrF$_2$ | MgF$_2$ | LiF | TOTAL AMOUNT [α] |
|---|---|---|---|---|---|---|---|---|---|
| B76 | COMPARATIVE |  | 8.0 | 4.4 |  |  |  |  | 4.4 |
| B77 | EXAMPLE |  | 8.0 | 3.6 |  |  | 0.1 | 0.1 | 3.8 |
| B78 |  |  | 12.0 | 3.5 | 3.1 |  |  |  | 6.6 |
| B79 |  |  | 8.0 | 4.0 |  |  |  |  | 4.0 |
| B80 |  |  | 8.0 | 3.8 |  |  | 0.2 |  | 4.0 |
| B81 |  |  | 8.0 | 4.2 |  |  |  |  | 4.2 |
| B82 |  |  | 8.0 | 4.8 |  |  |  |  | 4.8 |
| B83 |  |  | 8.0 | 4.0 | 0.1 | 0.1 |  |  | 4.2 |
| B84 |  |  | 8.0 | 4.1 |  | 0.1 |  | 0.1 | 4.3 |
| B85 |  | APPLIED PTFE | 6.0 | 4.1 | 0.1 |  | 0.1 |  | 4.3 |
| B86 |  |  | 10.0 | 2.6 |  | 0.1 |  |  | 2.7 |
| B87 |  |  | 8.0 | 3.0 |  |  |  |  | 3.0 |
| B88 |  |  | 11.0 | 5.8 |  |  |  |  | 5.8 |
| B89 |  |  | 8.0 | 5.8 |  |  |  |  | 5.8 |
| B90 |  |  | 8.0 | 5.0 |  |  |  |  | 5.0 |
| B91 |  |  | 8.0 | 5.5 |  |  |  |  | 5.5 |
| B92 |  |  | 8.0 | 1.8 | 0.1 |  |  |  | <u>1.9</u> |
| B93 |  |  | 8.0 | 1.7 | 0.1 |  |  |  | <u>1.8</u> |
| B94 |  |  | 14.0 | 7.0 |  |  | 0.5 |  | <u>7.5</u> |
| B95 |  |  | 10.0 | 7.0 | 0.1 |  | 0.1 |  | <u>7.2</u> |
| B96 |  |  | 10.0 | 4.8 | 0.1 |  | 0.1 |  | 5.0 |
| B97 |  |  | 13.0 | 5.0 | 0.1 |  |  | 0.3 | 5.4 |
| B98 |  |  | 10.0 | 3.5 |  |  | 0.2 |  | 3.7 |
| B99 |  |  | 10.0 | 4.9 |  |  |  |  | 4.9 |
| B100 |  |  | 10.0 | 3.8 |  |  |  | 0.2 | 4.0 |
| B101 |  |  | 9.0 | 2.3 |  |  |  | 0.2 | 2.5 |

| WIRE No. | TiO$_2$ | SiO$_2$ | MgO | Al$_2$O$_3$ | ZrO$_2$ | CaO | TOTAL AMOUNT [β] |
|---|---|---|---|---|---|---|---|
| B76 | 0.18 | 0.30 |  | 0.12 |  | 0.03 | 0.63 |
| B77 | 0.24 | 0.28 |  |  |  | 0.02 | 0.54 |
| B78 | 0.18 | 0.25 | 0.18 | 0.10 |  | 0.03 | 0.74 |
| B79 | 0.25 | 0.36 |  |  |  | 0.02 | 0.63 |
| B80 | 0.15 | 0.40 |  |  |  | 0.10 | 0.65 |
| B81 | 0.23 | 0.32 |  | 0.08 |  | 0.02 | 0.65 |
| B82 | 0.18 | 0.29 | 0.24 |  |  | 0.02 | 0.73 |
| B83 | 0.22 | 0.31 |  |  |  | 0.03 | 0.56 |
| B84 | 0.16 | 0.32 |  | 0.08 |  | 0.10 | 0.66 |
| B85 | 0.16 | 0.34 |  |  |  | 0.03 | 0.53 |
| B86 | 0.18 | 0.32 | 0.22 |  |  | 0.03 | 0.75 |
| B87 | 0.18 | 0.28 | 0.12 |  |  | 0.03 | 0.61 |
| B88 | 0.18 | 0.28 |  | 0.15 |  | 0.02 | 0.63 |
| B89 | 0.18 | 0.28 |  | 0.15 |  | 0.02 | 0.63 |
| B90 | 0.10 | 0.20 |  |  |  | <u>0.62</u> | <u>0.92</u> |
| B91 | 0.18 | 0.28 |  | 0.15 |  | 0.03 | 0.64 |
| B92 | 0.18 | 0.25 |  |  |  | 0.03 | 0.46 |
| B93 | 0.18 | 0.25 |  |  |  | 0.02 | 0.45 |
| B94 | 0.18 | 0.20 |  | 0.12 |  | 0.02 | 0.52 |
| B95 | 0.18 | 0.20 |  | 0.15 |  | 0.03 | 0.56 |
| B96 | 0.18 | 0.20 |  | 0.15 |  | 0.03 | 0.56 |
| B97 | 0.15 | 0.20 |  |  |  | 0.10 | 0.45 |
| B98 | 0.15 | 0.20 |  |  |  | 0.10 | 0.45 |
| B99 | 0.15 | 0.20 |  |  |  | 0.10 | 0.45 |
| B100 | 0.15 | 0.20 |  |  |  | 0.10 | 0.45 |
| B101 | 0.01 | 0.11 |  |  |  | 0.05 | <u>0.17</u> |

[Table 2-16]

TABLE 2-16

| WIRE No. | CHEMICAL COMPOSITION OF FLUX [mass % WITH RESPECT TO TOTAL MASS OF WIRE] | | | | | | | | | |
|---|---|---|---|---|---|---|---|---|---|---|
| | METAL CARBONATE | | | | | TOTAL AMOUNT | IRON POWDER | ARC STABILIZER | α/β | CaF$_2$/α |
| | CaCO$_3$ | BaCO$_3$ | SrCO$_3$ | MgCO$_3$ | Li$_2$CO$_3$ | | | | | |
| B76 | | | | | 0.01 | 0.01 | 1.7 | 0.09 | 7.0 | 1.00 |
| B77 | 0.01 | | | | | 0.01 | 2.4 | 0.09 | 7.0 | 0.95 |
| B78 | | 0.01 | | | | 0.01 | 2.7 | 0.09 | 8.9 | 0.53 |
| B79 | | 0.01 | | | | 0.01 | 2.2 | 0.09 | 6.3 | 1.00 |
| B80 | | | 0.01 | | | 0.01 | 2.4 | 0.09 | 6.2 | 0.95 |
| B81 | | | 0.01 | | | 0.01 | 1.8 | 0.09 | 6.5 | 1.00 |
| B82 | | | | 0.01 | | 0.01 | 1.8 | 0.09 | 6.6 | 1.00 |
| B83 | | | | | 0.01 | 0.01 | 1.7 | 0.09 | 7.5 | 0.95 |
| B84 | 0.01 | | | | | 0.01 | 2.5 | 0.09 | 6.5 | 0.95 |
| B85 | | 0.01 | | | | 0.01 | 1.5 | 0.09 | 8.1 | 0.95 |
| B86 | | | | | | 0.00 | 5.4 | 0.09 | 3.6 | 0.96 |
| B87 | | | | | | 0.00 | 3.2 | 0.09 | 4.9 | 1.00 |
| B88 | | | | | | 0.00 | 0.4 | 0.09 | 9.2 | 1.00 |
| B89 | | | | | | 0.00 | 1.0 | 0.09 | 9.2 | 1.00 |
| B90 | | | | | | 0.00 | 1.5 | 0.09 | 5.4 | 1.00 |
| B91 | 0.65 | | | | 0.01 | 0.66 | 1.2 | 0.09 | 8.6 | 1.00 |
| B92 | | | | | | 0.00 | 5.0 | 0.09 | 4.1 | 0.95 |
| B93 | | | | | | 0.00 | 5.2 | 0.09 | 4.0 | 0.94 |
| B94 | | | | 0.05 | | 0.05 | 4.3 | 0.09 | 14.4 | 0.93 |
| B95 | | | 0.01 | | | 0.01 | 1.5 | 0.09 | 12.9 | 0.97 |
| B96 | 0.01 | | | | | 0.01 | 3.2 | 0.60 | 8.9 | 0.96 |
| B97 | 0.01 | | | | | 0.01 | 0.3 | 0.10 | 12.0 | 0.93 |
| B98 | 0.01 | | | 0.10 | | 0.11 | 1.6 | 0.10 | 8.2 | 0.95 |
| B99 | 0.01 | | | | | 0.01 | 3.8 | 0.09 | 10.9 | 1.00 |
| B100 | 0.01 | | | | 0.10 | 0.11 | 3.0 | 0.09 | 8.9 | 0.95 |
| B101 | 0.01 | | | | 0.10 | 0.11 | 3.0 | 0.09 | 14.7 | 0.92 |

[Table 3-1]

TABLE 3-1

| WIRE No. | CATEGORY | CHEMICAL COMPOSITION OF ALLOY OF WIRE [mass % WITH RESPECT TO TOTAL MASS OF WIRE] | | | | | | |
|---|---|---|---|---|---|---|---|---|
| | | C | Si | Mn | P | S | Al | Ni |
| A1 | EXAMPLE | 0.015 | 0.10 | 0.2 | 0.007 | 0.004 | 0.012 | 13.0 |
| A2 | EXAMPLE | 0.015 | 0.10 | 0.2 | 0.007 | 0.004 | 0.012 | 14.0 |
| A3 | EXAMPLE | 0.020 | 0.25 | 0.5 | 0.007 | 0.004 | 0.012 | 13.0 |
| A4 | EXAMPLE | 0.020 | 0.25 | 0.5 | 0.007 | 0.004 | 0.012 | 14.0 |
| A5 | EXAMPLE | 0.025 | 0.30 | 0.7 | 0.007 | 0.004 | 0.012 | 13.0 |
| A6 | EXAMPLE | 0.025 | 0.30 | 0.7 | 0.007 | 0.004 | 0.012 | 13.0 |
| A7 | EXAMPLE | 0.003 | 0.20 | 0.5 | 0.006 | 0.003 | 0.010 | 13.0 |
| A8 | EXAMPLE | 0.040 | 0.20 | 0.5 | 0.006 | 0.003 | 0.010 | 13.0 |
| A9 | EXAMPLE | 0.015 | 0.05 | 0.5 | 0.006 | 0.003 | 0.012 | 12.0 |
| A10 | EXAMPLE | 0.015 | 0.40 | 0.5 | 0.006 | 0.003 | 0.012 | 12.0 |
| A11 | EXAMPLE | 0.020 | 0.15 | 0.2 | 0.006 | 0.003 | 0.010 | 13.0 |
| A12 | EXAMPLE | 0.020 | 0.15 | 0.8 | 0.006 | 0.003 | 0.010 | 12.0 |
| A13 | EXAMPLE | 0.025 | 0.10 | 0.6 | 0.006 | 0.003 | 0.003 | 11.0 |
| A14 | EXAMPLE | 0.025 | 0.10 | 0.6 | 0.006 | 0.003 | 0.050 | 11.0 |
| A15 | EXAMPLE | 0.030 | 0.20 | 0.5 | 0.006 | 0.003 | 0.012 | 6.0 |
| A16 | EXAMPLE | 0.030 | 0.20 | 0.5 | 0.006 | 0.003 | 0.012 | 16.0 |
| A17 | EXAMPLE | 0.010 | 0.10 | 0.4 | 0.006 | 0.003 | 0.010 | 11.5 |
| A18 | EXAMPLE | 0.010 | 0.10 | 0.4 | 0.006 | 0.003 | 0.010 | 11.5 |
| A19 | EXAMPLE | 0.015 | 0.20 | 0.5 | 0.006 | 0.003 | 0.006 | 10.0 |
| A20 | EXAMPLE | 0.015 | 0.20 | 0.5 | 0.006 | 0.003 | 0.006 | 10.0 |
| A21 | EXAMPLE | 0.030 | 0.10 | 0.4 | 0.006 | 0.003 | 0.008 | 7.5 |
| A22 | EXAMPLE | 0.030 | 0.10 | 0.4 | 0.006 | 0.003 | 0.008 | 7.5 |
| A23 | EXAMPLE | 0.005 | 0.15 | 0.3 | 0.006 | 0.003 | 0.010 | 14.0 |
| A24 | EXAMPLE | 0.010 | 0.30 | 0.3 | 0.006 | 0.003 | 0.010 | 14.0 |
| A25 | EXAMPLE | 0.010 | 0.30 | 0.4 | 0.006 | 0.003 | 0.008 | 13.0 |
| A26 | EXAMPLE | 0.010 | 0.15 | 0.3 | 0.006 | 0.003 | 0.015 | 7.5 |
| A27 | EXAMPLE | 0.015 | 0.15 | 0.3 | 0.006 | 0.003 | 0.015 | 12.5 |

[Table 3-2]

TABLE 3-2

| WIRE No. | CHEMICAL COMPOSITION OF ALLOY OF WIRE [mass % WITH RESPECT TO TOTAL MASS OF WIRE] | | | | | | | | | SM (%) | Ceq (%) |
|---|---|---|---|---|---|---|---|---|---|---|---|
| | Cu | Cr | Mo | V | Ti | Nb | B | Mg | REM | | |
| A1 | | | | | | | | | | 0.30 | 0.378 |
| A2 | 0.2 | | | | | | | | | 0.30 | 0.403 |
| A3 | 0.2 | | | | | | | | | 0.75 | 0.439 |
| A4 | | | | | | | | | | 0.75 | 0.464 |
| A5 | | | | | | | | | | 1.00 | 0.479 |
| A6 | | | | | | | | | | 1.00 | 0.479 |
| A7 | 0.2 | | | | | | | | 0.2 | 0.70 | 0.420 |
| A8 | 0.2 | | | | | | | | | 0.70 | 0.457 |
| A9 | 0.3 | | | | 0.10 | | | | | 0.55 | 0.400 |
| A10 | | | 0.2 | | | | | | | 0.90 | 0.465 |
| A11 | | 0.2 | | | 0.03 | | | | | 0.35 | 0.425 |
| A12 | 0.2 | | | | | 0.02 | | | 0.2 | 0.95 | 0.460 |
| A13 | 0.2 | | | | | | 0.001 | | | 0.70 | 0.404 |
| A14 | | | | | | | | | | 0.70 | 0.404 |
| A15 | 0.2 | | | | | | | | | 0.70 | 0.272 |
| A16 | | | | | 0.02 | | | | | 0.70 | 0.522 |
| A17 | 0.5 | | | | | | | | | 0.50 | 0.368 |
| A18 | | 0.5 | | 0.10 | | | | | 0.4 | 0.50 | 0.475 |
| A19 | 0.2 | | 0.5 | | | | | | | 0.70 | 0.482 |
| A20 | 0.1 | | | 0.20 | | | | | 0.2 | 0.70 | 0.371 |
| A21 | | | | | 0.10 | | | | | 0.50 | 0.288 |
| A22 | 0.1 | | 0.3 | | | 0.10 | | | 0.4 | 0.50 | 0.363 |
| A23 | 0.1 | 0.2 | | | 0.02 | | 0.010 | | | 0.45 | 0.451 |
| A24 | | | | | | | | | 0.6 | 0.60 | 0.423 |
| A25 | 0.2 | 0.1 | 0.1 | 0.05 | 0.02 | 0.01 | 0.002 | | 0.1 | 0.70 | 0.463 |
| A26 | | | | | 0.02 | | | | | 0.45 | 0.254 |
| A27 | | 0.2 | 0.4 | | | | | | | 0.45 | 0.524 |

[Table 3-3]

TABLE 3-3

| WIRE No. | CATEGORY | CHEMICAL COMPOSITION OF ALLOY OF WIRE [mass % WITH RESPECT TO TOTAL MASS OF WIRE] | | | | | | |
|---|---|---|---|---|---|---|---|---|
| | | C | Si | Mn | P | S | Al | Ni |
| A28 | EXAMPLE | 0.020 | 0.10 | 0.8 | 0.006 | 0.003 | 0.030 | 10.5 |
| A29 | EXAMPLE | 0.020 | 0.40 | 0.5 | 0.006 | 0.003 | 0.030 | 10.5 |
| A30 | EXAMPLE | 0.015 | 0.25 | 0.4 | 0.006 | 0.003 | 0.012 | 13.0 |
| A31 | EXAMPLE | 0.015 | 0.25 | 0.4 | 0.006 | 0.003 | 0.012 | 13.0 |
| A32 | EXAMPLE | 0.020 | 0.15 | 0.5 | 0.006 | 0.003 | 0.008 | 10.0 |
| A33 | EXAMPLE | 0.020 | 0.15 | 0.5 | 0.006 | 0.003 | 0.008 | 13.0 |
| A34 | EXAMPLE | 0.020 | 0.20 | 0.5 | 0.006 | 0.003 | 0.008 | 10.0 |
| A35 | EXAMPLE | 0.020 | 0.20 | 0.5 | 0.006 | 0.003 | 0.008 | 13.0 |
| A36 | EXAMPLE | 0.010 | 0.10 | 0.6 | 0.006 | 0.003 | 0.008 | 9.0 |
| A37 | EXAMPLE | 0.010 | 0.30 | 0.4 | 0.006 | 0.003 | 0.008 | 9.0 |
| A38 | EXAMPLE | 0.030 | 0.10 | 0.6 | 0.006 | 0.003 | 0.008 | 9.0 |
| A39 | EXAMPLE | 0.030 | 0.30 | 0.4 | 0.006 | 0.003 | 0.008 | 9.0 |
| A40 | EXAMPLE | 0.020 | 0.20 | 0.5 | 0.006 | 0.003 | 0.008 | 13.0 |
| A41 | EXAMPLE | 0.020 | 0.20 | 0.5 | 0.006 | 0.003 | 0.008 | 13.0 |
| A42 | EXAMPLE | 0.020 | 0.20 | 0.5 | 0.006 | 0.003 | 0.008 | 13.0 |
| A43 | EXAMPLE | 0.035 | 0.30 | 0.7 | 0.006 | 0.003 | 0.008 | 14.0 |
| A44 | EXAMPLE | 0.020 | 0.20 | 0.5 | 0.006 | 0.003 | 0.008 | 13.0 |
| A45 | EXAMPLE | 0.020 | 0.20 | 0.5 | 0.006 | 0.003 | 0.008 | 13.0 |
| A46 | EXAMPLE | 0.020 | 0.20 | 0.5 | 0.006 | 0.003 | 0.008 | 13.0 |
| A47 | EXAMPLE | 0.020 | 0.10 | 0.8 | 0.006 | 0.003 | 0.030 | 12.5 |
| A48 | EXAMPLE | 0.020 | 0.40 | 0.5 | 0.006 | 0.003 | 0.030 | 10.5 |
| A49 | EXAMPLE | 0.015 | 0.25 | 0.4 | 0.006 | 0.003 | 0.012 | 13.0 |
| A50 | EXAMPLE | 0.030 | 0.08 | 0.4 | 0.006 | 0.004 | 0.011 | 12.8 |
| A51 | EXAMPLE | 0.030 | 0.11 | 0.4 | 0.006 | 0.004 | 0.011 | 13.1 |
| A52 | EXAMPLE | 0.030 | 0.08 | 0.4 | 0.006 | 0.004 | 0.011 | 13.3 |
| A53 | EXAMPLE | 0.030 | 0.12 | 0.4 | 0.006 | 0.004 | 0.011 | 13.5 |
| A54 | EXAMPLE | 0.015 | 0.25 | 0.3 | 0.008 | 0.004 | 0.010 | 13.0 |
| A55 | EXAMPLE | 0.015 | 0.10 | 0.5 | 0.008 | 0.004 | 0.010 | 14.0 |

[Table 3-4]

TABLE 3-4

| WIRE No. | CHEMICAL COMPOSITION OF FLUX [mass % WITH RESPECT TO TOTAL MASS OF WIRE] | | | | | | | | | SM (%) | Ceq (%) |
|---|---|---|---|---|---|---|---|---|---|---|---|
| | Cu | Cr | Mo | V | Ti | Nb | B | Mg | REM | | |
| A28 | 0.2 | | | | 0.01 | | 0.002 | | | 0.90 | 0.420 |
| A29 | 0.2 | | | | 0.01 | 0.01 | | 0.2 | | 0.90 | 0.383 |
| A30 | 0.2 | | 0.1 | 0.05 | | | | | | 0.65 | 0.446 |
| A31 | 0.2 | 0.1 | 0.1 | | 0.04 | | | | | 0.65 | 0.462 |
| A32 | 0.2 | | | | | | | | | 0.65 | 0.360 |
| A33 | 0.2 | | | | | | | 0.2 | | 0.65 | 0.435 |
| A34 | 0.2 | | | | 0.01 | | | | | 0.70 | 0.362 |
| A35 | 0.2 | | | | 0.01 | | | | | 0.70 | 0.437 |
| A36 | | | 0.3 | | | | | | | 0.70 | 0.414 |
| A37 | 0.2 | 0.2 | | | 0.01 | | | | | 0.70 | 0.354 |
| A38 | 0.2 | | | | | | | | | 0.70 | 0.359 |
| A39 | | | 0.1 | 0.04 | | | | 0.4 | | 0.70 | 0.362 |
| A40 | 0.2 | | | 0.03 | 0.01 | | | | | 0.70 | 0.439 |
| A41 | 0.2 | | | 0.03 | 0.01 | | | | 0.050 | 0.70 | 0.439 |
| A42 | | | | | 0.01 | | | | 0.010 | 0.70 | 0.437 |
| A43 | | | | | | | | | 0.001 | 1.00 | 0.514 |
| A44 | | | | 0.05 | 0.01 | | | | | 0.70 | 0.440 |
| A45 | 0.2 | | | | 0.01 | | | | | 0.70 | 0.437 |
| A46 | 0.2 | | | | 0.01 | | | | | 0.70 | 0.437 |
| A47 | 0.2 | | | | 0.01 | | 0.002 | | | 0.90 | 0.470 |
| A48 | 0.2 | | | | 0.01 | 0.01 | | 0.2 | | 0.90 | 0.383 |
| A49 | 0.2 | | 0.1 | 0.05 | | | | | | 0.65 | 0.446 |
| A50 | | | | | 0.02 | | | | | 0.48 | 0.420 |
| A51 | | | | | 0.02 | | | 0.3 | | 0.51 | 0.429 |
| A52 | | | | | 0.02 | | | | | 0.48 | 0.433 |
| A53 | | | | | 0.02 | | | 0.4 | | 0.52 | 0.439 |
| A54 | | | | | | | | | | 0.55 | 0.400 |
| A55 | 0.3 | | | | | | | | | 0.60 | 0.453 |

[Table 3-5]

TABLE 3-5

| WIRE No. | CATEGORY | CHEMICAL COMPOSITION OF FLUX [mass % WITH RESPECT TO TOTAL MASS OF WIRE] | | | | | | |
|---|---|---|---|---|---|---|---|---|
| | | C | Si | Mn | P | S | Al | Ni |
| B1 | COMPARATIVE | 0.010 | 0.20 | 0.3 | 0.008 | 0.004 | 0.012 | 9.5 |
| B2 | EXAMPLE | 0.010 | 0.25 | 0.4 | 0.008 | 0.004 | 0.012 | 9.5 |
| B3 | | 0.020 | 0.15 | 0.5 | 0.008 | 0.004 | 0.010 | 13.0 |
| B4 | | 0.020 | 0.15 | 0.4 | 0.008 | 0.004 | 0.012 | 12.5 |
| B5 | | 0.010 | 0.10 | 0.3 | 0.008 | 0.004 | 0.012 | 12.5 |
| B6 | | 0.015 | 0.15 | 0.5 | 0.008 | 0.004 | 0.010 | 14.0 |
| B7 | | 0.025 | 0.25 | 0.3 | 0.008 | 0.004 | 0.012 | 13.0 |
| B8 | | 0.025 | 0.20 | 0.4 | 0.008 | 0.004 | 0.012 | 13.0 |
| B9 | | 0.015 | 0.15 | 0.5 | 0.008 | 0.004 | 0.010 | 11.5 |
| B10 | | 0.015 | 0.15 | 0.5 | 0.008 | 0.004 | 0.010 | 11.5 |
| B11 | | 0.002 | 0.20 | 0.4 | 0.008 | 0.004 | 0.008 | 13.0 |
| B12 | | 0.045 | 0.20 | 0.4 | 0.008 | 0.004 | 0.008 | 13.0 |
| B13 | | 0.015 | 0.03 | 0.3 | 0.008 | 0.004 | 0.008 | 11.5 |
| B14 | | 0.015 | 0.48 | 0.3 | 0.008 | 0.004 | 0.008 | 11.5 |
| B15 | | 0.020 | 0.10 | 0.1 | 0.007 | 0.005 | 0.008 | 12.0 |
| B16 | | 0.020 | 0.10 | 0.9 | 0.007 | 0.005 | 0.008 | 12.0 |
| B17 | | 0.015 | 0.20 | 0.5 | 0.022 | 0.004 | 0.012 | 9.0 |
| B18 | | 0.015 | 0.20 | 0.5 | 0.008 | 0.012 | 0.012 | 9.0 |
| B19 | | 0.020 | 0.25 | 0.4 | 0.007 | 0.004 | 0.002 | 11.5 |
| B20 | | 0.020 | 0.25 | 0.4 | 0.008 | 0.004 | 0.056 | 11.5 |
| B21 | | 0.025 | 0.10 | 0.6 | 0.008 | 0.004 | 0.012 | 5.5 |
| B22 | | 0.025 | 0.10 | 0.6 | 0.008 | 0.004 | 0.012 | 8.0 |
| B23 | | 0.015 | 0.15 | 0.5 | 0.008 | 0.004 | 0.008 | 8.0 |
| B24 | | 0.015 | 0.15 | 0.5 | 0.007 | 0.005 | 0.008 | 9.0 |
| B25 | | 0.020 | 0.35 | 0.3 | 0.007 | 0.005 | 0.008 | 11.5 |

[Table 3-6]

TABLE 3-6

| WIRE No. | CHEMICAL COMPOSITION OF FLUX [mass % WITH RESPECT TO TOTAL MASS OF WIRE] | | | | | | | | | SM (%) | Ceq (%) |
|---|---|---|---|---|---|---|---|---|---|---|---|
| | Cu | Cr | Mo | V | Ti | Nb | B | Mg | REM | | |
| B1 | | | | | | | | | | 0.50 | 0.306 |
| B2 | | | | | | | | | | 0.65 | 0.325 |
| B3 | | | | | | | | | | 0.65 | 0.435 |
| B4 | 0.2 | | | | | | | | | 0.55 | 0.405 |
| B5 | | | | | | | | | | 0.40 | 0.377 |
| B6 | | | | | | | | | | 0.65 | 0.455 |
| B7 | | | | | | | | | | 0.55 | 0.410 |
| B8 | 0.2 | | | | | | | | | 0.60 | 0.425 |
| B9 | 0.3 | | | | 0.02 | | | | | 0.65 | 0.392 |
| B10 | | | | | | | | | | 0.65 | 0.392 |
| B11 | 0.2 | 0.1 | | | 0.02 | | | | | 0.60 | 0.422 |
| B12 | 0.2 | | | | | | | | | 0.60 | 0.445 |
| B13 | | 0.1 | 0.2 | 0.05 | | | | | | 0.33 | 0.427 |
| B14 | 0.3 | | | | 0.02 | | 0.003 | | 0.3 | 0.78 | 0.373 |
| B15 | 0.3 | | 0.2 | | | | | | | <u>0.20</u> | 0.391 |
| B16 | | | | | | | | 0.2 | | 1.00 | 0.474 |
| B17 | | 0.1 | | | 0.05 | 0.02 | | | | 0.70 | 0.352 |
| B18 | 0.2 | 0.2 | | 0.10 | | | 0.004 | | | 0.70 | 0.379 |
| B19 | 0.2 | | 0.2 | | | | | 0.2 | | 0.65 | 0.435 |
| B20 | 0.1 | | 0.1 | 0.03 | 0.02 | | | | | 0.65 | 0.412 |
| B21 | | | | 0.04 | | 0.01 | | | | 0.70 | 0.270 |
| B22 | <u>0.6</u> | 0.1 | | | | | 0.003 | 0.2 | | 0.70 | 0.349 |
| B23 | | <u>0.6</u> | | | 0.02 | | | | | 0.65 | 0.425 |
| B24 | 0.2 | | <u>0.6</u> | | 0.03 | | | | 0.4 | 0.65 | 0.480 |
| B25 | 0.2 | 0.1 | | <u>0.30</u> | 0.02 | | | | | 0.65 | 0.414 |

[Table 3-7]

TABLE 3-7

| WIRE No. | CATEGORY | CHEMICAL COMPOSITION OF FLUX [mass % WITH RESPECT TO TOTAL MASS OF WIRE] | | | | | | |
|---|---|---|---|---|---|---|---|---|
| | | C | Si | Mn | P | S | Al | Ni |
| B26 | COMPARATIVE | 0.020 | 0.35 | 0.3 | 0.007 | 0.005 | 0.008 | 12.0 |
| B27 | EXAMPLE | 0.025 | 0.30 | 0.3 | 0.007 | 0.005 | 0.008 | 9.5 |
| B28 | | 0.025 | 0.30 | 0.2 | 0.007 | 0.005 | 0.008 | 13.5 |
| B29 | | 0.015 | 0.20 | 0.2 | 0.007 | 0.004 | 0.012 | 12.0 |
| B30 | | 0.015 | 0.05 | 0.2 | 0.007 | 0.004 | 0.012 | 13.5 |
| B31 | | 0.010 | 0.30 | 0.8 | 0.007 | 0.004 | 0.012 | 10.0 |
| B32 | | 0.020 | 0.15 | 0.2 | 0.007 | 0.004 | 0.012 | 7.0 |
| B33 | | 0.020 | 0.20 | 0.5 | 0.008 | 0.004 | 0.012 | 13.0 |
| B34 | | 0.015 | 0.05 | 0.6 | 0.008 | 0.004 | 0.010 | 7.5 |
| B35 | | 0.015 | 0.20 | 0.4 | 0.008 | 0.004 | 0.010 | 13.5 |
| B36 | | <u>0.056</u> | 0.36 | 0.4 | 0.011 | 0.002 | 0.006 | 10.6 |
| B37 | | <u>0.041</u> | 0.12 | 0.6 | 0.002 | 0.008 | <u>0.384</u> | 10.6 |
| B38 | | 0.025 | 0.10 | 0.6 | 0.002 | 0.008 | 0.030 | 10.5 |
| B39 | | 0.035 | 0.20 | 0.6 | 0.002 | 0.008 | 0.025 | 13.5 |
| B40 | | 0.025 | 0.25 | 0.6 | 0.002 | 0.008 | 0.020 | 11.5 |
| B41 | | 0.040 | 0.20 | 0.6 | 0.002 | 0.008 | 0.027 | 12.0 |
| B42 | | 0.022 | 0.15 | 0.6 | 0.002 | 0.008 | 0.019 | 10.2 |
| B43 | | 0.035 | 0.25 | 0.6 | 0.002 | 0.008 | 0.022 | 9.5 |
| B44 | | 0.030 | 0.20 | 0.6 | 0.002 | 0.008 | 0.034 | 10.5 |
| B45 | | 0.030 | 0.20 | 0.6 | 0.002 | 0.008 | 0.034 | <u>16.5</u> |
| B46 | | 0.010 | 0.10 | 0.3 | 0.008 | 0.004 | 0.012 | 12.5 |
| B47 | | 0.015 | 0.15 | 0.5 | 0.008 | 0.004 | 0.010 | 14.0 |
| B48 | | 0.015 | 0.10 | 0.5 | 0.008 | 0.004 | 0.010 | 13.5 |
| B49 | | 0.015 | 0.15 | 0.4 | 0.006 | 0.004 | 0.011 | 12.5 |
| B50 | | 0.015 | 0.15 | 0.4 | 0.006 | 0.004 | 0.011 | 12.5 |
| B51 | | 0.015 | 0.15 | 0.4 | 0.006 | 0.004 | 0.011 | 10.5 |

[Table 3-8]

TABLE 3-8

| WIRE No. | CHEMICAL COMPOSITION OF FLUX [mass % WITH RESPECT TO TOTAL MASS OF WIRE] | | | | | | | | | SM (%) | Ceq (%) |
|---|---|---|---|---|---|---|---|---|---|---|---|
| | Cu | Cr | Mo | V | Ti | Nb | B | Mg | REM | | |
| B26 | 0.1 | | | | 0.15 | | | 0.3 | | 0.65 | 0.385 |
| B27 | 0.3 | 0.1 | 0.2 | | | 0.15 | | | | 0.60 | 0.395 |
| B28 | | | | 0.05 | | | 0.012 | | | 0.50 | 0.412 |
| B29 | 0.2 | | 0.2 | | 0.02 | | | 0.7 | | 0.40 | 0.407 |
| B30 | 0.2 | | | | | | | | | 0.25 | 0.388 |
| B31 | | | | 0.08 | | | | | | 1.10 | 0.412 |
| B32 | 0.2 | | | | | 0.02 | | | | 0.35 | 0.235 |
| B33 | | 0.2 | 0.3 | | | | | | | 0.70 | 0.552 |
| B34 | 0.2 | | 0.1 | | 0.02 | | 0.004 | | | 0.65 | 0.330 |
| B35 | | 0.1 | | 0.03 | | | | 0.2 | | 0.60 | 0.450 |
| B36 | 0.3 | | | | 0.01 | | | | | 0.76 | 0.403 |
| B37 | 0.4 | | | | | | 0.002 | | | 0.72 | 0.411 |
| B38 | 0.4 | | | | | | | | 0.06 | 0.70 | 0.392 |
| B39 | 0.4 | | | | | | | | | 0.80 | 0.481 |
| B40 | 0.4 | | | | | | | | | 0.85 | 0.423 |
| B41 | 0.4 | | | | | | | | | 0.80 | 0.448 |
| B42 | 0.4 | | | | | | | | | 0.75 | 0.383 |
| B43 | 0.4 | | | | | | | | | 0.85 | 0.383 |
| B44 | 0.4 | | | | | | | | | 0.80 | 0.401 |
| B45 | 0.4 | | | | | | | | | 0.80 | 0.551 |
| B46 | | | | | | | | | | 0.40 | 0.377 |
| B47 | | | | | | | | | | 0.65 | 0.455 |
| B48 | 0.3 | | | | | | | | | 0.60 | 0.440 |
| B49 | 0.2 | | | | | | | | | 0.55 | 0.400 |
| B50 | 0.2 | | | | | | | | | 0.55 | 0.400 |
| B51 | 0.2 | | | | | 0.04 | | 0.4 | 0.02 | 0.55 | 0.350 |

[Table 3-9]

TABLE 3-9

| WIRE No. | CATEGORY | HOOP No. | CHEMICAL COMPOSITION OF FLUX [mass % WITH RESPECT TO TOTAL MASS OF WIRE] | | | | | | |
|---|---|---|---|---|---|---|---|---|---|
| | | | C | Si | Mn | P | S | Al | Ni |
| A56 | EXAMPLE | F4 | 0.010 | 0.15 | 0.4 | 0.006 | 0.004 | 0.011 | 14.5 |
| A57 | EXAMPLE | F4 | 0.010 | 0.15 | 0.4 | 0.006 | 0.004 | 0.011 | 13.3 |
| A58 | EXAMPLE | F4 | 0.020 | 0.15 | 0.3 | 0.006 | 0.004 | 0.011 | 13.3 |
| A59 | EXAMPLE | F4 | 0.020 | 0.15 | 0.3 | 0.006 | 0.004 | 0.011 | 14.5 |
| A60 | EXAMPLE | F4 | 0.030 | 0.10 | 0.2 | 0.006 | 0.004 | 0.011 | 13.3 |
| A61 | EXAMPLE | F4 | 0.030 | 0.40 | 0.6 | 0.006 | 0.004 | 0.011 | 13.3 |
| A62 | EXAMPLE | F6 | 0.003 | 0.20 | 0.5 | 0.006 | 0.004 | 0.011 | 7.8 |
| A63 | EXAMPLE | F3 | 0.040 | 0.20 | 0.4 | 0.006 | 0.004 | 0.011 | 11.5 |
| A64 | EXAMPLE | F3 | 0.015 | 0.05 | 0.4 | 0.006 | 0.004 | 0.011 | 11.5 |
| A65 | EXAMPLE | F3 | 0.015 | 0.40 | 0.3 | 0.006 | 0.004 | 0.011 | 11.5 |
| A66 | EXAMPLE | F3 | 0.015 | 0.20 | 0.2 | 0.006 | 0.004 | 0.011 | 11.5 |
| A67 | EXAMPLE | F3 | 0.015 | 0.15 | 0.8 | 0.006 | 0.004 | 0.011 | 11.5 |
| A68 | EXAMPLE | F5 | 0.030 | 0.18 | 0.5 | 0.006 | 0.004 | 0.011 | 11.5 |
| A69 | EXAMPLE | F5 | 0.030 | 0.18 | 0.5 | 0.006 | 0.004 | 0.003 | 11.5 |
| A70 | EXAMPLE | F1 | 0.030 | 0.15 | 0.5 | 0.006 | 0.004 | 0.011 | 6.0 |
| A71 | EXAMPLE | F4 | 0.030 | 0.15 | 0.5 | 0.006 | 0.004 | 0.011 | 16.0 |
| A72 | EXAMPLE | F4 | 0.025 | 0.15 | 0.4 | 0.006 | 0.004 | 0.011 | 13.3 |
| A73 | EXAMPLE | F4 | 0.015 | 0.15 | 0.3 | 0.006 | 0.004 | 0.011 | 13.3 |
| A74 | EXAMPLE | F3 | 0.015 | 0.20 | 0.3 | 0.006 | 0.004 | 0.011 | 11.5 |
| A75 | EXAMPLE | F4 | 0.025 | 0.20 | 0.4 | 0.006 | 0.004 | 0.011 | 13.8 |
| A76 | EXAMPLE | F4 | 0.025 | 0.25 | 0.3 | 0.006 | 0.004 | 0.011 | 13.9 |
| A77 | EXAMPLE | F4 | 0.025 | 0.25 | 0.3 | 0.006 | 0.004 | 0.011 | 13.6 |
| A78 | EXAMPLE | F4 | 0.025 | 0.30 | 0.3 | 0.006 | 0.004 | 0.011 | 13.3 |
| A79 | EXAMPLE | F4 | 0.025 | 0.30 | 0.3 | 0.006 | 0.004 | 0.011 | 13.3 |
| A80 | EXAMPLE | F2 | 0.010 | 0.20 | 0.5 | 0.006 | 0.004 | 0.011 | 9.0 |
| A81 | EXAMPLE | F2 | 0.010 | 0.20 | 0.2 | 0.006 | 0.004 | 0.011 | 8.3 |

[Table 3-10]

TABLE 3-10

| WIRE No. | CHEMICAL COMPOSITION OF FLUX [mass % WITH RESPECT TO TOTAL MASS OF WIRE] | | | | | | | | SM (%) | Ceq (%) |
|---|---|---|---|---|---|---|---|---|---|---|
| | Cu | Cr | Mo | V | Ti | Nb | B | Mg | REM | | |
| A56 | | | | | | | | | | 0.55 | 0.445 |
| A57 | | | | | | | | | | 0.55 | 0.415 |
| A58 | 0.2 | | | | | | | | | 0.45 | 0.409 |
| A59 | | | | | | | | | | 0.45 | 0.439 |
| A60 | 0.1 | | 0.2 | | 0.02 | | | | | 0.30 | 0.441 |
| A61 | | | | | 0.1 | | | | | 1.00 | 0.504 |
| A62 | 0.2 | 0.3 | | | | 0.03 | | | | 0.70 | 0.350 |
| A63 | 0.2 | | | | | | | | | 0.60 | 0.403 |
| A64 | | | | 0.01 | | | 0.004 | | 0.2 | 0.45 | 0.372 |
| A65 | | 0.1 | 0.1 | | | | | | | 0.70 | 0.414 |
| A66 | 0.2 | | 0.2 | | | 0.02 | | | | 0.40 | 0.394 |
| A67 | 0.1 | | | | | | | | 0.2 | 0.95 | 0.442 |
| A68 | | | | | | 0.01 | | | 0.4 | 0.68 | 0.408 |
| A69 | | 0.2 | | 0.06 | | | | | | 0.68 | 0.453 |
| A70 | 0.2 | | 0.3 | 0.05 | 0.02 | | | | | 0.65 | 0.348 |
| A71 | 0.2 | | | | 0.02 | | 0.004 | | 0.2 | 0.65 | 0.520 |
| A72 | 0.5 | | | | | | | | | 0.55 | 0.430 |
| A73 | | 0.5 | | | | | | | | 0.45 | 0.504 |
| A74 | 0.2 | | 0.5 | | 0.01 | | | | | 0.50 | 0.486 |
| A75 | 0.1 | 0.2 | 0.1 | 0.20 | | | | | | 0.60 | 0.524 |
| A76 | 0.2 | | 0.1 | | 0.10 | | | | | 0.55 | 0.458 |
| A77 | | | | 0.04 | | 0.10 | 0.003 | | 0.2 | 0.55 | 0.428 |
| A78 | 0.2 | | | | | | 0.010 | | 0.3 | 0.60 | 0.420 |
| A79 | | | 0.2 | | 0.03 | | | | 0.6 | 0.60 | 0.470 |
| A80 | 0.2 | 0.2 | 0.1 | 0.04 | 0.02 | 0.01 | 0.001 | | 0.2 | 0.70 | 0.395 |
| A81 | 0.2 | | | | | | | | | 0.40 | 0.259 |

[Table 3-11]

TABLE 3-11

| WIRE No. | CATEGORY | HOOP No. | CHEMICAL COMPOSITION OF FLUX [mass % WITH RESPECT TO TOTAL MASS OF WIRE] | | | | | | |
|---|---|---|---|---|---|---|---|---|---|
| | | | C | Si | Mn | P | S | Al | Ni |
| A82 | EXAMPLE | F4 | 0.020 | 0.20 | 0.5 | 0.006 | 0.004 | 0.011 | 13.3 |
| A83 | EXAMPLE | F3 | 0.025 | 0.20 | 0.5 | 0.006 | 0.004 | 0.011 | 11.8 |
| A84 | EXAMPLE | F3 | 0.030 | 0.30 | 0.6 | 0.006 | 0.004 | 0.011 | 11.5 |
| A85 | EXAMPLE | F2 | 0.015 | 0.30 | 0.4 | 0.006 | 0.004 | 0.011 | 8.3 |
| A86 | EXAMPLE | F4 | 0.015 | 0.15 | 0.4 | 0.006 | 0.004 | 0.011 | 13.3 |
| A87 | EXAMPLE | F2 | 0.015 | 0.20 | 0.5 | 0.006 | 0.004 | 0.011 | 8.3 |
| A88 | EXAMPLE | F4 | 0.015 | 0.15 | 0.4 | 0.006 | 0.004 | 0.011 | 13.1 |
| A89 | EXAMPLE | F2 | 0.015 | 0.20 | 0.5 | 0.006 | 0.004 | 0.011 | 8.1 |
| A90 | EXAMPLE | F4 | 0.015 | 0.15 | 0.4 | 0.006 | 0.004 | 0.011 | 13.3 |
| A91 | EXAMPLE | F2 | 0.010 | 0.15 | 0.3 | 0.006 | 0.004 | 0.011 | 8.3 |
| A92 | EXAMPLE | F2 | 0.010 | 0.30 | 0.4 | 0.006 | 0.004 | 0.011 | 8.3 |
| A93 | EXAMPLE | F2 | 0.030 | 0.15 | 0.3 | 0.006 | 0.004 | 0.011 | 9.0 |
| A94 | EXAMPLE | F2 | 0.030 | 0.30 | 0.4 | 0.006 | 0.004 | 0.011 | 8.3 |
| A95 | EXAMPLE | F4 | 0.025 | 0.20 | 0.5 | 0.006 | 0.004 | 0.011 | 13.3 |
| A96 | EXAMPLE | F4 | 0.020 | 0.10 | 0.4 | 0.006 | 0.004 | 0.011 | 13.3 |
| A97 | EXAMPLE | F4 | 0.035 | 0.25 | 0.6 | 0.006 | 0.004 | 0.011 | 13.3 |
| A98 | EXAMPLE | F4 | 0.025 | 0.15 | 0.4 | 0.006 | 0.004 | 0.011 | 13.3 |
| A99 | EXAMPLE | F4 | 0.015 | 0.15 | 0.4 | 0.006 | 0.004 | 0.011 | 13.3 |
| A100 | EXAMPLE | F3 | 0.030 | 0.05 | 0.4 | 0.006 | 0.004 | 0.011 | 12.5 |
| A101 | EXAMPLE | F3 | 0.030 | 0.08 | 0.4 | 0.006 | 0.004 | 0.011 | 12.8 |
| A102 | EXAMPLE | F3 | 0.030 | 0.11 | 0.4 | 0.006 | 0.004 | 0.011 | 13.1 |
| A103 | EXAMPLE | F3 | 0.030 | 0.08 | 0.4 | 0.006 | 0.004 | 0.011 | 13.3 |
| A104 | EXAMPLE | F3 | 0.030 | 0.12 | 0.4 | 0.006 | 0.004 | 0.011 | 13.5 |
| A105 | EXAMPLE | MILD STEEL | 0.020 | 0.11 | 0.4 | 0.006 | 0.004 | 0.011 | 13.1 |
| A106 | EXAMPLE | F1 | 0.020 | 0.08 | 0.4 | 0.006 | 0.004 | 0.011 | 13.3 |
| A107 | EXAMPLE | F4 | 0.010 | 0.20 | 0.5 | 0.006 | 0.004 | 0.011 | 13.3 |
| A108 | EXAMPLE | F4 | 0.015 | 0.05 | 0.4 | 0.006 | 0.004 | 0.045 | 13.4 |

[Table 3-12]

TABLE 3-12

| WIRE No. | CHEMICAL COMPOSITION OF FLUX [mass % WITH RESPECT TO TOTAL MASS OF WIRE] | | | | | | | | SM (%) | Ceq (%) |
|---|---|---|---|---|---|---|---|---|---|---|
| | Cu | Cr | Mo | V | Ti | Nb | B | Mg | REM | | |
| A82 | 0.3 | 0.1 | 0.2 | 0.12 | | | | | | 0.70 | 0.523 |
| A83 | 0.2 | | | 0.10 | 0.02 | | | | | 0.70 | 0.419 |
| A84 | | 0.1 | 0.2 | | | | | 0.2 | | 0.90 | 0.500 |
| A85 | 0.2 | 0.1 | 0.1 | 0.05 | 0.02 | | 0.002 | | | 0.70 | 0.350 |
| A86 | 0.2 | | | | | | | | | 0.55 | 0.420 |
| A87 | 0.2 | | 0.2 | 0.05 | | | | 0.3 | | 0.70 | 0.368 |
| A88 | 0.2 | | | | 0.02 | | | | | 0.55 | 0.415 |
| A89 | 0.2 | | | | | | | 0.4 | | 0.70 | 0.309 |
| A90 | 0.2 | | | | 0.02 | | 0.002 | | | 0.55 | 0.420 |
| A91 | | 0.1 | 0.1 | | | | | | | 0.45 | 0.319 |
| A92 | 0.2 | 0.2 | | | | 0.01 | | | | 0.70 | 0.337 |
| A93 | 0.2 | | | 0.05 | | | | | | 0.45 | 0.315 |
| A94 | | | 0.2 | | | | | | | 0.70 | 0.367 |
| A95 | 0.2 | | | 0.06 | 0.02 | | | | | 0.70 | 0.453 |
| A96 | | | | | 0.02 | | | | 0.050 | 0.50 | 0.423 |
| A97 | 0.2 | | 0.1 | | | | | | 0.010 | 0.85 | 0.503 |
| A98 | 0.1 | | 0.1 | | 0.02 | | | | 0.001 | 0.55 | 0.430 |
| A99 | | | | | | | | | | 0.55 | 0.420 |
| A100 | | | | | 0.02 | | | 0.5 | | 0.45 | 0.411 |
| A101 | | | | | 0.02 | | | | | 0.48 | 0.420 |
| A102 | | | | | 0.02 | | | 0.3 | 0.020 | 0.51 | 0.429 |
| A103 | | | | | 0.02 | | | | | 0.48 | 0.433 |
| A104 | | | | | 0.02 | | | 0.4 | | 0.52 | 0.439 |
| A105 | | | | | 0.02 | | | 0.3 | | 0.51 | 0.419 |
| A106 | | | | | 0.01 | | | 0.3 | | 0.48 | 0.423 |
| A107 | 0.2 | | | | | | | | | 0.70 | 0.434 |
| A108 | 0.1 | | | | 0.07 | | | 0.6 | 0.020 | 0.45 | 0.419 |

[Table 3-13]

TABLE 3-13

| WIRE No. | CATEGORY | HOOP No. | CHEMICAL COMPOSITION OF FLUX [mass % WITH RESPECT TO TOTAL MASS OF WIRE] | | | | | | |
|---|---|---|---|---|---|---|---|---|---|
| | | | C | Si | Mn | P | S | Al | Ni |
| B52 | COMPARATIVE | F4 | 0.025 | 0.15 | 0.4 | 0.006 | 0.004 | 0.011 | 13.3 |
| B53 | EXAMPLE | F4 | 0.025 | 0.15 | 0.2 | 0.006 | 0.004 | 0.011 | 13.3 |
| B54 | | F4 | 0.020 | 0.20 | 0.5 | 0.006 | 0.004 | 0.011 | 13.3 |
| B55 | | F4 | 0.020 | 0.20 | 0.5 | 0.006 | 0.004 | 0.011 | 13.3 |
| B56 | | F4 | 0.020 | 0.25 | 0.4 | 0.006 | 0.004 | 0.011 | 13.3 |
| B57 | | F4 | 0.020 | 0.25 | 0.4 | 0.006 | 0.004 | 0.011 | 13.3 |
| B58 | | F4 | 0.030 | 0.20 | 0.5 | 0.006 | 0.004 | 0.011 | 13.3 |
| B59 | | F4 | 0.025 | 0.25 | 0.4 | 0.006 | 0.004 | 0.011 | 13.3 |
| B60 | | F4 | 0.025 | 0.25 | 0.4 | 0.006 | 0.004 | 0.011 | 13.3 |
| B61 | | F4 | 0.030 | 0.20 | 0.5 | 0.006 | 0.004 | 0.011 | 13.3 |
| B62 | | F4 | 0.030 | 0.20 | 0.5 | 0.006 | 0.004 | 0.011 | 13.3 |
| B63 | | F6 | 0.002 | 0.15 | 0.5 | 0.006 | 0.004 | 0.011 | 7.8 |
| B64 | | F3 | 0.044 | 0.15 | 0.5 | 0.006 | 0.004 | 0.011 | 11.5 |
| B65 | | F3 | 0.025 | 0.03 | 0.3 | 0.006 | 0.004 | 0.011 | 11.5 |
| B66 | | F3 | 0.025 | 0.46 | 0.3 | 0.006 | 0.004 | 0.011 | 11.5 |
| B67 | | F3 | 0.020 | 0.30 | 0.1 | 0.006 | 0.004 | 0.011 | 11.5 |
| B68 | | F3 | 0.020 | 0.10 | 0.9 | 0.006 | 0.004 | 0.011 | 11.5 |
| B69 | | F3 | 0.030 | 0.20 | 0.6 | 0.022 | 0.004 | 0.011 | 11.5 |
| B70 | | F3 | 0.030 | 0.20 | 0.6 | 0.006 | 0.012 | 0.011 | 11.5 |
| B71 | | F5 | 0.020 | 0.20 | 0.3 | 0.006 | 0.004 | 0.002 | 11.5 |
| B72 | | F5 | 0.020 | 0.20 | 0.3 | 0.006 | 0.004 | 0.056 | 11.5 |
| B73 | | F1 | 0.015 | 0.20 | 0.4 | 0.006 | 0.004 | 0.011 | 5.5 |
| B74 | | F3 | 0.020 | 0.25 | 0.5 | 0.006 | 0.004 | 0.011 | 11.5 |
| B75 | | F3 | 0.020 | 0.25 | 0.4 | 0.006 | 0.004 | 0.011 | 11.5 |
| B76 | | F3 | 0.020 | 0.15 | 0.3 | 0.006 | 0.004 | 0.011 | 11.5 |
| B77 | | F3 | 0.015 | 0.20 | 0.5 | 0.006 | 0.004 | 0.011 | 11.5 |

[Table 3-14]

TABLE 3-14

| WIRE No. | CHEMICAL COMPOSITION OF FLUX [mass % WITH RESPECT TO TOTAL MASS OF WIRE] | | | | | | | | | SM (%) | Ceq (%) |
|---|---|---|---|---|---|---|---|---|---|---|---|
| | Cu | Cr | Mo | V | Ti | Nb | B | Mg | REM | | |
| B52 | | | | | | | | | | 0.55 | 0.430 |
| B53 | | | | | 0.02 | | | | | 0.35 | 0.397 |
| B54 | | | 0.04 | | | | | 0.4 | | 0.70 | 0.447 |
| B55 | | | | | | | | | | 0.70 | 0.444 |
| B56 | 0.2 | | | | | | | | | 0.65 | 0.430 |
| B57 | | | | | 0.02 | | | | | 0.65 | 0.430 |
| B58 | | | | | | | | 0.2 | | 0.70 | 0.454 |
| B59 | 0.2 | | | 0.05 | | | | 0.4 | | 0.65 | 0.438 |
| B60 | | | | | 0.03 | | | | | 0.65 | 0.435 |
| B61 | 0.2 | | | | | | | | | 0.70 | 0.454 |
| B62 | | | | | | | | | | 0.70 | 0.454 |
| B63 | 0.2 | 0.2 | | | 0.02 | | | | | 0.65 | 0.327 |
| B64 | | | 0.2 | | | | | | | 0.65 | 0.471 |
| B65 | 0.2 | | | | 0.02 | | | | | 0.33 | 0.364 |
| B66 | | | | 0.05 | | | | | | 0.76 | 0.385 |
| B67 | 0.3 | | | 0.03 | | | | | | 0.40 | 0.339 |
| B68 | 0.2 | | | | 0.02 | | | 0.2 | | 1.00 | 0.462 |
| B69 | | 0.1 | 0.1 | | 0.02 | | | | | 0.80 | 0.471 |
| B70 | 0.2 | | | 0.04 | | | | | | 0.80 | 0.429 |
| B71 | | | 0.2 | | | 0.02 | 0.003 | | | 0.50 | 0.416 |
| B72 | | 0.1 | | 0.04 | | | | | | 0.50 | 0.389 |
| B73 | | | 0.1 | | 0.02 | | | 0.2 | | 0.60 | 0.253 |
| B74 | 0.6 | 0.1 | | | | | | | | 0.75 | 0.421 |
| B75 | | 0.6 | | | 0.03 | | | | | 0.65 | 0.505 |
| B76 | | | 0.6 | | 0.02 | | | 0.2 | | 0.45 | 0.514 |
| B77 | 0.3 | | | 0.30 | | | 0.003 | | | 0.70 | 0.416 |

[Table 3-15]

TABLE 3-15

| WIRE No. | CATEGORY | HOOP No. | CHEMICAL COMPOSITION OF FLUX [mass % WITH RESPECT TO TOTAL MASS OF WIRE] | | | | | | |
|---|---|---|---|---|---|---|---|---|---|
| | | | C | Si | Mn | P | S | Al | Ni |
| B78 | COMPARATIVE | F3 | 0.015 | 0.30 | 0.4 | 0.006 | 0.004 | 0.011 | 11.5 |
| B79 | EXAMPLE | F3 | 0.015 | 0.30 | 0.4 | 0.006 | 0.004 | 0.011 | 11.5 |
| B80 | | F3 | 0.020 | 0.15 | 0.5 | 0.006 | 0.004 | 0.011 | 11.5 |
| B81 | | F3 | 0.020 | 0.15 | 0.5 | 0.006 | 0.004 | 0.011 | 11.5 |
| B82 | | F3 | 0.010 | 0.05 | 0.2 | 0.006 | 0.004 | 0.011 | 11.5 |
| B83 | | F3 | 0.010 | 0.30 | 0.8 | 0.006 | 0.004 | 0.011 | 11.5 |
| B84 | | F6 | 0.005 | 0.10 | 0.2 | 0.006 | 0.004 | 0.011 | 7.8 |
| B85 | | F2 | 0.030 | 0.20 | 0.7 | 0.006 | 0.004 | 0.011 | 8.3 |
| B86 | | F2 | 0.025 | 0.20 | 0.6 | 0.006 | 0.004 | 0.011 | 8.1 |
| B87 | | F2 | 0.015 | 0.15 | 0.8 | 0.006 | 0.004 | 0.011 | 8.3 |
| B88 | | F4 | 0.015 | 0.30 | 0.4 | 0.006 | 0.004 | 0.011 | 13.3 |
| B89 | | F3 | 0.015 | 0.15 | 0.4 | 0.006 | 0.004 | 0.011 | 11.5 |
| B90 | | F3 | 0.015 | 0.15 | 0.4 | 0.006 | 0.004 | 0.011 | 11.5 |
| B91 | | F3 | 0.020 | 0.20 | 0.5 | 0.006 | 0.004 | 0.011 | 11.5 |
| B92 | | F3 | 0.020 | 0.20 | 0.5 | 0.006 | 0.004 | 0.011 | 11.5 |
| B93 | | F3 | 0.025 | 0.15 | 0.4 | 0.006 | 0.004 | 0.011 | 11.5 |
| B94 | | F3 | 0.025 | 0.25 | 0.3 | 0.006 | 0.004 | 0.011 | 11.5 |
| B95 | | F3 | 0.030 | 0.15 | 0.6 | 0.006 | 0.004 | 0.011 | 11.5 |
| B96 | | F3 | 0.030 | 0.15 | 0.6 | 0.006 | 0.004 | 0.011 | 13.3 |
| B97 | | F4 | 0.030 | 0.15 | 0.3 | 0.006 | 0.004 | 0.011 | 16.5 |
| B98 | | F2 | 0.030 | 0.30 | 0.6 | 0.006 | 0.004 | 0.011 | 11.5 |
| B99 | | F1 | 0.015 | 0.30 | 0.4 | 0.006 | 0.004 | 0.011 | 8.3 |
| B100 | | F3 | 0.015 | 0.15 | 0.4 | 0.006 | 0.004 | 0.011 | 13.3 |
| B101 | | F3 | 0.015 | 0.15 | 0.4 | 0.006 | 0.004 | 0.011 | 12.5 |

[Table 3-16]

TABLE 3-16

| WIRE No. | Cu | Cr | Mo | V | Ti | Nb | B | Mg | REM | SM (%) | Ceq (%) |
|---|---|---|---|---|---|---|---|---|---|---|---|
| B78 | 0.2 | | | | <u>0.15</u> | | | | | 0.70 | 0.382 |
| B79 | | | | | | <u>0.15</u> | | 0.4 | | 0.70 | 0.382 |
| B80 | 0.1 | 0.1 | 0.1 | | | | <u>0.012</u> | | | 0.65 | 0.442 |
| B81 | | | | 0.05 | | | | <u>0.7</u> | | 0.65 | 0.401 |
| B82 | 0.2 | 0.2 | | | 0.03 | | | | | <u>0.25</u> | 0.373 |
| B83 | | | 0.1 | | | | | 0.4 | | <u>1.10</u> | 0.468 |
| B84 | 0.2 | | | | | 0.02 | | | | 0.30 | <u>0.238</u> |
| B85 | | 0.3 | 0.4 | 0.15 | | | | | | 0.90 | <u>0.533</u> |
| B86 | 0.2 | | 0.2 | | | | 0.002 | | | 0.80 | 0.386 |
| B87 | 0.2 | | | 0.08 | 0.02 | | | | | 0.95 | 0.368 |
| B88 | | | 0.2 | | | | | 0.3 | | 0.70 | 0.477 |
| B89 | | 0.1 | | 0.03 | | | | 0.2 | 0.055 | 0.55 | 0.398 |
| B90 | | | | 0.03 | | | | | | 0.55 | 0.378 |
| B91 | | 0.1 | | 0.03 | | | | 0.2 | | 0.70 | 0.421 |
| B92 | | | | | | | | | | 0.70 | 0.399 |
| B93 | 0.2 | | 0.1 | | | | | 0.1 | | 0.55 | 0.410 |
| B94 | | | | | 0.02 | | | | | 0.55 | 0.373 |
| B95 | 0.1 | | | | | | | | | 0.75 | 0.424 |
| B96 | 0.1 | | | | | | | | | 0.75 | 0.469 |
| B97 | 0.1 | | | | | | | | | 0.45 | 0.499 |
| B98 | | 0.1 | 0.2 | | | | | 0.2 | | 0.90 | 0.500 |
| B99 | 0.2 | 0.1 | 0.1 | 0.05 | 0.02 | | 0.002 | | | 0.70 | 0.350 |
| B100 | 0.2 | | | | | | | | | 0.55 | 0.420 |
| B101 | 0.2 | | | | | | | | | 0.55 | 0.400 |

TABLE 4-1

| WIRE No. | CATEGORY | WELDING CONDITION | | | | | | | |
|---|---|---|---|---|---|---|---|---|---|
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
| A1 | EXAMPLE | 280 | 25 | 30 | 14.0 | NONE | 150 OR LESS | Ar | 25 |
| A2 | EXAMPLE | 280 | 25 | 30 | 14.0 | NONE | 150 OR LESS | Ar | 25 |
| A3 | EXAMPLE | 280 | 25 | 30 | 14.0 | NONE | 150 OR LESS | Ar | 25 |
| A4 | EXAMPLE | 280 | 25 | 30 | 14.0 | NONE | 150 OR LESS | Ar | 25 |
| A5 | EXAMPLE | 280 | 25 | 30 | 14.0 | NONE | 150 OR LESS | Ar | 25 |
| A6 | EXAMPLE | 280 | 25 | 30 | 14.0 | NONE | 150 OR LESS | Ar | 25 |
| A7 | EXAMPLE | 280 | 25 | 30 | 14.0 | NONE | 150 OR LESS | Ar | 25 |
| A8 | EXAMPLE | 280 | 25 | 30 | 14.0 | NONE | 150 OR LESS | Ar | 25 |
| A9 | EXAMPLE | 280 | 25 | 30 | 14.0 | NONE | 150 OR LESS | Ar | 25 |
| A10 | EXAMPLE | 280 | 25 | 30 | 14.0 | NONE | 150 OR LESS | Ar | 25 |
| A11 | EXAMPLE | 280 | 25 | 30 | 14.0 | NONE | 150 OR LESS | Ar | 25 |
| A12 | EXAMPLE | 280 | 25 | 30 | 14.0 | NONE | 150 OR LESS | Ar | 25 |
| A13 | EXAMPLE | 280 | 25 | 30 | 14.0 | NONE | 150 OR LESS | Ar | 25 |
| A14 | EXAMPLE | 280 | 25 | 30 | 14.0 | NONE | 150 OR LESS | Ar | 25 |
| A15 | EXAMPLE | 280 | 25 | 30 | 14.0 | NONE | 150 OR LESS | Ar | 25 |
| A16 | EXAMPLE | 280 | 25 | 30 | 14.0 | NONE | 150 OR LESS | Ar | 25 |
| A17 | EXAMPLE | 280 | 25 | 30 | 14.0 | NONE | 150 OR LESS | Ar | 25 |
| A18 | EXAMPLE | 280 | 25 | 30 | 14.0 | NONE | 150 OR LESS | Ar | 25 |
| A19 | EXAMPLE | 280 | 25 | 30 | 14.0 | NONE | 150 OR LESS | Ar | 25 |
| A20 | EXAMPLE | 280 | 25 | 30 | 14.0 | NONE | 150 OR LESS | Ar | 25 |
| A21 | EXAMPLE | 280 | 25 | 30 | 14.0 | NONE | 150 OR LESS | Ar | 25 |
| A22 | EXAMPLE | 280 | 25 | 30 | 14.0 | NONE | 150 OR LESS | Ar | 25 |
| A23 | EXAMPLE | 280 | 25 | 30 | 14.0 | NONE | 150 OR LESS | Ar | 25 |
| A24 | EXAMPLE | 280 | 25 | 30 | 14.0 | NONE | 150 OR LESS | Ar | 25 |
| A25 | EXAMPLE | 280 | 25 | 30 | 14.0 | NONE | 150 OR LESS | Ar | 25 |
| A26 | EXAMPLE | 280 | 25 | 30 | 14.0 | NONE | 150 OR LESS | Ar | 25 |

TABLE 4-2

| WIRE No. | CATEGORY | WELDING CONDITION | | | | | | | |
|---|---|---|---|---|---|---|---|---|---|
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
| A27 | EXAMPLE | 280 | 25 | 30 | 14.0 | NONE | 150 OR LESS | Ar | 25 |
| A28 | EXAMPLE | 280 | 25 | 30 | 14.0 | NONE | 150 OR LESS | Ar | 25 |
| A29 | EXAMPLE | 280 | 25 | 30 | 14.0 | NONE | 150 OR LESS | Ar | 25 |
| A30 | EXAMPLE | 280 | 25 | 30 | 14.0 | NONE | 150 OR LESS | Ar | 25 |
| A31 | EXAMPLE | 280 | 25 | 30 | 14.0 | NONE | 150 OR LESS | Ar | 25 |
| A32 | EXAMPLE | 280 | 25 | 30 | 14.0 | NONE | 150 OR LESS | Ar—1.0% $O_2$ | 25 |
| A33 | EXAMPLE | 280 | 25 | 30 | 14.0 | NONE | 150 OR LESS | Ar—1.0% $O_2$ | 25 |
| A34 | EXAMPLE | 280 | 25 | 30 | 14.0 | NONE | 150 OR LESS | Ar—1.5% $O_2$ | 25 |
| A35 | EXAMPLE | 280 | 25 | 30 | 14.0 | NONE | 150 OR LESS | Ar—1.5% $O_2$ | 25 |
| A36 | EXAMPLE | 280 | 25 | 30 | 14.0 | NONE | 150 OR LESS | Ar | 25 |
| A37 | EXAMPLE | 280 | 25 | 30 | 14.0 | NONE | 150 OR LESS | Ar | 25 |
| A38 | EXAMPLE | 280 | 25 | 30 | 14.0 | NONE | 150 OR LESS | Ar | 25 |
| A39 | EXAMPLE | 280 | 25 | 30 | 14.0 | NONE | 150 OR LESS | Ar | 25 |
| A40 | EXAMPLE | 280 | 25 | 30 | 14.0 | NONE | 150 OR LESS | He | 25 |
| A41 | EXAMPLE | 280 | 25 | 30 | 14.0 | NONE | 150 OR LESS | Ar | 25 |
| A42 | EXAMPLE | 280 | 25 | 30 | 14.0 | NONE | 150 OR LESS | Ar | 25 |
| A43 | EXAMPLE | 280 | 25 | 30 | 14.0 | NONE | 150 OR LESS | Ar | 25 |
| A44 | EXAMPLE | 280 | 25 | 30 | 14.0 | NONE | 150 OR LESS | Ar | 25 |
| A45 | EXAMPLE | 280 | 25 | 30 | 14.0 | 50 | 150 OR LESS | Ar | 25 |
| A46 | EXAMPLE | 280 | 25 | 30 | 14.0 | NONE | 150 OR LESS | Ar | 25 |
| A47 | EXAMPLE | 280 | 25 | 30 | 14.0 | NONE | 150 OR LESS | Ar—1.0% $CO_2$ | 25 |
| A48 | EXAMPLE | 280 | 25 | 30 | 14.0 | NONE | 150 OR LESS | He—1.0% $O_2$ | 25 |
| A49 | EXAMPLE | 280 | 25 | 30 | 14.0 | NONE | 150 OR LESS | He—1.0% $CO_2$ | 25 |
| A50 | EXAMPLE | 280 | 25 | 30 | 14.0 | NONE | 150 OR LESS | Ar | 25 |
| A51 | EXAMPLE | 280 | 25 | 30 | 14.0 | NONE | 150 OR LESS | Ar | 25 |
| A52 | EXAMPLE | 280 | 25 | 30 | 14.0 | NONE | 150 OR LESS | Ar | 25 |
| A53 | EXAMPLE | 280 | 25 | 30 | 14.0 | NONE | 150 OR LESS | Ar | 25 |
| A54 | EXAMPLE | 280 | 25 | 30 | 14.0 | NONE | 150 OR LESS | Ar | 25 |
| A55 | EXAMPLE | 280 | 25 | 30 | 14.0 | NONE | 150 OR LESS | Ar | 25 |

TABLE 4-3

| WIRE No. | CATEGORY | WELDING CONDITION | | | | | | | |
|---|---|---|---|---|---|---|---|---|---|
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
| B1 | COMPARATIVE | 280 | 25 | 30 | 14.0 | NONE | 150 OR LESS | Ar | 25 |
| B2 | EXAMPLE | 280 | 25 | 30 | 14.0 | NONE | 150 OR LESS | Ar | 25 |
| B3 | | 280 | 25 | 30 | 14.0 | NONE | 150 OR LESS | Ar | 25 |
| B4 | | 280 | 25 | 30 | 14.0 | NONE | 150 OR LESS | Ar | 25 |
| B5 | | 280 | 25 | 30 | 14.0 | NONE | 150 OR LESS | Ar | 25 |
| B6 | | 280 | 25 | 30 | 14.0 | NONE | 150 OR LESS | Ar | 25 |
| B7 | | 280 | 25 | 30 | 14.0 | NONE | 150 OR LESS | Ar | 25 |
| B8 | | 280 | 25 | 30 | 14.0 | NONE | 150 OR LESS | Ar | 25 |
| B9 | | 280 | 25 | 30 | 14.0 | NONE | 150 OR LESS | Ar | 25 |
| B10 | | 280 | 25 | 30 | 14.0 | NONE | 150 OR LESS | Ar | 25 |
| B11 | | 280 | 25 | 30 | 14.0 | NONE | 150 OR LESS | Ar | 25 |
| B12 | | 280 | 25 | 30 | 14.0 | NONE | 150 OR LESS | Ar | 25 |
| B13 | | 280 | 25 | 30 | 14.0 | NONE | 150 OR LESS | Ar | 25 |
| B14 | | 280 | 25 | 30 | 14.0 | NONE | 150 OR LESS | Ar | 25 |
| B15 | | 280 | 25 | 30 | 14.0 | NONE | 150 OR LESS | Ar | 25 |
| B16 | | 280 | 25 | 30 | 14.0 | NONE | 150 OR LESS | Ar | 25 |
| B17 | | 280 | 25 | 30 | 14.0 | NONE | 150 OR LESS | Ar | 25 |
| B18 | | 280 | 25 | 30 | 14.0 | NONE | 150 OR LESS | Ar | 25 |
| B19 | | 280 | 25 | 30 | 14.0 | NONE | 150 OR LESS | Ar | 25 |
| B20 | | 280 | 25 | 30 | 14.0 | NONE | 150 OR LESS | Ar | 25 |
| B21 | | 280 | 25 | 30 | 14.0 | NONE | 150 OR LESS | Ar | 25 |
| B22 | | 280 | 25 | 30 | 14.0 | NONE | 150 OR LESS | Ar | 25 |
| B23 | | 280 | 25 | 30 | 14.0 | NONE | 150 OR LESS | Ar | 25 |
| B24 | | 280 | 25 | 30 | 14.0 | NONE | 150 OR LESS | Ar | 25 |
| B25 | | 280 | 25 | 30 | 14.0 | NONE | 150 OR LESS | Ar | 25 |

TABLE 4-4

| WIRE No. | CATEGORY | WELDING CONDITION ||||||||
| --- | --- | --- | --- | --- | --- | --- | --- | --- | --- |
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
| B26 | COMPARATIVE | 280 | 25 | 30 | 14.0 | NONE | 150 OR LESS | Ar | 25 |
| B27 | EXAMPLE | 280 | 25 | 30 | 14.0 | NONE | 150 OR LESS | Ar | 25 |
| B28 | | 280 | 25 | 30 | 14.0 | NONE | 150 OR LESS | Ar | 25 |
| B29 | | 280 | 25 | 30 | 14.0 | NONE | 150 OR LESS | Ar | 25 |
| B30 | | 280 | 25 | 30 | 14.0 | NONE | 150 OR LESS | Ar | 25 |
| B31 | | 280 | 25 | 30 | 14.0 | NONE | 150 OR LESS | Ar | 25 |
| B32 | | 280 | 25 | 30 | 14.0 | NONE | 150 OR LESS | Ar | 25 |
| B33 | | 280 | 25 | 30 | 14.0 | NONE | 150 OR LESS | Ar | 25 |
| B34 | | 280 | 25 | 30 | 14.0 | NONE | 150 OR LESS | Ar—2.0% $O_2$ | 25 |
| B35 | | 280 | 25 | 30 | 14.0 | NONE | 150 OR LESS | Ar—2.0% $O_2$ | 25 |
| B36 | | 280 | 25 | 30 | 14.0 | NONE | 150 OR LESS | Ar | 25 |
| B37 | | 280 | 25 | 30 | 14.0 | NONE | 150 OR LESS | Ar | 25 |
| B38 | | 280 | 25 | 30 | 14.0 | NONE | 150 OR LESS | Ar | 25 |
| B39 | | 280 | 25 | 30 | 14.0 | 50 | 150 OR LESS | Ar | 25 |
| B40 | | 280 | 25 | 30 | 14.0 | NONE | 150 OR LESS | Ar | 25 |
| B41 | | 280 | 25 | 30 | 14.0 | NONE | 150 OR LESS | Ar | 25 |
| B42 | | 280 | 25 | 30 | 14.0 | NONE | 150 OR LESS | Ar | 25 |
| B43 | | 280 | 25 | 30 | 14.0 | NONE | 150 OR LESS | Ar | 25 |
| B44 | | 280 | 25 | 30 | 14.0 | NONE | 150 OR LESS | Ar | 25 |
| B45 | | 280 | 25 | 30 | 14.0 | NONE | 150 OR LESS | Ar | 25 |
| B46 | | 280 | 25 | 30 | 14.0 | NONE | 150 OR LESS | Ar—2.0% $CO_2$ | 25 |
| B47 | | 280 | 25 | 30 | 14.0 | NONE | 150 OR LESS | He—2.0% $O_2$ | 25 |
| B48 | | 280 | 25 | 30 | 14.0 | NONE | 150 OR LESS | He—2.0% $CO_2$ | 25 |
| B49 | | 280 | 25 | 30 | 14.0 | NONE | 150 OR LESS | Ar | 25 |
| B50 | | 280 | 25 | 30 | 14.0 | NONE | 150 OR LESS | Ar | 25 |
| B51 | | 280 | 25 | 30 | 14.0 | NONE | 150 OR LESS | Ar | 25 |

TABLE 4-5

| WIRE No. | CATEGORY | WELDING CONDITION ||||||||
| --- | --- | --- | --- | --- | --- | --- | --- | --- | --- |
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
| A56 | EXAMPLE | 280 | 25 | 30 | 14.0 | NONE | 150 OR LESS | Ar | 25 |
| A57 | EXAMPLE | 280 | 25 | 30 | 14.0 | NONE | 150 OR LESS | Ar | 25 |
| A58 | EXAMPLE | 280 | 25 | 30 | 14.0 | NONE | 150 OR LESS | Ar | 25 |
| A59 | EXAMPLE | 280 | 25 | 30 | 14.0 | NONE | 150 OR LESS | Ar | 25 |
| A60 | EXAMPLE | 280 | 25 | 30 | 14.0 | NONE | 150 OR LESS | Ar | 25 |
| A61 | EXAMPLE | 280 | 25 | 30 | 14.0 | NONE | 150 OR LESS | Ar | 25 |
| A62 | EXAMPLE | 280 | 25 | 30 | 14.0 | NONE | 150 OR LESS | Ar | 25 |
| A63 | EXAMPLE | 280 | 25 | 30 | 14.0 | NONE | 150 OR LESS | Ar | 25 |
| A64 | EXAMPLE | 280 | 25 | 30 | 14.0 | NONE | 150 OR LESS | Ar | 25 |
| A65 | EXAMPLE | 280 | 25 | 30 | 14.0 | NONE | 150 OR LESS | Ar | 25 |
| A66 | EXAMPLE | 280 | 25 | 30 | 14.0 | NONE | 150 OR LESS | Ar | 25 |
| A67 | EXAMPLE | 280 | 25 | 30 | 14.0 | NONE | 150 OR LESS | Ar | 25 |
| A68 | EXAMPLE | 280 | 25 | 30 | 14.0 | NONE | 150 OR LESS | Ar | 25 |
| A69 | EXAMPLE | 280 | 25 | 30 | 14.0 | NONE | 150 OR LESS | Ar | 25 |
| A70 | EXAMPLE | 280 | 25 | 30 | 14.0 | NONE | 150 OR LESS | Ar | 25 |
| A71 | EXAMPLE | 280 | 25 | 30 | 14.0 | NONE | 150 OR LESS | Ar | 25 |
| A72 | EXAMPLE | 280 | 25 | 30 | 14.0 | NONE | 150 OR LESS | Ar | 25 |
| A73 | EXAMPLE | 280 | 25 | 30 | 14.0 | NONE | 150 OR LESS | Ar | 25 |
| A74 | EXAMPLE | 280 | 25 | 30 | 14.0 | NONE | 150 OR LESS | Ar | 25 |
| A75 | EXAMPLE | 280 | 25 | 30 | 14.0 | NONE | 150 OR LESS | Ar | 25 |
| A76 | EXAMPLE | 280 | 25 | 30 | 14.0 | NONE | 150 OR LESS | Ar | 25 |
| A77 | EXAMPLE | 280 | 25 | 30 | 14.0 | NONE | 150 OR LESS | Ar | 25 |
| A78 | EXAMPLE | 280 | 25 | 30 | 14.0 | NONE | 150 OR LESS | Ar | 25 |
| A79 | EXAMPLE | 280 | 25 | 30 | 14.0 | NONE | 150 OR LESS | Ar | 25 |
| A80 | EXAMPLE | 280 | 25 | 30 | 14.0 | NONE | 150 OR LESS | Ar | 25 |
| A81 | EXAMPLE | 280 | 25 | 30 | 14.0 | NONE | 150 OR LESS | Ar | 25 |
| A82 | EXAMPLE | 280 | 25 | 30 | 14.0 | NONE | 150 OR LESS | Ar | 25 |
| A83 | EXAMPLE | 280 | 25 | 30 | 14.0 | NONE | 150 OR LESS | Ar | 25 |
| A84 | EXAMPLE | 280 | 25 | 30 | 14.0 | NONE | 150 OR LESS | Ar | 25 |
| A85 | EXAMPLE | 280 | 25 | 30 | 14.0 | NONE | 150 OR LESS | Ar—1.0% $O_2$ | 25 |
| A86 | EXAMPLE | 280 | 25 | 30 | 14.0 | NONE | 150 OR LESS | Ar—1.0% $O_2$ | 25 |
| A87 | EXAMPLE | 280 | 25 | 30 | 14.0 | NONE | 150 OR LESS | Ar—1.0% $O_2$ | 25 |
| A88 | EXAMPLE | 280 | 25 | 30 | 14.0 | NONE | 150 OR LESS | Ar—1.5% $O_2$ | 25 |
| A89 | EXAMPLE | 280 | 25 | 30 | 14.0 | NONE | 150 OR LESS | Ar—1.5% $O_2$ | 25 |
| A90 | EXAMPLE | 280 | 25 | 30 | 14.0 | NONE | 150 OR LESS | Ar—1.5% $O_2$ | 25 |
| A91 | EXAMPLE | 280 | 25 | 30 | 14.0 | NONE | 150 OR LESS | Ar—1.0 $CO_2$ | 25 |

TABLE 4-5-continued

| WIRE No. | CATEGORY | WELDING CONDITION ||||||||
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
|---|---|---|---|---|---|---|---|---|---|
| A92  | EXAMPLE | 280 | 25 | 30 | 14.0 | NONE | 150 OR LESS | Ar | 25 |
| A93  | EXAMPLE | 280 | 25 | 30 | 14.0 | NONE | 150 OR LESS | He | 25 |
| A94  | EXAMPLE | 280 | 25 | 30 | 14.0 | NONE | 150 OR LESS | He—1.0% O$_2$ | 25 |
| A95  | EXAMPLE | 280 | 25 | 30 | 14.0 | NONE | 150 OR LESS | He—1.0% CO$_2$ | 25 |
| A96  | EXAMPLE | 280 | 25 | 30 | 14.0 | NONE | 150 OR LESS | Ar | 25 |
| A97  | EXAMPLE | 280 | 25 | 30 | 14.0 | NONE | 150 OR LESS | Ar | 25 |
| A98  | EXAMPLE | 280 | 25 | 30 | 14.0 | NONE | 150 OR LESS | Ar | 25 |
| A99  | EXAMPLE | 280 | 25 | 30 | 14.0 | NONE | 150 OR LESS | Ar | 25 |
| A100 | EXAMPLE | 280 | 25 | 30 | 14.0 | 50   | 150 OR LESS | Ar | 25 |
| A101 | EXAMPLE | 280 | 25 | 30 | 14.0 | NONE | 150 OR LESS | Ar | 25 |
| A102 | EXAMPLE | 280 | 25 | 30 | 14.0 | NONE | 150 OR LESS | Ar | 25 |
| A103 | EXAMPLE | 280 | 25 | 30 | 14.0 | NONE | 150 OR LESS | Ar | 25 |
| A104 | EXAMPLE | 280 | 25 | 30 | 14.0 | NONE | 150 OR LESS | Ar | 25 |
| A105 | EXAMPLE | 280 | 25 | 30 | 14.0 | NONE | 150 OR LESS | Ar | 25 |
| A106 | EXAMPLE | 280 | 25 | 30 | 14.0 | NONE | 150 OR LESS | Ar | 25 |
| A107 | EXAMPLE | 280 | 25 | 30 | 14.0 | NONE | 150 OR LESS | Ar | 25 |
| A108 | EXAMPLE | 280 | 25 | 30 | 14.0 | NONE | 150 OR LESS | Ar—2.0% O$_2$ | 25 |

TABLE 4-6

| WIRE No. | CATEGORY | WELDING CONDITION ||||||||
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
|---|---|---|---|---|---|---|---|---|---|
| B52 | COMPARATIVE | 280 | 25 | 30 | 14.0 | NONE | 150 OR LESS | Ar | 25 |
| B53 | EXAMPLE     | 280 | 25 | 30 | 14.0 | NONE | 150 OR LESS | Ar | 25 |
| B54 |             | 280 | 25 | 30 | 14.0 | NONE | 150 OR LESS | Ar | 25 |
| B55 |             | 280 | 25 | 30 | 14.0 | NONE | 150 OR LESS | Ar | 25 |
| B56 |             | 280 | 25 | 30 | 14.0 | NONE | 150 OR LESS | Ar | 25 |
| B57 |             | 280 | 25 | 30 | 14.0 | NONE | 150 OR LESS | Ar | 25 |
| B58 |             | 280 | 25 | 30 | 14.0 | NONE | 150 OR LESS | Ar | 25 |
| B59 |             | 280 | 25 | 30 | 14.0 | NONE | 150 OR LESS | Ar | 25 |
| B60 |             | 280 | 25 | 30 | 14.0 | NONE | 150 OR LESS | Ar | 25 |
| B61 |             | 280 | 25 | 30 | 14.0 | NONE | 150 OR LESS | Ar | 25 |
| B62 |             | 280 | 25 | 30 | 14.0 | NONE | 150 OR LESS | Ar | 25 |
| B63 |             | 280 | 25 | 30 | 14.0 | NONE | 150 OR LESS | Ar | 25 |
| B64 |             | 280 | 25 | 30 | 14.0 | NONE | 150 OR LESS | Ar | 25 |
| B65 |             | 280 | 25 | 30 | 14.0 | NONE | 150 OR LESS | Ar | 25 |
| B66 |             | 280 | 25 | 30 | 14.0 | NONE | 150 OR LESS | Ar | 25 |
| B67 |             | 280 | 25 | 30 | 14.0 | NONE | 150 OR LESS | Ar | 25 |
| B68 |             | 280 | 25 | 30 | 14.0 | NONE | 150 OR LESS | Ar | 25 |
| B69 |             | 280 | 25 | 30 | 14.0 | NONE | 150 OR LESS | Ar | 25 |
| B70 |             | 280 | 25 | 30 | 14.0 | NONE | 150 OR LESS | Ar | 25 |
| B71 |             | 280 | 25 | 30 | 14.0 | NONE | 150 OR LESS | Ar | 25 |
| B72 |             | 280 | 25 | 30 | 14.0 | NONE | 150 OR LESS | Ar | 25 |
| B73 |             | 280 | 25 | 30 | 14.0 | NONE | 150 OR LESS | Ar | 25 |
| B74 |             | 280 | 25 | 30 | 14.0 | NONE | 150 OR LESS | Ar | 25 |
| B75 |             | 280 | 25 | 30 | 14.0 | NONE | 150 OR LESS | Ar | 25 |
| B76 |             | 280 | 25 | 30 | 14.0 | NONE | 150 OR LESS | Ar | 25 |

TABLE 4-7

| WIRE No. | CATEGORY | WELDING CONDITION ||||||||
| | | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
|---|---|---|---|---|---|---|---|---|---|
| B77 | COMPARATIVE | 280 | 25 | 30 | 14.0 | NONE | 150 OR LESS | Ar | 25 |
| B78 | EXAMPLE     | 280 | 25 | 30 | 14.0 | NONE | 150 OR LESS | Ar | 25 |
| B79 |             | 280 | 25 | 30 | 14.0 | NONE | 150 OR LESS | Ar | 25 |
| B80 |             | 280 | 25 | 30 | 14.0 | NONE | 150 OR LESS | Ar | 25 |
| B81 |             | 280 | 25 | 30 | 14.0 | NONE | 150 OR LESS | Ar | 25 |

TABLE 4-7-continued

| | | WELDING CONDITION | | | | | | |
|---|---|---|---|---|---|---|---|---|
| WIRE No. | CATEGORY | CURRENT [A] | VOLTAGE [V] | WELDING RATE [cm/min] | HEAT INPUT [kJ/cm] | PREHEATING TEMPERATURE [° C.] | INTERPASS TEMPERATURE [° C.] | SHIELDING GAS | FLOW RATE [L/min] |
| B82 | | 280 | 25 | 30 | 14.0 | NONE | 150 OR LESS | Ar | 25 |
| B83 | | 280 | 25 | 30 | 14.0 | NONE | 150 OR LESS | Ar | 25 |
| B84 | | 280 | 25 | 30 | 14.0 | NONE | 150 OR LESS | Ar | 25 |
| B85 | | 280 | 25 | 30 | 14.0 | NONE | 150 OR LESS | Ar | 25 |
| B86 | | 280 | 25 | 30 | 14.0 | NONE | 150 OR LESS | Ar | 25 |
| B87 | | 280 | 25 | 30 | 14.0 | NONE | 150 OR LESS | Ar—2.0% $O_2$ | 25 |
| B88 | | 280 | 25 | 30 | 14.0 | 50 | 150 OR LESS | Ar—2.0% $O_2$ | 25 |
| B89 | | 280 | 25 | 30 | 14.0 | NONE | 150 OR LESS | Ar | 25 |
| B90 | | 280 | 25 | 30 | 14.0 | NONE | 150 OR LESS | Ar | 25 |
| B91 | | 280 | 25 | 30 | 14.0 | NONE | 150 OR LESS | Ar | 25 |
| B92 | | 280 | 25 | 30 | 14.0 | NONE | 150 OR LESS | Ar | 25 |
| B93 | | 280 | 25 | 30 | 14.0 | NONE | 150 OR LESS | Ar | 25 |
| B94 | | 280 | 25 | 30 | 14.0 | NONE | 150 OR LESS | Ar | 25 |
| B95 | | 280 | 25 | 30 | 14.0 | NONE | 150 OR LESS | Ar | 25 |
| B96 | | 280 | 25 | 30 | 14.0 | NONE | 150 OR LESS | Ar | 25 |
| B97 | | 280 | 25 | 30 | 14.0 | NONE | 150 OR LESS | Ar | 25 |
| B98 | | 280 | 25 | 30 | 14.0 | NONE | 150 OR LESS | Ar—2.0% $CO_2$ | 25 |
| B99 | | 280 | 25 | 30 | 14.0 | NONE | 150 OR LESS | He—2.0% $O_2$ | 25 |
| B100 | | 280 | 25 | 30 | 14.0 | NONE | 150 OR LESS | He—2.0% $CO_2$ | 25 |
| B101 | | 280 | 25 | 30 | 14.0 | NONE | 150 OR LESS | Ar | 25 |

TABLE 5-1

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| A1 | EXAMPLE | 675 | 721 | 60 | 94 | NO CRACKING | 0.6 |
| A2 | EXAMPLE | 669 | 709 | 61 | 104 | NO CRACKING | 0.4 |
| A3 | EXAMPLE | 687 | 736 | 63 | 97 | NO CRACKING | 0.5 |
| A4 | EXAMPLE | 672 | 725 | 60 | 102 | NO CRACKING | 0.5 |
| A5 | EXAMPLE | 720 | 766 | 52 | 109 | NO CRACKING | 0.4 |
| A6 | EXAMPLE | 719 | 778 | 50 | 89 | NO CRACKING | 0.6 |
| A7 | EXAMPLE | 616 | 662 | 68 | 99 | NO CRACKING | 0.5 |
| A8 | EXAMPLE | 769 | 828 | 54 | 90 | NO CRACKING | 0.6 |
| A9 | EXAMPLE | 682 | 733 | 61 | 96 | NO CRACKING | 0.6 |
| A10 | EXAMPLE | 700 | 745 | 57 | 105 | NO CRACKING | 0.4 |
| A11 | EXAMPLE | 671 | 716 | 63 | 93 | NO CRACKING | 0.6 |
| A12 | EXAMPLE | 706 | 752 | 53 | 93 | NO CRACKING | 0.5 |
| A13 | EXAMPLE | 699 | 740 | 62 | 87 | NO CRACKING | 0.6 |
| A14 | EXAMPLE | 685 | 736 | 59 | 99 | NO CRACKING | 0.4 |
| A15 | EXAMPLE | 626 | 695 | 67 | 104 | NO CRACKING | 0.5 |
| A16 | EXAMPLE | 728 | 793 | 56 | 90 | NO CRACKING | 0.5 |
| A17 | EXAMPLE | 716 | 772 | 58 | 105 | NO CRACKING | 1.4 |
| A18 | EXAMPLE | 720 | 786 | 56 | 93 | NO CRACKING | 0.6 |
| A19 | EXAMPLE | 742 | 794 | 59 | 82 | NO CRACKING | 0.5 |
| A20 | EXAMPLE | 724 | 779 | 60 | 94 | NO CRACKING | 0.3 |
| A21 | EXAMPLE | 749 | 802 | 55 | 88 | NO CRACKING | 0.6 |
| A22 | EXAMPLE | 726 | 782 | 57 | 97 | NO CRACKING | 0.6 |
| A23 | EXAMPLE | 744 | 791 | 54 | 95 | NO CRACKING | 0.5 |
| A24 | EXAMPLE | 703 | 743 | 61 | 100 | NO CRACKING | 0.5 |
| A25 | EXAMPLE | 727 | 760 | 58 | 106 | NO CRACKING | 0.7 |

| WIRE No. | TENSILE STRENGTH | TOUGHNESS | COLD CRACKING RESISTANCE | OVERALL DETERMINATION | REMARKS |
|---|---|---|---|---|---|
| A1 | PASS | PASS | PASS | PASS | |
| A2 | PASS | PASS | PASS | PASS | |
| A3 | PASS | PASS | PASS | PASS | |
| A4 | PASS | PASS | PASS | PASS | |
| A5 | PASS | PASS | PASS | PASS | |
| A6 | PASS | PASS | PASS | PASS | |
| A7 | PASS | PASS | PASS | PASS | |
| A8 | PASS | PASS | PASS | PASS | |
| A9 | PASS | PASS | PASS | PASS | |
| A10 | PASS | PASS | PASS | PASS | |
| A11 | PASS | PASS | PASS | PASS | |
| A12 | PASS | PASS | PASS | PASS | |

TABLE 5-1-continued

| | | | | | |
|---|---|---|---|---|---|
| | A13 | PASS | PASS | PASS | PASS |
| | A14 | PASS | PASS | PASS | PASS |
| | A15 | PASS | PASS | PASS | PASS |
| | A16 | PASS | PASS | PASS | PASS |
| | A17 | PASS | PASS | PASS | PASS |
| | A18 | PASS | PASS | PASS | PASS |
| | A19 | PASS | PASS | PASS | PASS |
| | A20 | PASS | PASS | PASS | PASS |
| | A21 | PASS | PASS | PASS | PASS |
| | A22 | PASS | PASS | PASS | PASS |
| | A23 | PASS | PASS | PASS | PASS |
| | A24 | PASS | PASS | PASS | PASS |
| | A25 | PASS | PASS | PASS | PASS |

TABLE 5-2

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| A26 | EXAMPLE | 619 | 666 | 68 | 94 | NO CRACKING | 0.6 |
| A27 | EXAMPLE | 772 | 819 | 54 | 90 | NO CRACKING | 0.4 |
| A28 | EXAMPLE | 672 | 719 | 52 | 99 | NO CRACKING | 0.5 |
| A29 | EXAMPLE | 659 | 702 | 54 | 85 | NO CRACKING | 0.7 |
| A30 | EXAMPLE | 710 | 744 | 62 | 94 | NO CRACKING | 0.6 |
| A31 | EXAMPLE | 713 | 751 | 60 | 108 | NO CRACKING | 0.9 |
| A32 | EXAMPLE | 645 | 698 | 63 | 118 | NO CRACKING | 0.6 |
| A33 | EXAMPLE | 721 | 764 | 59 | 129 | NO CRACKING | 0.6 |
| A34 | EXAMPLE | 697 | 741 | 54 | 153 | NO CRACKING | 0.4 |
| A35 | EXAMPLE | 736 | 787 | 53 | 149 | NO CRACKING | 0.5 |
| A36 | EXAMPLE | 673 | 725 | 65 | 94 | NO CRACKING | 0.5 |
| A37 | EXAMPLE | 669 | 713 | 63 | 89 | NO CRACKING | 0.4 |
| A38 | EXAMPLE | 732 | 783 | 55 | 99 | NO CRACKING | 0.6 |
| A39 | EXAMPLE | 741 | 791 | 58 | 83 | NO CRACKING | 0.5 |
| A40 | EXAMPLE | 722 | 769 | 62 | 95 | NO CRACKING | 0.6 |
| A41 | EXAMPLE | 655 | 752 | 55 | 101 | NO CRACKING | 0.5 |
| A42 | EXAMPLE | 670 | 800 | 58 | 110 | NO CRACKING | 0.6 |
| A43 | EXAMPLE | 785 | 890 | 51 | 96 | NO CRACKING | 0.4 |
| A44 | EXAMPLE | 698 | 768 | 60 | 93 | NO CRACKING | 0.6 |
| A45 | EXAMPLE | 680 | 742 | 55 | 110 | NO CRACKING | 1.4 |
| A46 | EXAMPLE | 703 | 756 | 65 | 94 | NO CRACKING | 0.5 |
| A47 | EXAMPLE | 720 | 766 | 52 | 85 | NO CRACKING | 0.6 |
| A48 | EXAMPLE | 719 | 778 | 50 | 81 | NO CRACKING | 0.4 |
| A49 | EXAMPLE | 616 | 662 | 68 | 84 | NO CRACKING | 0.6 |
| A50 | EXAMPLE | 670 | 742 | 84 | 78 | NO CRACKING | 0.8 |
| A51 | EXAMPLE | 658 | 752 | 72 | 76 | NO CRACKING | 0.7 |
| A52 | EXAMPLE | 663 | 774 | 95 | 72 | NO CRACKING | 0.8 |
| A53 | EXAMPLE | 710 | 831 | 79 | 76 | NO CRACKING | 0.6 |
| A54 | EXAMPLE | 705 | 730 | 63 | 103 | NO CRACKING | 0.6 |
| A55 | EXAMPLE | 710 | 749 | 61 | 97 | NO CRACKING | 0.6 |

| WIRE No. | TENSILE STRENGTH | TOUGHNESS | COLD CRACKING RESISTANCE | OVERALL DETERMINATION | REMARKS |
|---|---|---|---|---|---|
| A26 | PASS | PASS | PASS | PASS | |
| A27 | PASS | PASS | PASS | PASS | |
| A28 | PASS | PASS | PASS | PASS | |
| A29 | PASS | PASS | PASS | PASS | |
| A30 | PASS | PASS | PASS | PASS | |
| A31 | PASS | PASS | PASS | PASS | |
| A32 | PASS | PASS | PASS | PASS | |
| A33 | PASS | PASS | PASS | PASS | |
| A34 | PASS | PASS | PASS | PASS | |
| A35 | PASS | PASS | PASS | PASS | |
| A36 | PASS | PASS | PASS | PASS | |
| A37 | PASS | PASS | PASS | PASS | |
| A38 | PASS | PASS | PASS | PASS | |
| A39 | PASS | PASS | PASS | PASS | |
| A40 | PASS | PASS | PASS | PASS | |
| A41 | PASS | PASS | PASS | PASS | |
| A42 | PASS | PASS | PASS | PASS | |
| A43 | PASS | PASS | PASS | PASS | |
| A44 | PASS | PASS | PASS | PASS | |

TABLE 5-2-continued

| | | | | | |
|---|---|---|---|---|---|
| A45 | PASS | PASS | PASS | PASS | NO CRACKING WITH PREHEATING TEMPERATURE OF 50° C. |
| A46 | PASS | PASS | PASS | PASS | |
| A47 | PASS | PASS | PASS | PASS | |
| A48 | PASS | PASS | PASS | PASS | |
| A49 | PASS | PASS | PASS | PASS | |
| A50 | PASS | PASS | PASS | PASS | |
| A51 | PASS | PASS | PASS | PASS | |
| A52 | PASS | PASS | PASS | PASS | |
| A53 | PASS | PASS | PASS | PASS | |
| A54 | PASS | PASS | PASS | PASS | |
| A55 | PASS | PASS | PASS | PASS | |

TABLE 5-3

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| B1 | COMPARATIVE | NOT EVALUATED DUE TO UNSTABLE ARC | | | | | |
| B2 | EXAMPLE | NOT EVALUATED DUE TO A LOT OF FUME AND BAD WELDING EFFICIENCY | | | | | |
| B3 | | 710 | 753 | 42 | 176 | — | — |
| B4 | | NOT EVALUATED DUE TO BAD SLAG PEELABILITY | | | | | |
| B5 | | 653 | 706 | 39 | 193 | — | — |
| B6 | | 708 | 749 | 59 | 110 | CRACKING | 1.9 |
| B7 | | 689 | 735 | 36 | 206 | — | — |
| B8 | | 705 | 756 | 46 | 169 | — | — |
| B9 | | NOT EVALUATED DUE TO UNSTABLE ARC | | | | | |
| B10 | | NOT EVALUATED DUE TO UNSTABLE ARC | | | | | |
| B11 | | 599 | 642 | 68 | 120 | — | — |
| B12 | | 811 | 864 | 45 | 99 | — | — |
| B13 | | NOT EVALUATED DUE TO OCCURRENCE OF WELD DEFECT | | | | | |
| B14 | | 718 | 762 | 32 | 103 | — | — |
| B15 | | 720 | 769 | 42 | 148 | — | — |
| B16 | | 727 | 778 | 46 | 92 | — | — |
| B17 | | 708 | 752 | 37 | 100 | — | — |
| B18 | | 712 | 755 | 40 | 98 | — | — |
| B19 | | 719 | 780 | 43 | 176 | — | — |
| B20 | | 715 | 761 | 46 | 105 | — | — |
| B21 | | 724 | 771 | 38 | 102 | — | — |
| B22 | | 698 | 744 | 42 | 98 | — | — |
| B23 | | 726 | 787 | 46 | 109 | — | — |
| B24 | | 781 | 821 | 43 | 95 | — | — |
| B25 | | 725 | 770 | 45 | 93 | — | — |

| WIRE No. | TENSILE STRENGTH | TOUGHNESS | COLD CRACKING RESISTANCE | OVERALL DETERMINATION | REMARKS |
|---|---|---|---|---|---|
| B1 | — | — | — | FAIL | |
| B2 | — | — | — | FAIL | |
| B3 | PASS | FAIL | — | FAIL | |
| B4 | — | — | — | FAIL | |
| B5 | PASS | FAIL | — | FAIL | |
| B6 | PASS | PASS | FAIL | FAIL | |
| B7 | PASS | FAIL | — | FAIL | |
| B8 | PASS | FAIL | — | FAIL | |
| B9 | — | — | — | FAIL | |
| B10 | — | — | — | FAIL | |
| B11 | FAIL | PASS | — | FAIL | |
| B12 | PASS | FAIL | — | FAIL | |
| B13 | — | — | — | FAIL | |
| B14 | PASS | FAIL | — | FAIL | |
| B15 | PASS | FAIL | — | FAIL | |
| B16 | PASS | FAIL | — | FAIL | |
| B17 | PASS | FAIL | — | FAIL | |
| B18 | PASS | FAIL | — | FAIL | |
| B19 | PASS | FAIL | — | FAIL | |
| B20 | PASS | FAIL | — | FAIL | |
| B21 | PASS | FAIL | — | FAIL | |
| B22 | PASS | FAIL | — | FAIL | |

TABLE 5-3-continued

| | | | | | |
|---|---|---|---|---|---|
| B23 | PASS | FAIL | — | FAIL | |
| B24 | PASS | FAIL | — | FAIL | |
| B25 | PASS | FAIL | — | FAIL | |

TABLE 5-4

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| B26 | COMPARATIVE | 729 | 782 | 41 | 87 | — | — |
| B27 | EXAMPLE | 737 | 794 | 40 | 96 | — | — |
| B28 | | 747 | 807 | 42 | 104 | — | — |
| B29 | | NOT EVALUATED DUE TO FREQUENTLY OCCURRENCE OF SPATTER | | | | | |
| B30 | | NOT EVALUATED DUE TO OCCURRENCE OF WELD DEFECT | | | | | |
| B31 | | 734 | 782 | 35 | 84 | — | — |
| B32 | | 605 | 649 | 62 | 107 | — | — |
| B33 | | 820 | 871 | 44 | 100 | — | — |
| B34 | | 716 | 769 | 30 | 194 | — | — |
| B35 | | 722 | 774 | 33 | 205 | — | — |
| B36 | | 863 | 907 | 38 | 98 | — | — |
| B37 | | 794 | 843 | 23 | 108 | — | — |
| B38 | | NOT EVALUATED DUE TO FREQUENTLY OCCURRENCE OF SPATTER | | | | | |
| B39 | | 755 | 845 | 35 | 158 | CRACKING | 2.2 |
| B40 | | NOT EVALUATED DUE TO FREQUENTLY OCCURRENCE OF SPATTER | | | | | |
| B41 | | NOT EVALUATED DUE TO UNSTABLE ARC | | | | | |
| B42 | | NOT EVALUATED DUE TO UNSTABLE ARC | | | | | |
| B43 | | NOT EVALUATED DUE TO BAD SLAG PEELABILITY | | | | | |
| B44 | | 740 | 795 | 42 | 150 | — | — |
| B45 | | 580 | 640 | 80 | 98 | — | — |
| B46 | | 715 | 761 | 35 | 175 | — | — |
| B47 | | 724 | 771 | 39 | 196 | — | — |
| B48 | | 698 | 744 | 37 | 168 | — | — |
| B49 | | NOT EVALUATED DUE TO UNSTABLE ARC | | | | | |
| B50 | | NOT EVALUATED DUE TO BAD SLAG PEELABILITY | | | | | |
| B51 | | 712 | 755 | 24 | 185 | — | — |

| WIRE No. | TENSILE STRENGTH | TOUGHNESS | COLD CRACKING RESISTANCE | OVERALL DETERMINATION | REMARKS |
|---|---|---|---|---|---|
| B26 | PASS | FAIL | — | FAIL | |
| B27 | PASS | FAIL | — | FAIL | |
| B28 | PASS | FAIL | — | FAIL | |
| B29 | — | — | — | FAIL | |
| B30 | — | — | — | FAIL | |
| B31 | PASS | FAIL | — | FAIL | |
| B32 | FAIL | PASS | — | FAIL | |
| B33 | PASS | FAIL | — | FAIL | |
| B34 | PASS | FAIL | — | FAIL | |
| B35 | PASS | FAIL | — | FAIL | |
| B36 | FAIL | FAIL | — | FAIL | ARC IS UNSTABLE AND WELD BEAT IS INFERIOR |
| B37 | PASS | FAIL | — | FAIL | ARC IS UNSTABLE AND WELD BEAT IS INFERIOR |
| B38 | — | — | — | FAIL | ARC IS UNSTABLE AND WELD BEAT IS INFERIOR |
| B39 | PASS | FAIL | — | FAIL | |
| B40 | — | — | — | FAIL | |
| B41 | — | — | — | FAIL | ARC IS UNSTABLE AND WELD BEAT IS INFERIOR |
| B42 | — | — | — | FAIL | ARC IS UNSTABLE AND WELD BEAT IS INFERIOR |
| B43 | — | — | — | FAIL | ARC IS UNSTABLE AND WELD BEAT IS INFERIOR |
| B44 | PASS | FAIL | — | FAIL | |
| B45 | FAIL | PASS | — | FAIL | |
| B46 | PASS | FAIL | — | FAIL | |
| B47 | PASS | FAIL | — | FAIL | |
| B48 | PASS | FAIL | — | FAIL | |
| B49 | — | — | — | FAIL | |
| B50 | — | — | — | FAIL | |
| B51 | PASS | FAIL | — | FAIL | |

TABLE 5-5

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| A56 | EXAMPLE | 654 | 708 | 93 | 62 | NO CRACKING | 0.4 |
| A57 | EXAMPLE | 652 | 695 | 97 | 51 | NO CRACKING | 0.6 |
| A58 | EXAMPLE | 693 | 730 | 89 | 65 | NO CRACKING | 0.5 |
| A59 | EXAMPLE | 690 | 736 | 92 | 56 | NO CRACKING | 0.4 |
| A60 | EXAMPLE | 751 | 796 | 84 | 55 | NO CRACKING | 0.5 |
| A61 | EXAMPLE | 763 | 802 | 72 | 75 | NO CRACKING | 0.5 |
| A62 | EXAMPLE | 620 | 665 | 95 | 53 | NO CRACKING | 0.6 |
| A63 | EXAMPLE | 757 | 828 | 79 | 59 | NO CRACKING | 0.4 |
| A64 | EXAMPLE | 692 | 744 | 88 | 55 | NO CRACKING | 0.4 |
| A65 | EXAMPLE | 687 | 732 | 85 | 69 | NO CRACKING | 0.5 |
| A66 | EXAMPLE | 706 | 751 | 90 | 65 | NO CRACKING | 0.4 |
| A67 | EXAMPLE | 685 | 736 | 73 | 57 | NO CRACKING | 0.5 |
| A68 | EXAMPLE | 723 | 784 | 84 | 68 | NO CRACKING | 0.9 |
| A69 | EXAMPLE | 729 | 790 | 79 | 63 | NO CRACKING | 0.4 |
| A70 | EXAMPLE | 746 | 796 | 78 | 64 | NO CRACKING | 0.6 |
| A71 | EXAMPLE | 735 | 786 | 80 | 55 | NO CRACKING | 0.5 |
| A72 | EXAMPLE | 722 | 769 | 84 | 54 | NO CRACKING | 0.5 |
| A73 | EXAMPLE | 734 | 777 | 80 | 55 | NO CRACKING | 0.6 |
| A74 | EXAMPLE | 721 | 784 | 77 | 59 | NO CRACKING | 0.5 |
| A75 | EXAMPLE | 719 | 769 | 93 | 42 | NO CRACKING | 0.4 |
| A76 | EXAMPLE | 735 | 782 | 77 | 56 | NO CRACKING | 0.5 |
| A77 | EXAMPLE | 749 | 794 | 88 | 49 | NO CRACKING | 0.4 |
| A78 | EXAMPLE | 723 | 771 | 80 | 64 | NO CRACKING | 0.4 |
| A79 | EXAMPLE | 745 | 789 | 79 | 65 | NO CRACKING | 0.5 |

| WIRE No. | TENSILE STRENGTH | TOUGHNESS | COLD CRACKING RESISTANCE | OVERALL DETERMINATION |
|---|---|---|---|---|
| A56 | PASS | PASS | PASS | PASS |
| A57 | PASS | PASS | PASS | PASS |
| A58 | PASS | PASS | PASS | PASS |
| A59 | PASS | PASS | PASS | PASS |
| A60 | PASS | PASS | PASS | PASS |
| A61 | PASS | PASS | PASS | PASS |
| A62 | PASS | PASS | PASS | PASS |
| A63 | PASS | PASS | PASS | PASS |
| A64 | PASS | PASS | PASS | PASS |
| A65 | PASS | PASS | PASS | PASS |
| A66 | PASS | PASS | PASS | PASS |
| A67 | PASS | PASS | PASS | PASS |
| A68 | PASS | PASS | PASS | PASS |
| A69 | PASS | PASS | PASS | PASS |
| A70 | PASS | PASS | PASS | PASS |
| A71 | PASS | PASS | PASS | PASS |
| A72 | PASS | PASS | PASS | PASS |
| A73 | PASS | PASS | PASS | PASS |
| A74 | PASS | PASS | PASS | PASS |
| A75 | PASS | PASS | PASS | PASS |
| A76 | PASS | PASS | PASS | PASS |
| A77 | PASS | PASS | PASS | PASS |
| A78 | PASS | PASS | PASS | PASS |
| A79 | PASS | PASS | PASS | PASS |

TABLE 5-6

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| A80 | EXAMPLE | 681 | 720 | 86 | 59 | NO CRACKING | 0.6 |
| A81 | EXAMPLE | 669 | 712 | 94 | 55 | NO CRACKING | 0.5 |
| A82 | EXAMPLE | 701 | 743 | 88 | 64 | NO CRACKING | 0.6 |
| A83 | EXAMPLE | 724 | 764 | 82 | 58 | NO CRACKING | 0.5 |
| A84 | EXAMPLE | 764 | 805 | 78 | 65 | NO CRACKING | 0.4 |
| A85 | EXAMPLE | 712 | 752 | 79 | 68 | NO CRACKING | 0.5 |
| A86 | EXAMPLE | 694 | 735 | 80 | 63 | NO CRACKING | 0.5 |
| A87 | EXAMPLE | 697 | 739 | 84 | 65 | NO CRACKING | 0.5 |
| A88 | EXAMPLE | 695 | 740 | 75 | 75 | NO CRACKING | 0.5 |

TABLE 5-6-continued

| | | | | | | | |
|---|---|---|---|---|---|---|---|
| A89 | EXAMPLE | 659 | 722 | 72 | 78 | NO CRACKING | 0.4 |
| A90 | EXAMPLE | 666 | 726 | 73 | 76 | NO CRACKING | 0.4 |
| A91 | EXAMPLE | 659 | 715 | 92 | 54 | NO CRACKING | 0.5 |
| A92 | EXAMPLE | 671 | 724 | 87 | 59 | NO CRACKING | 0.6 |
| A93 | EXAMPLE | 723 | 778 | 76 | 63 | NO CRACKING | 0.5 |
| A94 | EXAMPLE | 729 | 789 | 79 | 60 | NO CRACKING | 0.5 |
| A95 | EXAMPLE | 719 | 760 | 82 | 63 | NO CRACKING | 0.6 |
| A96 | EXAMPLE | 702 | 765 | 79 | 70 | NO CRACKING | 0.4 |
| A97 | EXAMPLE | 775 | 895 | 71 | 65 | NO CRACKING | 0.5 |
| A98 | EXAMPLE | 692 | 798 | 82 | 56 | NO CRACKING | 0.6 |
| A99 | EXAMPLE | 687 | 745 | 80 | 61 | NO CRACKING | 0.5 |
| A100 | EXAMPLE | 708 | 786 | 78 | 68 | NO CRACKING | 0.4 |
| A101 | EXAMPLE | 670 | 742 | 84 | 78 | NO CRACKING | 0.8 |
| A102 | EXAMPLE | 658 | 752 | 72 | 76 | NO CRACKING | 0.7 |
| A103 | EXAMPLE | 663 | 774 | 95 | 72 | NO CRACKING | 0.8 |
| A104 | EXAMPLE | 710 | 831 | 79 | 76 | NO CRACKING | 0.6 |
| A105 | EXAMPLE | 620 | 743 | 68 | 82 | NO CRACKING | 0.9 |
| A106 | EXAMPLE | 643 | 782 | 78 | 72 | NO CRACKING | 1.0 |
| A107 | EXAMPLE | 705 | 738 | 62 | 95 | NO CRACKING | 0.6 |
| A108 | EXAMPLE | 663 | 694 | 69 | 79 | NO CRACKING | 0.6 |

| WIRE No. | TENSILE STRENGTH | TOUGHNESS | COLD CRACKING RESISTANCE | OVERALL DETERMINATION |
|---|---|---|---|---|
| A80 | PASS | PASS | PASS | PASS |
| A81 | PASS | PASS | PASS | PASS |
| A82 | PASS | PASS | PASS | PASS |
| A83 | PASS | PASS | PASS | PASS |
| A84 | PASS | PASS | PASS | PASS |
| A85 | PASS | PASS | PASS | PASS |
| A86 | PASS | PASS | PASS | PASS |
| A87 | PASS | PASS | PASS | PASS |
| A88 | PASS | PASS | PASS | PASS |
| A89 | PASS | PASS | PASS | PASS |
| A90 | PASS | PASS | PASS | PASS |
| A91 | PASS | PASS | PASS | PASS |
| A92 | PASS | PASS | PASS | PASS |
| A93 | PASS | PASS | PASS | PASS |
| A94 | PASS | PASS | PASS | PASS |
| A95 | PASS | PASS | PASS | PASS |
| A96 | PASS | PASS | PASS | PASS |
| A97 | PASS | PASS | PASS | PASS |
| A98 | PASS | PASS | PASS | PASS |
| A99 | PASS | PASS | PASS | PASS |
| A100 | PASS | PASS | PASS | PASS |
| A101 | PASS | PASS | PASS | PASS |
| A102 | PASS | PASS | PASS | PASS |
| A103 | PASS | PASS | PASS | PASS |
| A104 | PASS | PASS | PASS | PASS |
| A105 | PASS | PASS | PASS | PASS |
| A106 | PASS | PASS | PASS | PASS |
| A107 | PASS | PASS | PASS | PASS |
| A108 | PASS | PASS | PASS | PASS |

TABLE 5-7

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| B52 | COMPARATIVE | NOT EVALUATED DUE TO UNSTABLE ARC | | | | | |
| B53 | EXAMPLE | NOT EVALUATED DUE TO A LOT OF FUME AND BAD WELDING EFFICIENCY | | | | | |
| B54 | | NOT EVALUATED DUE TO UNSTABLE ARC | | | | | |
| B55 | | 722 | 775 | 62 | 106 | — | — |
| B56 | | NOT EVALUATED DUE TO BAD SLAG PEELABILITY | | | | | |
| B57 | | 721 | 769 | 54 | 97 | — | — |
| B58 | | 758 | 804 | 79 | 62 | CRACKING | 1.9 |
| B59 | | 727 | 778 | 43 | 68 | — | — |
| B60 | | 744 | 789 | 64 | 93 | — | — |
| B61 | | NOT EVALUATED DUE TO UNSTABLE ARC | | | | | |
| B62 | | NOT EVALUATED DUE TO UNSTABLE ARC | | | | | |
| B63 | | 602 | 640 | 99 | 66 | — | — |
| B64 | | 816 | 884 | 55 | 72 | — | — |
| B65 | | NOT EVALUATED DUE TO OCCURRENCE OF WELD DEFECT | | | | | |

TABLE 5-7-continued

| | | | | | | |
|---|---|---|---|---|---|---|
| B66 | 710 | 759 | 37 | 77 | — | — |
| B67 | 702 | 746 | 48 | 72 | — | — |
| B68 | 713 | 755 | 40 | 69 | — | — |
| B69 | 749 | 801 | 29 | 64 | — | — |
| B70 | 748 | 795 | 33 | 60 | — | — |
| B71 | 716 | 762 | 53 | 79 | — | — |
| B72 | 709 | 753 | 66 | 75 | — | — |
| B73 | 700 | 746 | 52 | 74 | — | — |
| B74 | 726 | 779 | 63 | 70 | — | — |
| B75 | 753 | 804 | 65 | 65 | — | — |

| WIRE No. | TENSILE STRENGTH | TOUGHNESS | COLD CRACKING RESISTANCE | OVERALL DETERMINATION |
|---|---|---|---|---|
| B52 | — | — | — | FAIL |
| B53 | — | — | — | FAIL |
| B54 | — | — | — | FAIL |
| B55 | PASS | FAIL | — | FAIL |
| B56 | — | — | — | FAIL |
| B57 | PASS | FAIL | — | FAIL |
| B58 | PASS | PASS | FAIL | FAIL |
| B59 | PASS | FAIL | — | FAIL |
| B60 | PASS | FAIL | — | FAIL |
| B61 | — | — | — | FAIL |
| B62 | — | — | — | FAIL |
| B63 | FAIL | PASS | — | FAIL |
| B64 | PASS | FAIL | — | FAIL |
| B65 | — | — | — | FAIL |
| B66 | PASS | FAIL | — | FAIL |
| B67 | PASS | FAIL | — | FAIL |
| B68 | PASS | FAIL | — | FAIL |
| B69 | PASS | FAIL | — | FAIL |
| B70 | PASS | FAIL | — | FAIL |
| B71 | PASS | FAIL | — | FAIL |
| B72 | PASS | FAIL | — | FAIL |
| B73 | PASS | FAIL | — | FAIL |
| B74 | PASS | FAIL | — | FAIL |
| B75 | PASS | FAIL | — | FAIL |

TABLE 5-8

| WIRE No. | CATEGORY | YIELD STRENGTH [MPa] | TENSILE STRENGTH [MPa] | CHARPY ABSORBED ENERGY AT −196° C. [J] | AMOUNT OF OXYGEN IN WELD METAL [ppm] | Y-GROOVE WELD CRACKING TEST | AMOUNT OF DIFFUSIBLE HYDROGEN [ml/100 g] |
|---|---|---|---|---|---|---|---|
| B76 | COMPARATIVE | 762 | 818 | 61 | 60 | — | — |
| B77 | EXAMPLE | 751 | 792 | 60 | 63 | — | — |
| B78 | | 716 | 762 | 44 | 72 | — | — |
| B79 | | 720 | 756 | 54 | 75 | — | — |
| B80 | | 726 | 782 | 62 | 76 | — | — |
| B81 | | NOT EVALUATED DUE TO FREQUENTLY OCCURRENCE OF SPATTER | | | | | |
| B82 | | NOT EVALUATED DUE TO OCCURRENCE OF WELD DEFECT | | | | | |
| B83 | | 671 | 729 | 41 | 74 | — | — |
| B84 | | 613 | 652 | 106 | 69 | — | — |
| B85 | | 804 | 858 | 62 | 76 | — | — |
| B86 | | 751 | 796 | 68 | 88 | — | — |
| B87 | | 712 | 759 | 61 | 106 | — | — |
| B88 | | 726 | 778 | 59 | 99 | — | — |
| B89 | | 675 | 805 | 42 | 65 | — | — |
| B90 | | 665 | 725 | 39 | 85 | — | — |
| B91 | | 780 | 905 | 30 | 60 | — | — |
| B92 | | 745 | 705 | 45 | 130 | — | — |
| B93 | | 710 | 720 | 32 | 123 | — | — |
| B94 | | 655 | 702 | 42 | 88 | — | — |
| B95 | | 680 | 720 | 37 | 98 | — | — |
| B96 | | 680 | 720 | 37 | 98 | — | — |
| B97 | | 591 | 712 | 32 | 102 | — | — |
| B98 | | 720 | 780 | 29 | 192 | — | — |
| B99 | | 712 | 759 | 28 | 185 | — | — |
| B100 | | 712 | 759 | 29 | 186 | — | — |
| B101 | | NOT EVALUATED DUE TO UNSTABLE ARC | | | | | |

TABLE 5-8-continued

| WIRE No. | TENSILE STRENGTH | TOUGHNESS | COLD CRACKING RESISTANCE | OVERALL DETERMINATION |
|---|---|---|---|---|
| B76 | PASS | FAIL | — | FAIL |
| B77 | PASS | FAIL | — | FAIL |
| B78 | PASS | FAIL | — | FAIL |
| B79 | PASS | FAIL | — | FAIL |
| B80 | PASS | FAIL | — | FAIL |
| B81 | — | — | — | FAIL |
| B82 | — | — | — | FAIL |
| B83 | PASS | FAIL | — | FAIL |
| B84 | FAIL | PASS | — | FAIL |
| B85 | PASS | FAIL | — | FAIL |
| B86 | PASS | FAIL | — | FAIL |
| B87 | PASS | FAIL | — | FAIL |
| B88 | PASS | FAIL | — | FAIL |
| B89 | PASS | FAIL | — | FAIL |
| B90 | PASS | FAIL | — | FAIL |
| B91 | FAIL | FAIL | — | FAIL |
| B92 | PASS | FAIL | — | FAIL |
| B93 | PASS | FAIL | — | FAIL |
| B94 | PASS | FAIL | — | FAIL |
| B95 | PASS | FAIL | — | FAIL |
| B96 | PASS | FAIL | — | FAIL |
| B97 | PASS | FAIL | — | FAIL |
| B98 | PASS | FAIL | — | FAIL |
| B99 | PASS | FAIL | — | FAIL |
| B100 | PASS | FAIL | — | FAIL |
| B101 | — | — | — | FAIL |

TABLE 6

| BASE METAL No. | PLATE THICKNESS [mm] | CHEMICAL COMPOSITION OF STEEL PLATE [mass %] | | | | | | | | | | YIELD STRENGTH [MPa] | TENSILE STRENGTH [MPa] | CHARPY ABSORBED ENERGY AT −196° C. [J] |
|---|---|---|---|---|---|---|---|---|---|---|---|---|---|---|
| | | C | Si | Mn | P | S | Ni | Al | Mo | N | O | Ceq | | | |
| P1 | 25 | 0.06 | 0.2 | 0.6 | 0.002 | 0.001 | 9.12 | 0.04 | 0.01 | 0.004 | 0.001 | 0.40 | 675 | 725 | 178 |
| P2 | 20 | 0.06 | 0.2 | 0.5 | 0.006 | 0.004 | 9.25 | 0.02 | 0.01 | 0.004 | 0.001 | 0.38 | 669 | 720 | 197 |

INDUSTRIAL APPLICABILITY

The gas-shielded arc welding capable of significantly reducing welding material costs and achieving excellent welding efficiency can be applied by reducing the amount of Ni of the flux-cored wire used for welding Ni-based steel for low temperature use containing about 5.5% to 9.5% of Ni to the same level as Ni-based steel for low temperature use. In addition, a weld metal having excellent low temperature toughness at −196° C. can be obtained by reducing the alloy composition of the flux filled in the wire to reduce the amount of oxygen in the weld metal. Further, it is possible to provide a flux-cored wire in which preheating for preventing cold cracking is not required or preheating can be significantly reduced. Therefore, the industrial value of the present invention is very high.

BRIEF DESCRIPTION OF THE REFERENCE SYMBOLS

1: STEEL PLATE
2: BACKING METAL
3: WELD BEAD
4: CHARPY IMPACT TEST PIECE (HAVING 2 MM V-NOTCH)
5: A0 TEST PIECE (ROD) FOR TENSILE TEST

The invention claimed is:
1. A flux-cored wire for gas-shielded arc welding comprising:
an outer steel sheath; and
a flux with which the outer steel sheath is filled,
wherein one or more of $CaF_2$, $BaF_2$, $SrF_2$, $MgF_2$, and $LiF$, which are metal fluorides, are included in the flux-cored wire and, when a total amount thereof is defined as α, the α is 2.0% to 7.0%, by mass %, with respect to a total mass of the flux-cored wire,
one or more of a Ti oxide, a Si oxide, a Mg oxide, an Al oxide, a Zr oxide, and a Ca oxide, which are metal oxides, are included in the flux-cored wire and, when a total amount thereof is defined as β, the β is 0.2% to 0.9%, by mass %, with respect to the total mass of the flux-cored wire,
one or more of $CaCO_3$, $BaCO_3$, $SrCO_3$, $MgCO_3$, and $Li_2CO_3$, which are metal carbonates, are included in the flux-cored wire and a total amount thereof is less than 0.6%, by mass %, with respect to the total mass of the flux-cored wire,
a ratio of an amount of the $CaF_2$ with respect to the α is 0.90 or more, a ratio of the α with respect to the β is 3.0 or more and 15.0 or less, an amount of the Ti oxide is 0% to 0.4%, by mass %, with respect to the total mass of the flux-cored wire, an amount of the Si oxide is 0.2% to 0.5%, by mass %, with respect to the total mass of the flux-cored wire, an amount of the Ca oxide is less than 0.20%, by mass %, with respect to the total mass of the flux-cored wire, an amount of an arc stabilizer in the flux is 0% to 0.50%, by mass %, with respect to the total mass of the flux-cored wire, an amount of an iron powder in the flux is less than 5%, by mass %, with respect to the total mass of the flux-cored wire, chemical compositions except the metal fluorides, the metal oxides, and the metal carbonates include, by mass %, with respect to the total mass of the flux-cored wire, C: 0.003% to 0.040%;
Si: 0.05% to 0.40%;
Mn: 0.2% to 0.8%;
Al: 0.003% to 0.050%;
Ni: 6.0% to 16.0%;
P: 0.02% or less;
S: 0.01% or less;
Cu: 0% to 0.5%;
Cr: 0% to 0.5%;
Mo: 0% to 0.5%;
V: 0% to 0.2%;
Ti: 0% to 0.1%;
Nb: 0% to 0.1%;
B: 0% to 0.01%;
Mg: 0% to 0.6%;
REM: 0 to 0.0500%; and
a remainder: Fe and an impurity,
a SM defined by expression a is 0.3% to 1.0%,
a Ceq defined by expression b is 0.250% to 0.525%, $$SM = [Si] + [Mn]: \quad \text{(Expression a)},$$

$$Ceq = [C] + (1/24)[Si] + (1/6)[Mn] + (1/40)[Ni] + (1/5)[Cr] + (1/4)[Mo] + (1/14)[V]: \quad \text{(Expression b)}, \text{ and}$$

in the Expressions a and b, elements noted in brackets express amounts (mass %) of the elements, respectively.

2. The flux-cored wire for gas-shielded arc welding according to claim 1, wherein the flux-cored wire includes the outer steel sheath including Ni and the flux filled therein, and
an amount of Ni in the outer steel sheath is 6% to 18%, by mass %, with respect to the total mass of the outer steel sheath.

3. The flux-cored wire for gas-shielded arc welding according to claim 1 or 2, wherein an amount of REM in the flux-cored wire is 0.0100% or less, by mass %, with respect to the total mass of the flux-cored wire.

4. The flux-cored wire for gas-shielded arc welding according to claim 1 or 2, wherein the amount of the CaO as the Ca oxide in the flux-cored wire is less than 0.10%, by mass %, with respect to the total mass of the flux-cored wire.

5. The flux-cored wire for gas-shielded arc welding according to claim 1 or 2, wherein a tensile strength of a weld metal is 660 MPa to 900 MPa in a tensile test to the weld metal regulated in Japanese Industrial Standards JIS Z 3111-2005 in the gas-shielded arc welding using the flux-cored wire.

6. The flux-cored wire for gas-shielded arc welding according to claim 1 or 2, wherein a slit-shaped gap does not exist in the outer steel sheath of the flux-cored wire.

7. The flux-cored wire for gas-shielded arc welding according to claim 1 or 2, wherein a slit-shaped gap exists in the outer steel sheath of the flux-cored wire.

8. The flux-cored wire for gas-shielded arc welding according to claim 1 or 2, wherein a perfluoropolyether oil is applied on a surface of the outer steel sheath of the flux-cored wire.

9. A method for welding steel for very low temperature use, wherein welding is performed with a flux-cored wire for gas-shielded arc welding and with any one of a pure Ar gas, a mixed gas of Ar and 1.5 volume % or less of $O_2$ or $CO_2$, a pure He gas, and a mixed gas of He and 1.5 volume % or less of $O_2$ or $CO_2$ as a shielding gas;

wherein the flux-cored wire for gas-shielded arc welding comprises:

an outer steel sheath; and a flux with which the outer steel sheath is filled, wherein one or more of $CaF_2$, $BaF_2$, $SrF_2$, $MgF_2$, and LiF, which are metal fluorides, are included in the flux-cored wire and, when a total amount thereof is defined as α, the α is 2.0% to 7.0%, by mass %, with respect to a total mass of the flux-cored wire, one or more of a Ti oxide, a Si oxide, a Mg oxide, an Al oxide, a Zr oxide, and a Ca oxide, which are metal oxides, are included in the flux-cored wire and, when a total amount thereof is defined as β, the β is 0.2% to 0.9%, by mass %, with respect to the total mass of the flux-cored wire, one or more of $CaCO_3$, $BaCO_3$, $SrCO_3$, $MgCO_3$, and $Li_2CO_3$, which are metal carbonates, are included in the flux-cored wire and a total amount thereof is less than 0.6%, by mass %, with respect to the total mass of the flux-cored wire, a ratio of an amount of the $CaF_2$ with respect to the α is 0.90 or more, a ratio of the α with respect to the β is 3.0 or more and 15.0 or less, an amount of the Ti oxide is 0% to 0.4%, by mass %, with respect to the total mass of the flux-cored wire, an amount of the Si oxide is 0.2% to 0.5%, by mass %, with respect to the total mass of the flux-cored wire, an amount of the Ca oxide is less than 0.20%, by mass %, with respect to the total mass of the flux-cored wire, an amount of an arc stabilizer in the flux is 0% to 0.50%, by mass %, with respect to the total mass of the flux-cored wire, an amount of an iron powder in the flux is less than 5%, by mass %, with respect to the total mass of the flux-cored wire, chemical compositions except the metal fluorides, the metal oxides, and the metal carbonates include, by mass %, with respect to the total mass of the flux-cored wire, C: 0.003% to 0.040%;
Si: 0.05% to 0.40%;
Mn: 0.2% to 0.8%;
Al: 0.003% to 0.050%;
Ni: 6.0% to 16.0%;
P: 0.02% or less;
S: 0.01% or less;
Cu: 0% to 0.5%;
Cr: 0% to 0.5%;
Mo: 0% to 0.5%;
V: 0% to 0.2%;

Ti: 0% to 0.1%;
Nb: 0% to 0.1%;
B: 0% to 0.01%;
Mg: 0% to 0.6%;
REM: 0 to 0.0500%; and
a remainder: Fe and an impurity,
a SM defined by expression a is 0.3% to 1.0%,
a Ceq defined by expression b is 0.250% to 0.525%, $$SM=[Si]+[Mn]: \quad \text{(Expression a)},$$

$$Ceq=[C]+(1/24)[Si]+(1/6)[Mn]+(1/40)[Ni]+(1/5)[Cr]+(1/4)[Mo]+(1/14)[V]: \quad \text{(Expression b), and}$$

in the Expressions a and b, elements noted in brackets express amounts (mass %) of the elements, respectively.

10. A method for manufacturing a weld joint, wherein a steel plate in which a thickness is 6 mm to 100 mm, an amount of Ni is 5.5 mass % to 9.5 mass %, and a tensile strength is 660 MPa to 900 MPa is welded with a flux-cored wire for gas-shielded arc welding and with any one of a pure Ar gas, a mixed gas of Ar and 1.5 volume % or less of $O_2$ or $CO_2$, a pure He gas, and a mixed gas of He and 1.5 volume % or less of $O_2$ or $CO_2$ as a shielding gas;

wherein the flux-cored wire for gas-shielded arc welding comprises:

an outer steel sheath; and a flux with which the outer steel sheath is filled, wherein one or more of $CaF_2$, $BaF_2$, $SrF_2$, $MgF_2$, and LiF, which are metal fluorides, are included in the flux-cored wire and, when a total amount thereof is defined as α, the α is 2.0% to 7.0%, by mass %, with respect to a total mass of the flux-cored wire, one or more of a Ti oxide, a Si oxide, a Mg oxide, an Al oxide, a Zr oxide, and a Ca oxide, which are metal oxides, are included in the flux-cored wire and, when a total amount thereof is defined as β, the β is 0.2% to 0.9%, by mass %, with respect to the total mass of the flux-cored wire, one or more of $CaCO_3$, $BaCO_3$, $SrCO_3$, $MgCO_3$, and $Li_7CO_3$, which are metal carbonates, are included in the flux-cored wire and a total amount thereof is less than 0.6%, by mass %, with respect to the total mass of the flux-cored wire, a ratio of an amount of the $CaF_2$ with respect to the α is 0.90 or more, a ratio of the α with respect to the β is 3.0 or more and 15.0 or less, an amount of the Ti oxide is 0% to 0.4%, by mass %, with respect to the total mass of the flux-cored wire, an amount of the Si oxide is 0.2% to 0.5%, by mass %, with respect to the total mass of the flux-cored wire, an amount of the Ca oxide is less than 0.20%, by mass %, with respect to the total mass of the flux-cored wire, an amount of an arc stabilizer in the flux is 0% to 0.50%, by mass %, with respect to the total mass of the flux-cored wire, an amount of an iron powder in the flux is less than 5%, by mass %, with respect to the total mass of the flux-cored wire, chemical compositions except the metal fluorides, the metal oxides, and the metal carbonates include, by mass %, with respect to the total mass of the flux-cored wire, C: 0.003% to 0.040%;
Si: 0.05% to 0.40%;
Mn: 0.2% to 0.8%;
Al: 0.003% to 0.050%;
Ni: 6.0% to 16.0%;
P: 0.02% or less;
S: 0.01% or less;
Cu: 0% to 0.5%;
Cr: 0% to 0.5%;
Mo: 0% to 0.5%;
V: 0% to 0.2%;
Ti: 0% to 0.1%;
Nb: 0% to 0.1%;
B: 0% to 0.01%;
Mg: 0% to 0.6%;
REM: 0 to 0.0500%; and
a remainder: Fe and an impurity,
a SM defined by expression a is 0.3% to 1.0%,
a Ceq defined by expression b is 0.250% to 0.525%, $$SM=[Si]+[Mn]: \quad \text{(Expression a)},$$

$$Ceq=[C]+(1/24)[Si]+(1/6)[Mn]+(1/40)[Ni]+(1/5)[Cr]+(1/4)[Mo]+(1/14)[V]: \quad \text{(Expression b), and}$$

in the Expressions a and b, elements noted in brackets express amounts (mass %) of the elements, respectively.

11. The flux-cored wire for gas-shielded arc welding according to claim 1, wherein an amount of REM in the flux-cored wire is 0.0100% or less, by mass %, with respect to the total mass of the flux-cored wire, and the amount of the CaO as the Ca oxide in the flux-cored wire is less than 0.10%, by mass %, with respect to the total mass of the flux-cored wire.

12. The flux-cored wire for gas-shielded arc welding according to claim 1 or 2, wherein an amount of Mn in the flux-cored wire is 0.2% to 0.7%, by mass %, with respect to the total mass of the flux-cored wire.

\* \* \* \* \*